US005659667A

United States Patent [19]
Buescher et al.

[11] Patent Number: 5,659,667
[45] Date of Patent: Aug. 19, 1997

[54] ADAPTIVE MODEL PREDICTIVE PROCESS CONTROL USING NEURAL NETWORKS

[75] Inventors: Kevin L. Buescher, Los Alamos, N. Mex.; Christopher C. Baum, Mazomanie, Wis.; Roger D. Jones, Espanola, N. Mex.

[73] Assignee: The Regents of the University of California Office of Technology Transfer, Alemeda, Calif.

[21] Appl. No.: 373,736

[22] Filed: Jan. 17, 1995

[51] Int. Cl.$^6$ .................................................. G06F 15/18
[52] U.S. Cl. .............................................. 395/23; 364/148
[58] Field of Search .................................. 364/148, 149, 364/178, 173, 151; 395/22, 23; 382/236, 238

[56] References Cited

U.S. PATENT DOCUMENTS

| | | | |
|---|---|---|---|
| 4,197,576 | 4/1980 | Sanchez | 364/151 |
| 4,358,822 | 11/1982 | Sanchez | 364/151 |
| 5,121,467 | 6/1992 | Skeirik | 395/11 |
| 5,142,612 | 8/1992 | Skeirik | 395/11 |
| 5,151,822 | 9/1992 | Hekker et al. | 359/559 |
| 5,167,009 | 11/1992 | Skeirik | 395/27 |
| 5,197,114 | 3/1993 | Skeirik | 395/22 |
| 5,212,765 | 5/1993 | Skeirik | 417/44.2 |
| 5,224,203 | 6/1993 | Skeirik | 395/22 |
| 5,282,261 | 1/1994 | Skeirik | 395/22 |
| 5,293,456 | 3/1994 | Guez et al. | 395/24 |
| 5,331,550 | 7/1994 | Stafford et al. | 364/413.02 |

OTHER PUBLICATIONS

W. C. Mead et al., "Optimization and Control of a Small-Angle Negative Ion Source Using an On-Line Adaptive Controller Based on the Connectionist Normalized Local Spline Neural Network," B72 Nuclear Instruments & Methods in Physics Research, pp. 271–289 (1992).

Jinqiu Shao et al., "Orthogonal Projection Method for Fast On-Line Learning Algorithm of Radial Basis Function Neural Networks," Los Alamos National Laboratory report LA-UR-92-3292 submitted to NonLinear Adaptive Computation edited by Roger D. Jones and Y. C. Lee (Sep., 1992).

Roger D. Jones, "Machines That Learn Adaptive Computation With Neural Networks," 21 Los Alamos Science, pp. 195–203 (1993).

R. D. Jones et al., "Nonlinear Adaptive Networks: A Little Theory, A Few Applications," Los Alamos National Laboratory report LA-UR-91-273 submitted to Cognitive Modeling in System Controls, Santa Fe, New Mexico Jun. 10–14, 1990.

Hwang et al., "Temporal Difference Method for Multi-Step Prediction: Application to Power Load Forecasting," IEEE Applic. of Neural Networks to Power Systems, pp. 41–45. Dec. 30, 1991.

Haykin, "Neural Networks," Macmillan College Publishing Co., pp. 264–269, Dec. 30, 1994.

White and Sofge, ed. "Handbook of Intelligent Control," Van Nostrand Reinhold, NY, pp. 144–153, Dec. 30, 1992.

Churchland and Sejnowski, "The Computational Brain," MIT Press, pp. 125–130, Dec. 30, 1992.

*Primary Examiner*—Robert W. Downs
*Assistant Examiner*—Ji-Yong D. Chung

[57] ABSTRACT

A control system for controlling the output of at least one plant process output parameter is implemented by adaptive model predictive control using a neural network. An improved method and apparatus provides for sampling plant output and control input at a first sampling rate to provide control inputs at the fast rate. The MPC system is, however, provided with a network state vector that is constructed at a second, slower rate so that the input control values used by the MPC system are averaged over a gapped time period. Another improvement is a provision for on-line training that may include difference training, curvature training, and basis center adjustment to maintain the weights and basis centers of the neural in an updated state that can follow changes in the plant operation apart from initial off-line training data.

17 Claims, 42 Drawing Sheets

5,659,667

ADAPTIVE MODEL PREDICTIVE PROCESS CONTROL USING NEURAL NETWORKS

BACKGROUND OF THE INVENTION

This invention relates to process control systems and, more particularly, to model predictive control systems using neural nets. This invention was made with government support under Contract No. W-7405-ENG-36 awarded by the U.S. Department of Energy. The government has certain rights in the invention.

In Model Predictive Control (MPC), a process, or "plant," model is used to predict the response of the plant to future control inputs. These predictions are incorporated into a finite-horizon optimization problem that is solved during each sampling interval in order to determine the best value for the next control input. This methodology is especially attractive for applications because constraints on the inputs can be explicitly accounted for and, when the model is nonlinear (e.g., a neural network), it can be readily applied to nonlinear plants.

There are problems, however, in the use of MPC with neural network models for the control of complex systems. The network must first be trained to model the plant, a process known as "system identification." This must be done using off-line operating data from the plant. But such data may be costly or impossible to obtain, and the plant's behavior may drift with time, making the off-line data invalid. Also, the initial network selected may be too large (requiring still larger amounts of off-line training) or too small (with a resultant inability to provide adequate control). It would be very desirable to enable training to be done on-line using actual operating information to adapt the neural net. It would also be desirable to enable the size of the network to be adapted, if necessary, to provide for tracking actual process behavior.

Yet another problem is the choice of a sampling rate for MPC. If this rate is too low, the control system cannot react quickly to command changes and unmeasured disturbances. Further, a lower sampling rate may result in controls and responses that are less smooth, since there are fewer opportunities to change the control input. However, a number of problems arise if the rate is sufficiently high, and these problems are exacerbated by nonlinear models with many parameters, such as neural networks. A model for a fast sampling rate usually must depend on a large number of past values of plant inputs and outputs. The increased complexity of the model necessitates a large amount of data for adequate system identification. Further, a model for a faster sampling rate must be iterated more times to predict a given period of time into the future. This requires that the identification model give extremely accurate one-step predictions and greatly increases the computational burden of performing optimization using MPC.

Accordingly, it is an object of the present invention to reduce the size of the network needed for process control.

Another object of the present invention is to minimize the amount of off-line training that is required for a neural net.

Yet another object of the present invention is to enable on-line training to be done to adapt the control system to actual plant response.

Still another object of the present invention is to provide a timing for control inputs that provides smooth process control.

It is a further object of the present invention to maintain control of a drifting plant process using a minimum of off-line data for training.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, this invention may comprise an improved method for controlling at least one process output parameter of a plant with a control value generated by adaptive model predictive control (MPC) using a neural network. The process improvement includes:

(a) repetitively sampling at times t(k) a process output parameter and associated control value at time intervals k having a first duration;

(b) sequentially storing the process output parameters and associated control values sampled at each of the time intervals k over rg and sg, respectively, of the time intervals k, where g is a multiple greater than one and defines a gapping time interval g at a second interval duration greater than the first interval duration, and r and s are arbitrary integers greater than one and determined by the size of a register for storing the process output parameters and associated control values;

(c) forming from stored ones of the process output parameters and associated control values a gapped network state vector comprising a sequence of process output parameters selected at times t(k), (y(k−g+1),y(k−2g+1), . . . ,(y(k−rg+1)), and averaged control values, ($\bar{u}$(k−g+1),$\bar{u}$(k−2g+1), . . . ,$\bar{u}$(k−sg+1)), where ($\bar{u}$(k−ig+1)=(u(k−ig+1)+u(k−ig+2)+. . .+u(k−ig+g))/g;

(d) applying the gapped network state vector to a controller for outputting an updated control value to apply to the plant at time t(k+1) after time t(k); and (e) repeating steps (a) through (d) at subsequent time intervals of the first time duration to maintain the process output parameter at a selected value.

In another characterization, the present invention may comprise an improved training method for use in controlling at least one process output parameter of a plant with a control value generated by adaptive model predictive control (MPC) using a neural network. The training process improvement includes:

(a) repetitively sampling at times t(k) a process output parameter and associated control value at time intervals k having a first duration;

(b) sequentially storing the process output parameters and associated control values sampled at each of the time intervals k;

(c) forming from stored ones of the process output parameters $y_j$ and associated control values $u_j$ a network state vector comprising a sequence of process output parameters and control values;

(d) applying the network state vector and the output process parameter at time t(k) to an on-line training processor;

(e) outputting updated values of weights and basis center locations to the neural net for use in predicting a future output process parameter; and (f) repeating steps (a) through (e) at subsequent time intervals t(k+i) of the first time duration to update the weights and basis center locations after each the first time interval duration.

In yet another characterization, the present invention includes an improved control system for controlling at least one process output parameter of a plant by generating a control value using adaptive model predictive control (MPC) with a neural network. The control system includes:

a register for repetitively sampling and storing process output parameters and associated control values at times $t(k)$ with first time intervals k having a first duration, the register sequentially storing the process output parameters and associated control values sampled at each of the first time intervals over rg and sg, respectively, of the first time intervals, where g is an integral multiple of k greater than one and defines a gapping interval g at a second time duration greater than the first time duration, and r and s are arbitrary integers greater than one and determined by the size of the register for storing the process output parameters and associated control values;

an electronic processor for forming from stored ones of the process output parameters and associated control values a gapped network state vector comprising a sequence of process output parameters selected at g time intervals, $(y(k-g+1), y(k-2g+1), \ldots, (y(k-rg+1))$, and averaged control values, $(\bar{u}(k-g+1), \bar{u}(k-2g+1), \ldots, \bar{u}(k-sg+1))$, where $(\bar{u}(k-ig+1) = (u(k-ig+1) + u(k-ig+2) + \ldots + u(k-ig+g))/g$; and a controller for receiving the gapped network state vector and outputting an updated control value to apply to the plant at time $t(k+1)$ after time $t(k)$.

In yet another characterization of the present invention, an improved control system controls at least one process output parameter of a plant by generating a control value using adaptive model predictive control (MPC) with a neural network. The control system includes:

a register for repetitively sampling and storing process output parameters and associated control values at times $t(k)$ with first time intervals k having a first duration, the register sequentially storing the process output parameters and associated control values sampled at each of the first time intervals over rg and sg, respectively, of the first time intervals, where g is an integral multiple of k greater than one and defines a gapping interval g at a second time duration greater than the first time duration, and r and s are arbitrary integers greater than one and determined by the size of the register for storing the process output parameters and associated control values;

an electronic processor for forming from stored ones of the process output parameters and associated control values a network state vector comprising a sequence of process output parameters and control values; and an on-line training processor connected to receive the network state vector and the process output parameter at time $t(k)$, wherein the on-line training processor further includes:

electronic circuitry for forming a net input vector from the network state vector and outputting the net input vector at time $t(k-1)$; and a weight training processor receiving the output process parameter at time $t(k)$ and the net input vector from time $t(k-1)$ and outputting a first updated value of the weight.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

In accordance with the present invention, the implementation problems discussed above for MPC are addressed by three improvements:

(1) providing output sampling rates and command changes at a fast rate, but using a plant model that corresponds to a slower rate, called "gapping herein;

(2) moving nodes in the plant model, or adding new nodes, in response to on-line training;

(3) using difference and curvature on line training to accentuate slow trends in the plant behavior.

It will be understood that the basic MPC system, including the neural network, is well known; see, e.g., R. D. Jones, "Machines That Learn," 21 *Los Alamos Science*, pp. 195–203 (1993) and W. C. Mead et al., "Optimization and control of a small angle negative ion source using an on-line adaptive controller based on the connectionist normalized local spline neural network", B72 *Nuclear Instruments and Methods*, pp. 271–289 (1992). The functions performed by the component systems of our system are improvements on the functions described in these references, particularly with respect to gapping, basis center adjustment, and adjustment of the neural network weights during on-line training. A preferred neural network for use with MPC is the known Connectionist Normalized Local Spline (CNLS) network. Its output is described by $$\phi(\vec{x}) = \frac{\sum_{j=1}^{M} f_j \rho_j(\vec{x})}{\sum_{k=1}^{M} \rho_k(\vec{x})} \quad (1)$$

where $\rho_i$ is a local function of the vector input $\vec{\chi}$ about a center $\vec{c}_j$:

$$\rho_i(\vec{\chi}) = \exp[-\beta(\vec{\chi}-\vec{c}_i)^T(\vec{\chi}-\vec{c}_i)] \quad (2)$$

where the superscript T indicates vector transpose. The quantity, $\beta$ determines the "width" of the basis functions and is held constant. The summation is over the number of basis function centers.

For a smooth function $\eta(\vec{\chi})$ and a set of centers $\vec{c}_1, \ldots, \vec{c}_M$, there is the identity $$f(\vec{x}) = \frac{\sum_{j=1}^{M} f(\vec{x}) \rho_j(\vec{x})}{\sum_{k=1}^{M} \rho_k(\vec{x})} \quad (3)$$

Approximating $\eta(\vec{\chi})$ by the first two terms of its Taylor expansion about the basis centers yields a function of the form $$\phi(\vec{x}) = \sum_{j=1}^{M} [a_j + (\vec{x}-\vec{c}_j)^T \vec{d}_j] \frac{\rho_j(\vec{x})}{\sum_{k=1}^{M} \rho_k(\vec{x})} \quad (4)$$

This structure is called a CNLS network with M nodes. The adjustable parameters are the centers, $\vec{c}_j$, the linear weights, $a_j$, and the gradient weights, $d_j$.

Figure 1:
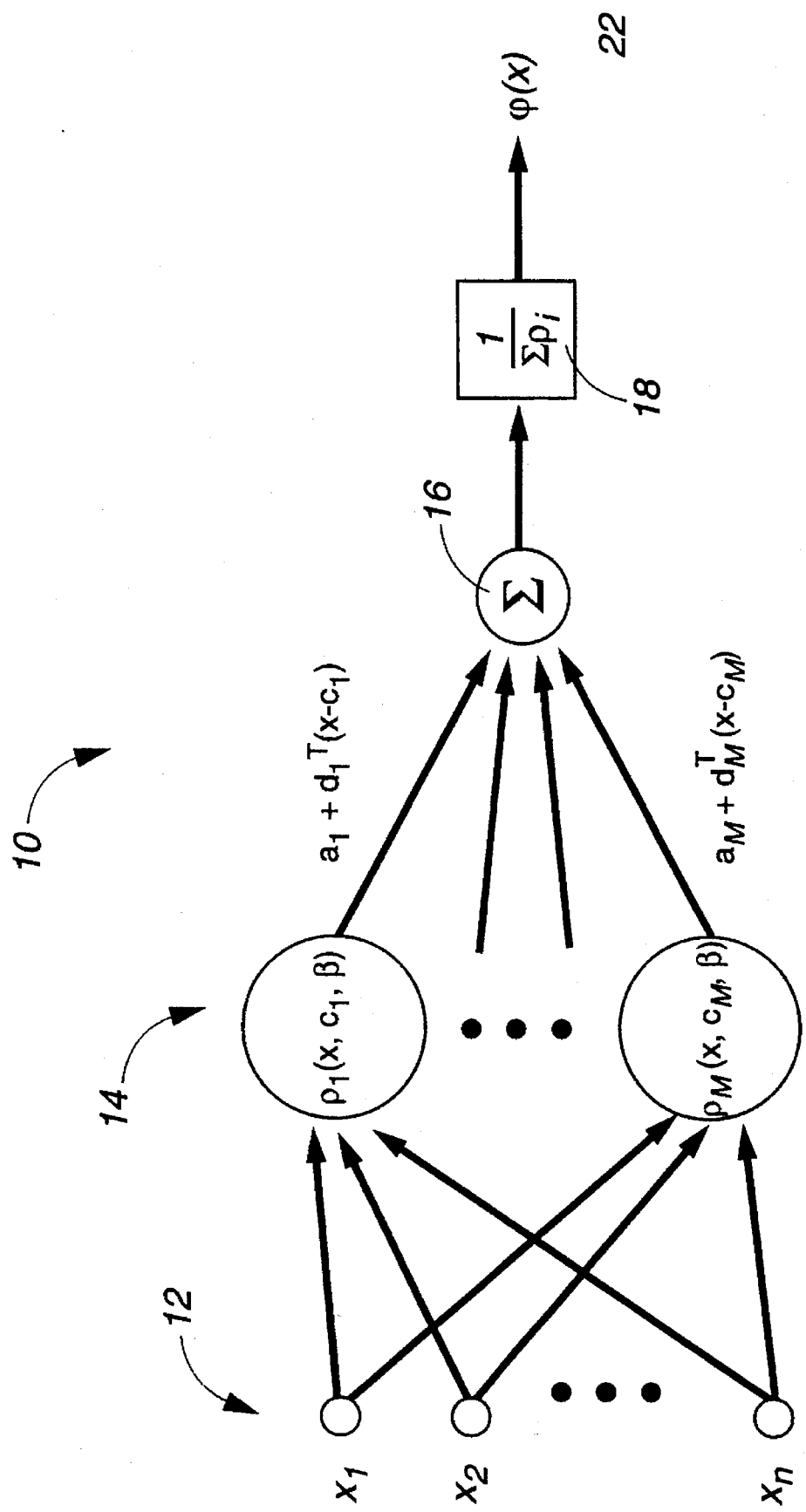
FIG. 1 is a basic schematic of a CNLS network.

The basic schematic of a CNLS network is shown in FIG. 1. FIG. 1 depicts the neural network structure 10 with input nodes 12, hidden nodes 14, and output node 16. Hidden nodes 14 operate on inputs $(x_1, x_2, \ldots, x_n)$ in accordance with basis functions $\rho_i(\vec{\chi})$. Because the basis functions depend nonlinearly on their inverse widths, $\beta$, and centers, $\vec{c}_j$, those parameters are associated with the hidden nodes. The linear weights, $a_j$ and $d_j$, are calculated after the basis functions are known, so they are associated with the links between the hidden nodes and the output node. The weighted basis functions are summed 16 and normalized 18 to form the net output, $\phi(\vec{\chi})$ 22.

The process of adjusting the network parameters to approximate a data set is known as training. Training is first done using historical plant data.

During training, the CNLS net parameters are adjusted by an iterative process. Each step of the training alters the parameter values resulting from the previous step to produce new parameter values that better approximate the training examples. The process is complete when additional steps do not appreciably improve the approximation. In the present implementation, $a_j$ and $\vec{d}_j$ are the parameters that are adjusted during training. Because these parameters appear linearly in Equation (4), there are simple and effective algorithms for adjusting them.

Gapping:

The conventional input-output models used for MPC rely on past values of plant response y to a control input u, both sampled at a "fast" rate, in order to predict the next value of y. A prediction of is given by:

$$\hat{y}_{k+1} = \phi(y_k, y_{k-1}, \ldots; u_k, u_{k-1}, \ldots) \quad (5)$$

In accordance with our invention, the following structure is used for predicting an output value, y:

$$\hat{y}_{k+g} = \phi(y_k, y_{k-g}, \ldots; \bar{u}_k, \bar{u}_{k-g}, \ldots) \quad (6)$$

where
 k corresponds to the fast sampling rate,
 g is the integer sample "gap," and $$\bar{u}_k = \frac{u_k + u_{k+1} + \ldots + u_{k+g-1}}{g} \quad (7)$$

This terminology is used in the following discussion. Note that the conventional approach corresponds to g=1. Thus, the system will tend to "average" control inputs from adjacent sampling periods when the sample gap is greater than one.

For input-output system identification, the network is trained to map past plant inputs and outputs to the future output. The data set is composed of P points $(\vec{\chi}_p, y_p)$ which are derived from historical plant data. Each vector $\vec{\chi}_p$ consists of past plant outputs $(y_k, y_{k-g}, \ldots)$ and averaged inputs $(\bar{u}_k, \bar{u}_{k-g}, \ldots)$, in accordance with our invention, and $y_p$ is the associated future output, $y_{k+g}$. The goal of the off-line training is to minimize the training error, $$\sum_{p=1}^{P} (y_p - \phi(\vec{x_p}))^2 \qquad (8)$$

Before training commences, there are a number of quantities that must be selected: M, β, g, the centers $\vec{c}_j$, and the amounts of historical information fed to the network. These can be determined by prior experience, by seeing how well the trained network is able to approximate the training data, or by a cross-validation scheme. The value of M is not critical, since the number of nodes can be adapted on-line (a value in the range 5–15 usually suffices). The centers are chosen at random from the $\vec{\chi}_p$. If each component of $\vec{\chi}_p$ is scaled so that it takes values in an interval of length 1, then β in the range 4.0–10.0 will usually suffice. A gradient descent scheme is used to approximately minimize the training error equation and is also used for on-line training. In order to succinctly describe the training algorithm, the network equation is rewritten in vector form as:

$$\phi(\vec{\chi}) = \vec{w}^T \vec{\tau}(\vec{\chi}) \qquad (9)$$

using the following definitions.

$$\vec{w} = \begin{pmatrix} \vec{w}_1 \\ \vec{w}_2 \\ \vdots \\ \vec{w}_M \end{pmatrix}, \text{ with } \vec{w}_j = \begin{pmatrix} a_j \\ d_j \end{pmatrix}, \text{ and} \qquad (10)$$

$$\vec{\tau}(\vec{x}) = \begin{pmatrix} \vec{\tau}_1(\vec{x}) \\ \vec{\tau}_2(\vec{x}) \\ \vdots \\ \vec{\tau}_M(\vec{x}) \end{pmatrix}, \text{ with } \vec{\tau}_j(\vec{x}) = \begin{pmatrix} \vec{\rho}_j(\vec{x}) \\ (\vec{x}-\vec{c}_j)\rho_j(\vec{x}) \end{pmatrix} * \frac{1}{\sum_{i=1}^{M} \rho_i(\vec{x})} \qquad (11)$$

The order of the training data is randomized and the data is swept through repeatedly, with the network parameters being updated for each training point in the sequence, ($\vec{\chi}_i, y_i$), by $$\vec{w}_{(i+1)} = \vec{w}_{(i)} + \eta[y_i - \phi(\vec{x_i})] \frac{\vec{\tau}(\vec{x_i})}{\vec{\tau}(\vec{x_i})^T \vec{\tau}(\vec{x_i})} \qquad (12)$$

where $\vec{w}_{(0)}$ consists of small random numbers and η is a small positive number called the "learning rate." The update is essentially a form of least squares and, since the training error (Eq. 5) is quadratic in the a's and d's, there are none of the convergence problems associated with training other types of neural networks. It is occasionally useful to use a different learning rate for different components of $\vec{w}$; for instance, for the "a" terms versus the "$\vec{d}$" terms.

During on-line training, Eq. (9) is used (with a different learning rate), $\eta_n$, to update the weights during each fast sampling interval. In addition to this slow adaptation of the weights, a "fast correction" scheme is also implemented by adding the prediction error from the previous time step to the current prediction. This step greatly improves the quality of process control. In situations where the plant output is noisy, it would be desirable to filter, or smooth, the prediction error before adding it to the network output.

There are common elements to every MPC scheme. First, the model is iterated to produce estimates of future plant behavior, as a function of the control strategy selected. Second, a reference trajectory guides the plant, usually to a set point. Third, a control strategy is determined by solving a finite-horizon optimization problem, and the initial part of this strategy is pursued until a new control input is calculated.

In accordance with the present invention, the following processes are performed between times k–1 and k in order to determine u(k). During this time, consider y(k) and the prediction of it ŷ, to be predetermined, since u(k–1) is already being applied. If it is desired to drive the plant to a set point, y°, the reference trajectory, y* is taken to be an exponential approach from the next (predicted) output, ŷ(k) to y°:

$$y^*_{k-1}(k+ig) = y° - [y° - \hat{y}(k)]\exp(i\xi), i=0, \qquad (13)$$

The entire reference trajectory is updated at each time step. The rate of approach is controlled by ξ. If ξ is small, the controller will try to slowly force the plant to reach y°. If ξ is very large, the controller will try to make the plant reach y° with every control move. Intermediate values of ξ make the controlled response a bit sluggish, but this greatly reduces overshoots after a step change in y° and makes the control inputs much smoother in the presence of noise.

In one embodiment, control strategies are restricted to those for which the control remains constant after the first $h_c$ time steps: $h_c$ is the control horizon. Often, $h_c=1$ will be sufficient. The various strategies are evaluated by considering their effect on the next $h_p$ output values; $h_p$ is the prediction horizon. It is required that $h_c \leq h_p$.

Figure 3A:
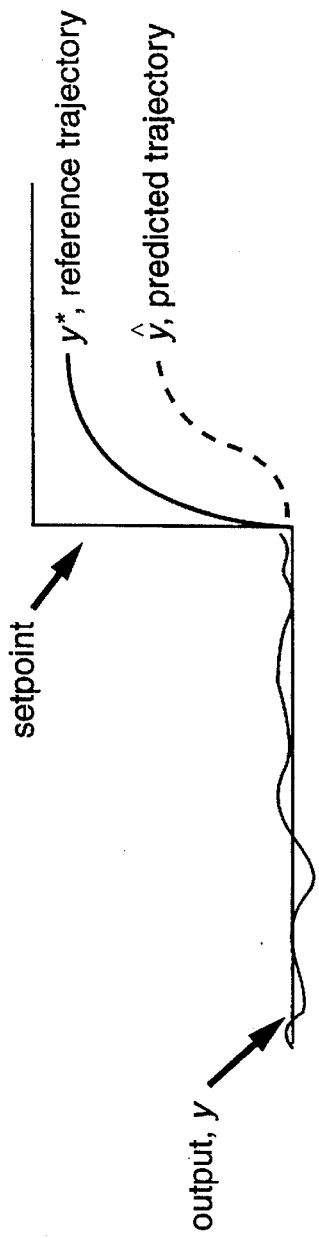
FIGS. 3A, 3B, and 3C graphically depict the operation of an MPC control scheme.
Figure 3B:
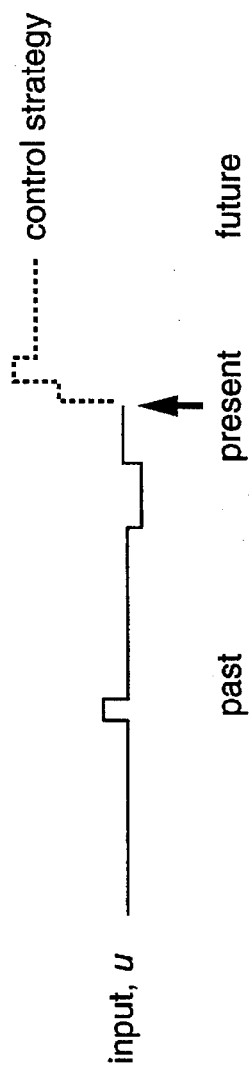
Figure 3C:
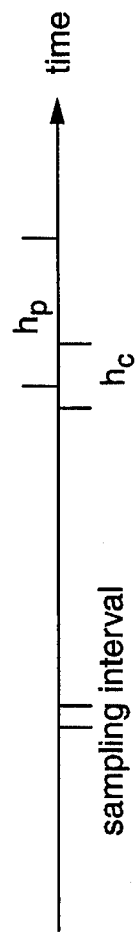

FIGS. 3A, 3B, and 3C are graphical illustrations of the operation of an MPC control scheme. Process values are shown at a time instant just prior to a change in set point (the shaded line in FIG. 3A). The history of the system in FIGS. 3A and 3B shows that the controlled input, u, has been adjusted to keep the plant output, y, near the set point. However, due to an anticipated set point change, y, will be far from its desired value at the next sampling instant. As shown in FIG. 3A, a reference trajectory is prepared to smoothly guide y toward the new set point value.

A candidate control strategy is shown as the dashed portion in FIG. 3B. The prediction of the resulting output trajectory is shown in FIG. 3A. During the next sampling interval, the reference trajectory will be recomputed based on the new output measurement. FIG. 3C shows the relation between the control and prediction horizons, as well as the relative length of a sampling interval. Here, $h_c=3$ and $h_p=7$ (the figure is drawn for g=1, i.e., a conventional MPC control). Note that the control strategy changes during the first three sampling intervals and then remains constant. The interval corresponding to $h_p$ is shifted by one sample from that for $h_c$ because only outputs in this interval are affected by the control strategy.

For a Single Input, Single Output (SISO) plant, a control strategy is obtained by determining a value of the control vector $\vec{u}$ that minimizes $$J(\vec{u}) = \sum_{i=1}^{h_p} W^y(\hat{y}(k+ig) - y_{k-1}*(k+ig))^2 + \qquad (14)$$

$$\sum_{i=0}^{h_c-1} W^u(\bar{u}(k+ig) - \bar{u}(k+ig-g))^2$$

over $\vec{u} = [\bar{u}(k), \ldots, \bar{u}(k+h_c g-g)]$. J is the "cost" of a given control strategy. The first term of J penalizes the difference between the predicted trajectory, ŷ, and the reference trajectory, $y^*_{k-1}$. The second term penalizes changes in the control inputs; this favors smooth controls. The weights $W^y$ and $W^u$ allow a tradeoff between the relative penalties for the output errors and changes in inputs. For a non-SISO plant, the first and second terms are $W^y$ and $W^u$ for each output and input. Also, these weights need not be constant; they may be profiled so that they vary over the horizon.

J is minimized under constraints on the range of each input and on the allowed change in each input from one time step to the next. These constraints can be different from one time step to the next over the horizon. In one embodiment of the present invention, the search for the minimum uses a conjugate gradient technique and the required gradients are calculated using an efficient recursive procedure. The cost minimization yields a control sequence $\bar{u}^*(k), \ldots, \bar{u}^*(k+h_c g-g)$. At time k, $\bar{u}^*(k)$ is applied, y(k) is measured, and the optimization process begins anew.

Given this general background, we now give some descriptions specific to our invention.

GAPPING

The idea behind gapping was introduced earlier in the description of the model structure: plant outputs sampled at a "fast" rate are averaged over intervals of g samples and, along with every g'th plant output, are fed into the model. Standard MPC methods are then used to find an optimal control input (g=1 corresponds to the conventional approach). The main distinction between this approach and that of simply sampling at a slower rate is that this process is repeated to yield a new control value at every fast time step. Thus, a control input updated at the fast rate is obtained by using a factor of g fewer model iterations for a fixed prediction interval. This greatly decreases the complexity of the operations required to perform the optimization. Also, since fewer model iterations are needed, the one-iteration prediction accuracy of the model need not be as high. This, along with the fact that a factor of g fewer model inputs are needed (for a fixed interval of plant history) means that a model that gives accurate long-range predictions is easier to obtain from a small amount of off-line data.

One way of viewing gapping is that the input samples are multiplied by a coefficient of 1/g and then summed to form the gapped input. This idea can be generalized by viewing these coefficients as weights and adapting them under the constraint that they sum to 1. In the present embodiment, all of these coefficients are equal.

BASIS CENTER ADJUSTMENT

To improve prediction and control response, the basis centers may be allowed to move with the state of the plant, i.e., training is done on-line. "Training of centers" refers to moving the existing centers or adding new centers (nodes) to the CNLS network. It is desirable to move the centers to enhance the capability of the network to track changes in the plant. The CNLS network is best able to approximate a function near it's centers (see equation (4) above). The network will have a harder time approximating the plant's behavior if the plant drifts into a regime that takes it far from all the centers. The addition of new centers allows the network to reach a size appropriate for the plant it is approximating.

The use of a fixed number of centers can decrease the capability of the network to control the plant. If the fixed size is too large, an excessive amount of off-line data will be necessary for the initial training (or, conversely, for a small amount off-line data, the initial training might be very poor). Also, a large number of centers will increase the computation times of all operations involving the network. If the fixed size is too small, the network may be unable to adequately approximate the plant. During adaptation, a small network may be forced to "forget" certain aspects of the plant's behavior. Note that nonlinear plants can have very different behavior between the modes of startup, operation, and shutdown.

In accordance with the present invention, network training is done using a relatively small number of nodes that are appropriate for the amount of available off-line data. During on-line training, a center can be added, moved, or remain unchanged depending on a simple set of rules. For each new data point, $(\vec{\chi}_k, \vec{y}_k)$, the network error, $|y_k - \phi(\vec{\chi}_k)|$, is calculated and no change is made if the error is less than a selected amount. If the error is greater than the selected amount, the center is either moved or a new center is added. Before adding or moving a center, the network center, $\vec{c}^*$ is found that is closest to $\vec{\chi}_k$. If the network error exceeds another selected number and the distance between $\vec{\chi}_k$ and $\vec{c}^*$ is greater that a predetermined distance, a new center is added at $\vec{\chi}_k$. Otherwise, $\vec{c}^*$ is moved toward $\vec{\chi}_k$ by a fraction of the distance between them. If a new center is added at $\vec{\chi}_k$, its gradient weights, the "$\vec{d}$" parameters, are set to zero and its linear weight, the "a" parameter, is set to a value that forces the new network output at $\vec{\chi}_k$ to equal $y_k$.

The addition of a center does perturb the predictions of the net. It may be desirable to decrease the magnitude of the allowed control changes and to suppress the addition of new centers for a short period of time following the addition of a center, so that on-line training can refine the weight values before spurious control actions are taken.

DIFFERENCE AND CURVATURE TRAINING

In one aspect of our invention, online training is done with difference and curvature training. The data acquired while the plant is being controlled tends to be highly correlated in time, which makes the data less suitable for a plain weight update scheme given in Equation (9). Difference and curvature training alleviate this problem by accentuating slow trends in the data.

Training data acquired from a system under control tends to be quite correlated from time step to time step. Problems from "overtraining" are reduced by training on the time series that results from differencing the output of the plant. The training scheme given in Equation (9) is an attempt to make the sequence of network outputs, $\phi(\vec{\chi}_k)$, match the sequence $y_k$. Analogously, difference training attempts to make the sequence of differenced network outputs, $\Delta\phi(\vec{\chi}_k)$ match the sequence of differenced y's, $\Delta y_k$, where $$\Delta y_k = y_k - y_{k-1}$$

and $$\Delta\phi(\vec{\chi}_k) = \phi(\vec{\chi}_k) - \phi(\vec{\chi}_{k-1})$$

The sequence $\Delta y_k$ will normally be much less correlated than $y_k$. Note that, because $\phi$ is linear in $\bar{w}$, $$\Delta\phi(\vec{\chi}_k) = \vec{w}^T(\vec{\tau}(\vec{\chi}_k) - \vec{\tau}(\vec{\chi}_{k-1})) = \vec{w}^T \Delta\vec{\tau}(\vec{\chi}_k)$$

Thus, the weight update for difference training has the same form as Equation (9), $$\vec{w} \leftarrow \vec{w} + \eta_d \Delta[y_k - \phi(\vec{\chi}_k)] \frac{\Delta\vec{\tau}(\vec{\chi}_k)}{\Delta\vec{\tau}(\vec{\chi}_k)^T \Delta\vec{\tau}(\vec{\chi}_k)} \quad (15)$$

Difference training can help the network identify slow linear trends in the data. This idea can be extended to help identify slow quadratic trends in the data, or regions of non zero curvature, by using the sequence of second differences. Let $$\Delta^2 y_k = \Delta y_k - \Delta y_{k-1} = y_k - 2y_{k-1} + y_{k-2}$$

with the corresponding definitions of $\Delta^2 \phi(\vec{\chi}_k)$ and $\Delta^2 \tau(\vec{\chi}_k)$. Again, because of the linearity of $\phi$ in $\vec{w}$, a weight update scheme that attempts to make $\Delta^2 \phi(\vec{\chi}_k)$ approach $\Delta^2 y_k$ is $$\vec{w} \leftarrow \vec{w} + \eta_c \Delta^2 [y_k - \phi(\vec{x}_k)] \frac{\Delta^2 \tau(\vec{x}_k)}{\Delta^2 \tau(\vec{x}_k)^T \Delta^2 \tau(\vec{x}_k)} \quad (16)$$

During on-line training, each new data point is used to update the network's weights by applying the three updates described above. The learning rate for the normal update, $\eta_n$, is usually chosen to be much smaller than $\eta_d$ and $\eta_c$. It will be appreciated that the improved system operation that results from on-line basis center adjustment and difference and curvature training will occur even under conventional MPC control and is not limited to gapped output control values.

Referring now to FIGS. 2, 2A, 2B, 2C, and 2D, there are shown schematics in block diagram form of a control system according to one embodiment of the present invention. It will be understood that the component parts shown in the figures may be discrete electrical components and dedicated electronic processors or may be programmed general purpose computers. In addition, the process steps performed by the illustrated components may be provided in additional components or may be reassigned to components other than as illustrated and the figures should not be construed as limitations on the specific component that has a circuit configuration to perform a designated function.

Figure 2:
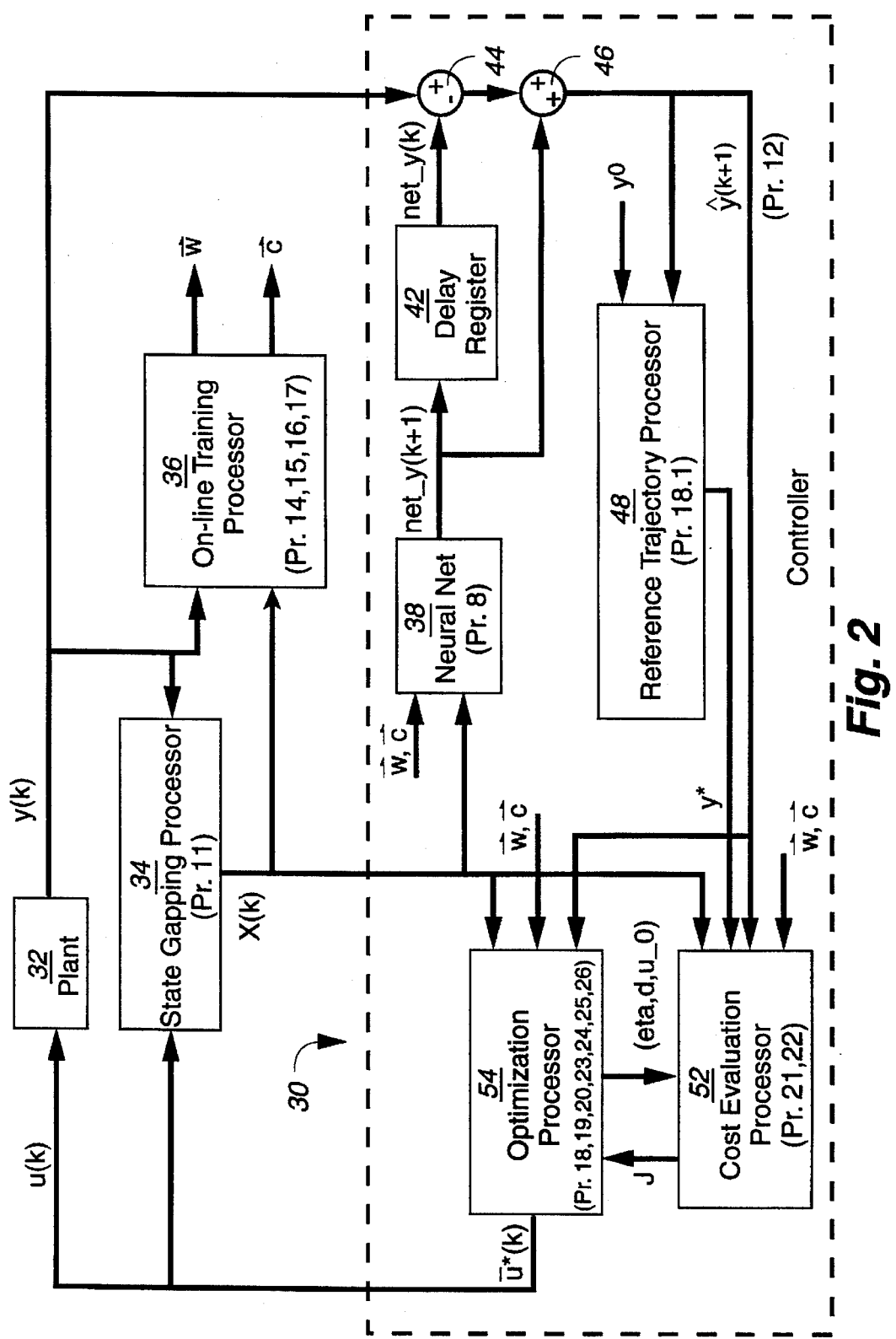
FIGS. 2, 2A, 2B, 2C, and 2D are schematics in block diagram form of a control system according to one embodiment of the present invention.
Figure 2A:
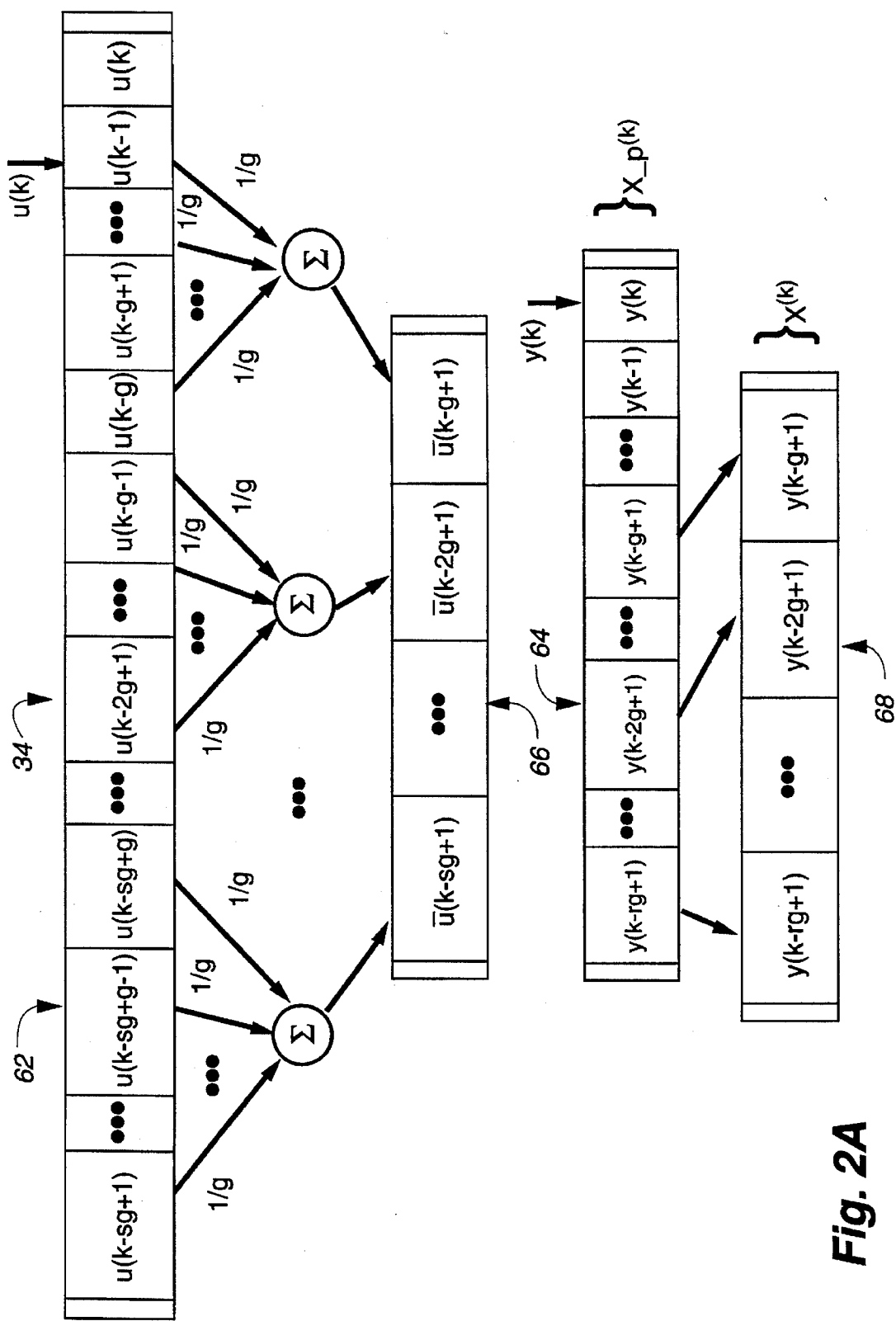

FIG. 2 generally depicts a MPC control system 30 for adjusting one or more output process parameters $y_k$ of plant 32 by providing an input control signal value $u_k$. For ease of discussion, each component includes reference to the process steps more particularly described in the Appendix hereto, e.g., by reference to Pr 11 for process 11 that constructs a network state from the plant's state. Further, the control process is taking place at time $t_k$, where k represents a fast time sequence at time intervals k. The term g, discussed above, is a gapping" number greater than, or equal to one that designates a number of time intervals k. Thus, at the start of a time interval $(t_k, t_{k+1})$ an input control value $u_k$, and its associated output process parameter $y_k$ from plant 32 are sampled and input to state gapping processor 34 (see FIG. 2A) and to online training processor 36 (see FIG. 2B).

State gapping processor 34 maintains a register of sampled control inputs u and plant parameter outputs y over a number of selected short time intervals, i.e., fast sampling rate. This register of stored values is the "plant state" (see Appendix). At the start of each short time interval, processor 34 generates a sequence of averaged old plant control inputs (Equation (7); Process 11) over a selected sequence of gapped time intervals, g, and associated process parameter values at the gapped time intervals to form the network state vector X(k). Network state vector X(k) is input to on-line training processor 36, neural net 38, optimization processor 54, and cost evaluation processor 52.

Neural net 38 is initially trained off-line (Processes 2, 3, 4, 5) to establish its internal weights $\overline{w}$ and basis center locations $\vec{c}$. In accordance with the present invention, on-line training processor 36 assesses and updates the trained parameters $\overline{w}$ and $\vec{c}$ at each time step k, as explained below for FIGS. 2B, 2C, and 2D. The updated trained parameters are provided to neural net 38, cost evaluation processor 52, and optimization processor 54, i.e., all of the processors that employ the neural net to provide a predicted output from an applied input control value. Neural net 38 provides a predicted plant process parameter $net_{13}\, y_{k+1}$ for the next time step (k+1).

It is found that applying a "fast correction factor" is beneficial to the control obtained by the MPC system. Accordingly, the predicted output is input to delay register 42, which outputs the last predicted process parameter value, net_$y_k$, to subtraction circuit 44. Subtraction circuit 44 subtracts the predicted parameter value from the actual parameter value to output an error value to addition circuit 46. The error is added to the current predicted output parameter value to form a corrected prediction, $\hat{y}_{k+1}$ (Process 12) for further processing by controller 30 in reference trajectory processor 48, cost evaluation processor 52, and optimization processor 54.

Reference trajectory processor 48 provides a series of desired output values at future time steps $(t_{k+1}, t_{k+2}, \ldots)$ along a computed reference trajectory (e.g., Equation 14) to reach a controlled process parameter value $y^0$ (Process 18.1). The trajectory, $y^*$, is output to cost evaluation processor 52.

Cost evaluation processor 52 computes a cost function J (Equation 15) associated with the control strategy (u_0+ d*eta) (Process 21) from the net state vector X(k), predicted output $\hat{y}_{k+1}$, reference trajectory $y^*$, and network parameters $\vec{w}, \vec{c}$ (Process 21). The cost J is output to optimization processor 54 for use in optimizing the control strategy (Processes 18, 19, 20, 23, 24, 25, 26) to output an applied input control value $\overline{u}^*(k)$ that is being applied to plant 32 at time $t_k$. In general, the optimum control strategy will provide the minimum change in control strategy that will move the output process parameter along the desired trajectory.

Figure 2B:
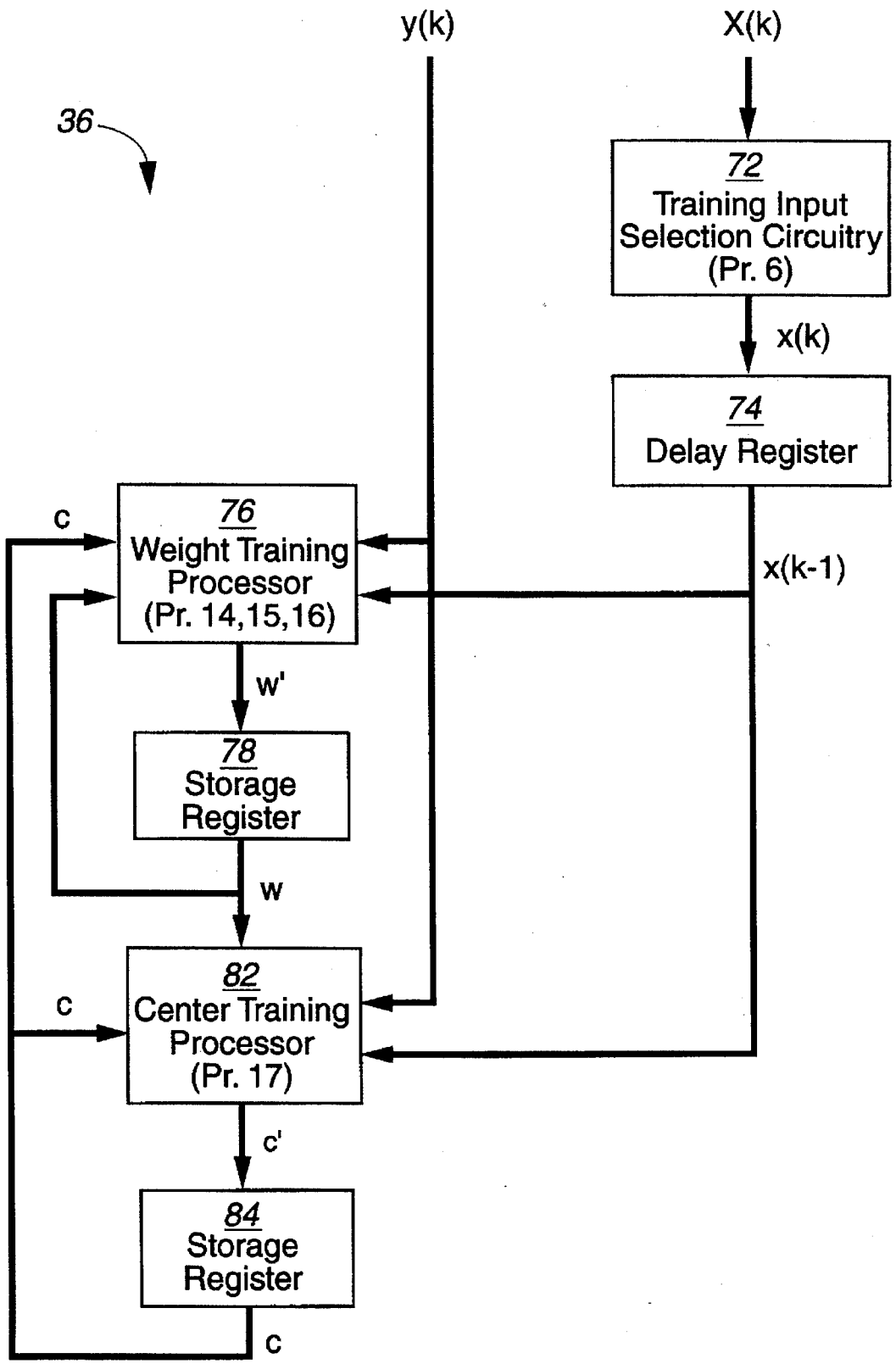

FIG. 2B more particularly presents a block diagram schematic of state gapping processor 34. An input storage register 62 provides for storing a sequence of input control values over a selected number of time steps, e.g., $t_{k-sg+1}$ to $t_k$, where g is the gap value. An output storage register 64 provides for storing a sequence of output plant process parameters, y, over a selected number of time steps, e.g., $t_{k-sg+1}$ to $t_k$, where g is the gap value. Processor 34 forms the net state vector, $$X(k) = (y_{k-g+1}, \ldots, y_{k-rg+1}, \overline{u}_{k-g+1}, \ldots, \overline{u}_{k-sg+1}),$$

over time intervals of gapped duration g. Note that the values are taken only at the slower gapped rate, i.e., each output process parameter, y, is selected at k-ig intervals, where i=1 to r. Each input value is formed from by dividing each applied value by the gap value, g, and summing the input values, u/g, over the gap to provide an average of the applied input control values, e.g., $$\overline{u}_{k-g+1} = \frac{u_{k-g+1} + \ldots + u_k}{g}.$$

In accordance with another aspect of the present invention, FIG. 2B presents a block diagram schematic of a system for on-line training of a single net. A single net is selected to simplify the presentation, but on-line training is not limited to a single net. Net state vector X(k) is input to training input selection circuitry 72, which outputs a net output training vector x(k) to delay register 74 (Process 6). The output of delay register 74 is the previous net training input x(k−1). The current plant output y(k) and net training input x(k−1) are provided to weight training processor 76

(FIG. 2C) and center training processor 82 (FIG. 2D) for use in updating weights W and basis center locations C. Weight training processor 76 is input with a current value of the network weights W and basis center locations C and outputs updated weights W' to storage register 78 (Processes 14, 15, 16). Updated weights W' then become the current weights W. Center training processor 82 receives the current value of weights W and center locations C and outputs an updated basis center location, if any, as C" (Process 17). The updated basis center location C' is stored in storage register 84 to become a current basis center location C.

Figure 2C:
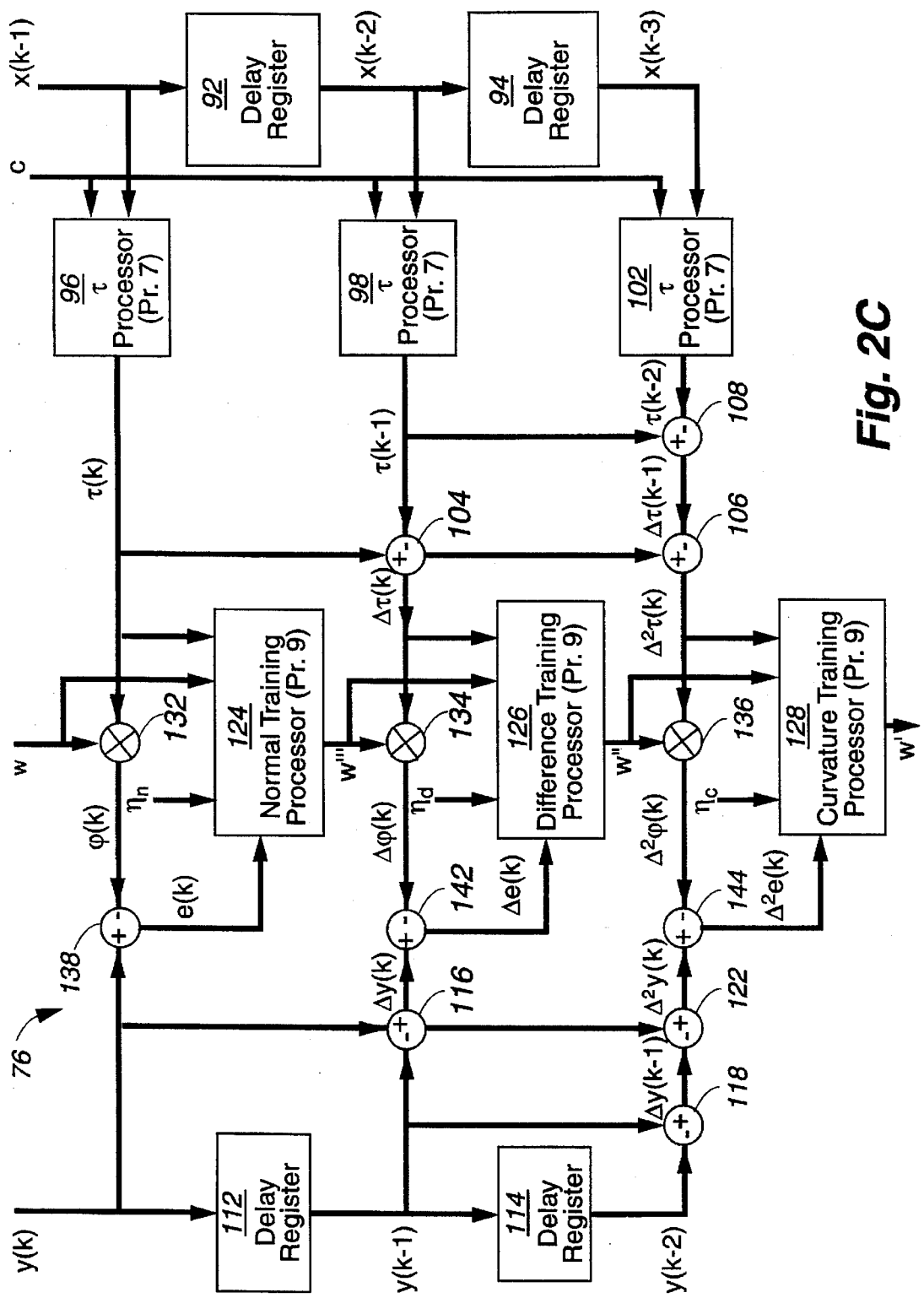
Figure 2D:
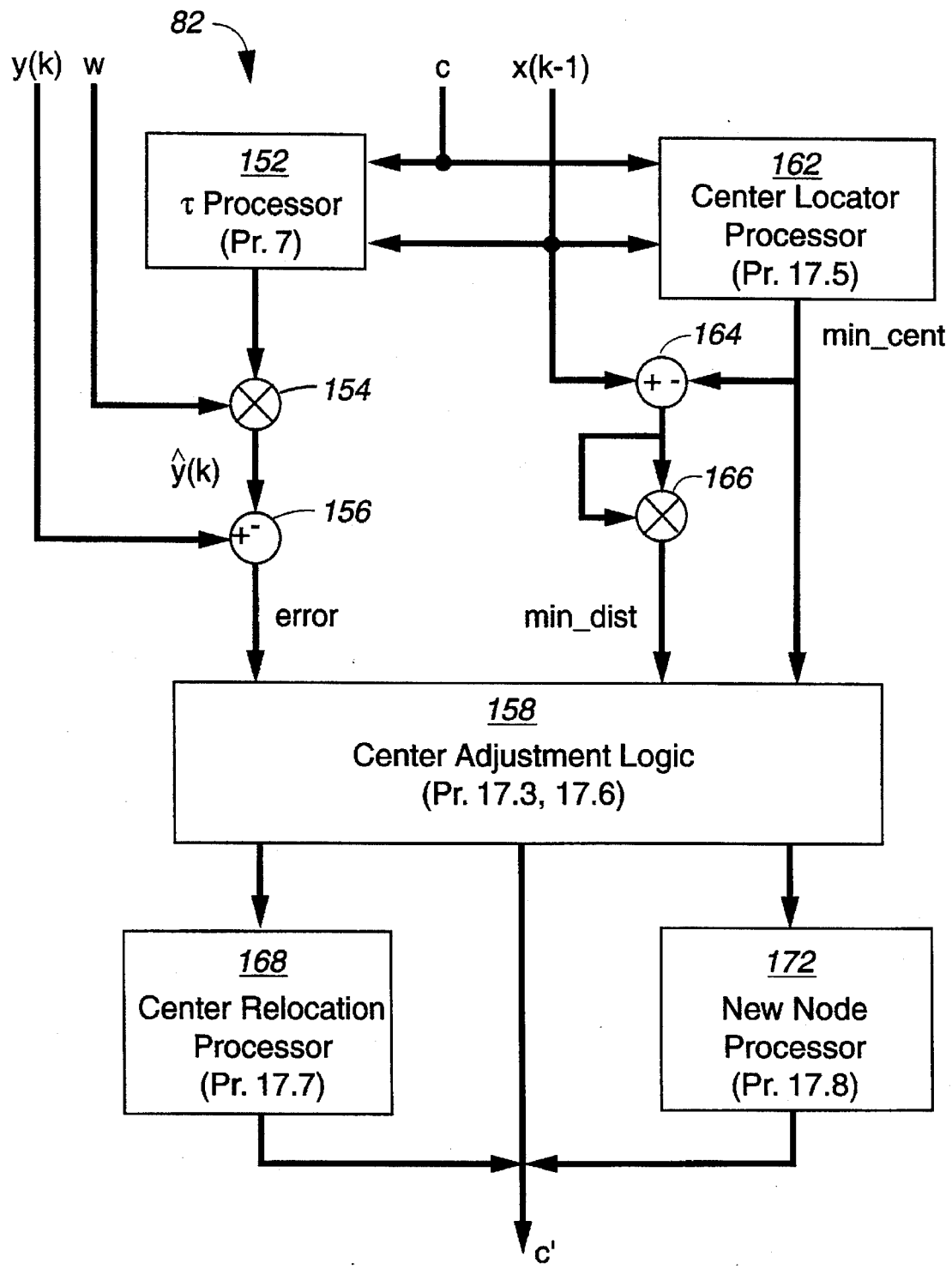

FIG. 2C is a schematic, in block diagram form, of a processor 76 for performing difference and curvature training to up-date processor weights W in response to plant process output parameters. The inputs to processor 76 are the current process parameter output $Y_k$, current weights W, updated basis center locations C, and net state x(k−1) from the last time step. The net state x(k−1) is input to delay registers 92 and 94, which output net states x(k−2) and x(k−3), respectively. Net states x(k−1), x(k−2), and x(k−3) are input to tau ($\tau$) processors 96, 98, 102, respectively, to output $\tau$(k), $\tau$(k−1), $\tau$(k−2) (Eq. 11; Process 7). The $\tau$ values are combined in subtractors 104, 106, 108 to obtain the training values $\tau$(k), $\Delta\tau$(k), $\Delta^2\tau$(k) for further processing.

Likewise, plant process output parameter y(k) is input to delay register 112, which outputs y(k−1) to delay register 114, which outputs y(k−2). The sequence of output process parameters is combined in subtractors 116, 118, 122 to obtain training values y(k), $\Delta$y(k), and $\Delta^2$y(k).

Weight values W are first updated in normal training processor 124. The value $\tau$(k) is input to processor 124 and is combined with weight W through multiplier 132 to produce a predicted plant process parameter $\phi$(k). The predicted value $\phi$(k) is combined with the actual value y(k) to obtain error e(k) for input to processor 124 (Eq. 15; Process 9). A selected normal training rate $\eta_n$ is supplied to processor 124, which outputs an updated weight W'''.

Updated weight W''' is provided as an input to difference training processor 126 (Eq. 15; Process 9) and is combined with $\Delta\tau$(k) in multiplier 134 to output $\Delta\phi$(k). This difference value is combined with differential output process parameter $\Delta$y(k) to obtain differential error $\Delta$e(k). The differential error, updated weight W''', and $\Delta\tau$(k) are input with a difference training rate $\eta_d$ to difference training processor 126, which then outputs an updated weight W".

The third correction in the training process is provided by curvature training processor 128 (Eq. 16; Process 9). Updated weight W" is provided as an input to curvature training processor 128 and is combined with $\Delta^2\tau$(k) in multiplier 136 to output $\Delta^2\phi$(k). This curvature value is combined with curvature output process parameter $\Delta^2$y(k) to obtain curvature error $\Delta^2$e(k). The curvature error, updated weight W", and $\Delta^2\tau$(k) are input with a curvature training rate $\eta_c$ to curvature training processor 128, which is then output as a final updated weight W'.

W' then becomes W, which is then input to center adjustment processor 82, along with process output parameter y(k), centers location C, and net state x(k−1). Center locations C and net state x(k−1) are provided to $\tau$ processor 152 (Process 7) and center locator processor 162 (Process 17.5). The output of $\tau$ processor 152 is combined with W in multiplier 154 to output $\hat{y}$(k), which is subtracted 156 from y(k) to obtain a network error. Processor 162 determines the location of the closest center to x(k−1) and outputs that value to center adjustment logic 158 and to subtractor 164, which outputs a difference value between x(k−1) and the possible centers from processor 162. This difference is squared 166 to determine a distance between a present center in C and a possible new center. Center adjustment logic (Processes 17.3, 17.6) then determines whether to add a center, to move existing centers, or to take no action when the errors are not sufficiently large.

Briefly, center relocation processor 168 (Process 17.7) provides an adjustment of a center toward x(k−1) if the errors are within certain limits. The present centers are retained if the error does not reach a minimum value. New node processor 172 (Process 17.8) adds an additional node if the error exceeds a selected upper limit. In all events, an updated center location C' is output from center training processor 82.

Figure 6:
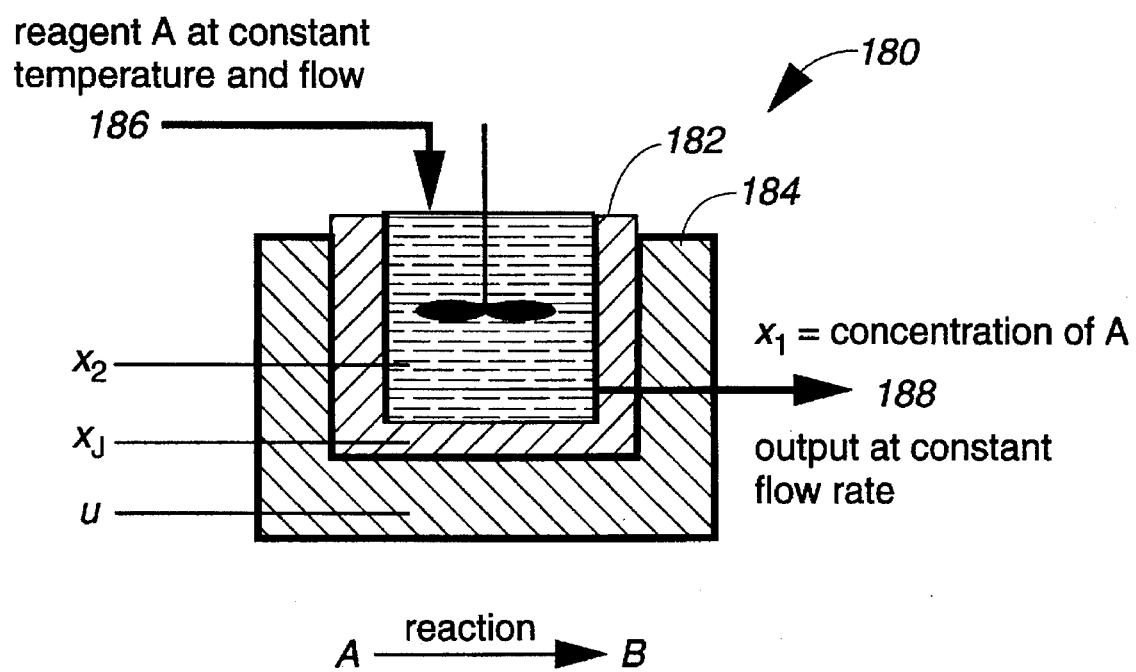
FIG. 6 is a schematic illustration of a continuously stirred tank reactor (CSTR).

These improvements to MPC have been applied to a number of simulated systems, including a Continuously Stirred Tank Reactor (CSTR) 180 shown in FIG. 6 and a variety of distillation columns. For the distillation columns, gapped control is essentially necessary because the columns have multiple inputs and outputs. If more than two or three past values of each input and output are fed into the net, the amount of training data and time necessary to achieve adequate prediction accuracy is prohibitive.

In the following, we will show the results of applying the MPC controller to a simulated exothermic CSTR with jacket dynamics using various combinations of the improvements described in this application. In the CSTR, a chemical reaction takes place inside a jacket 182 immersed in a heat bath 184. The control input to the plant (u) is the temperature of the heat bath. There is a constant flow 186 of reagent A at constant temperature into the jacket and a constant flow of product 188 (of concentration x1 in reagent A) out of the jacket. In steady state, the product concentration, x1, is a function of the reactor temperature, x2. Since x2 can be measured much more readily than x1, we will take it as the output of the system and attempt to control it to various setpoints.

The CSTR is a difficult control problem because it is nonlinear and has unstable equilibrium points. Control becomes harder yet if the jacket dynamics, or heat transfer properties of the jacket, are taken into account. Except in steady state, the temperature of the heat bath, u, is not equal to that of the jacket, xJ. This introduces a time lag between the control input and the jacket temperature. The unstable nature of this nonlinear plant and the time lag in the control make long prediction horizons with an accurate model necessary.

Figure 7:
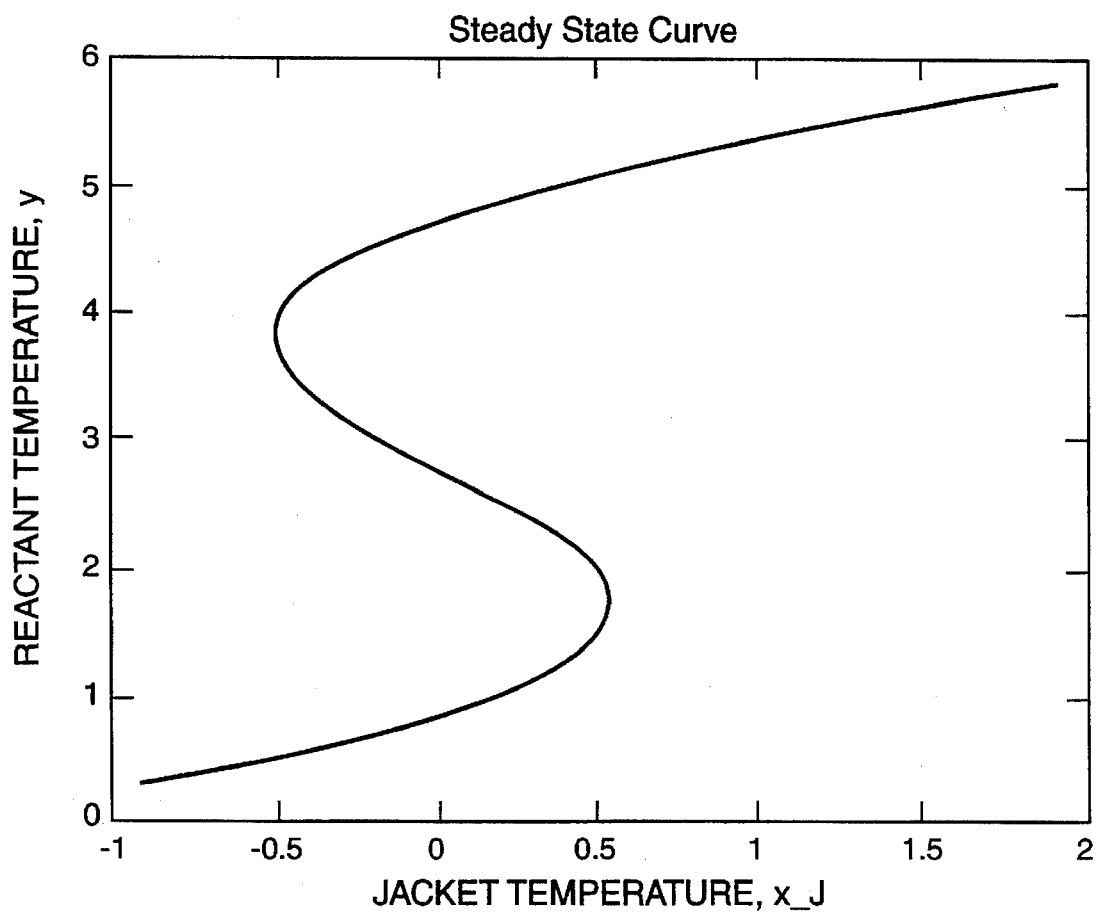
FIG. 7 graphically illustrates a steady-state operating curve for the CSTR.

One feature of the exothermic CSTR which makes it difficult to control is the fact that it has unstable equilibrium points. FIG. 7 shows the steady state operating curve for the CSTR. Points on the upper and lower segments of the curve, where xJ is between −1.0 and 0.5 and between −0.5 and 2.0, are stable. Points on the middle segment of the curve, where xJ is between −0.5 and 0.5, are unstable. Our objective will be to drive the system back and forth between a setpoint on the lower segment and a setpoint on the middle segment. This is especially difficult when there is a lag in the control due to the jacket dynamics.

In all of the simulations shown here, the input structure to the neural network was three past values of plant output and three past values of control input. Also, M=10 basis functions were used, and $\beta$, the basis function width, was set to 6.0 on all nodes. The control input was constrained to be between 1.3 and −1.0, and the maximum magnitude of a control change was set to 0.8. The learning rate for normal on-line training was set to $\eta_n$=0.1. The weighting on tracking error, $W^y$ was set to 1.0 and the weighting on control moves, $W^u$ was set to 0.1. The control horizon, $h_c$, was set to 1. For the initial comparison between gapped and ungapped control, the sampling period was taken to be 0.5 (this corresponds to the time index k). Additional parameter values or changes to these will be noted as they are needed.

Figure 8:
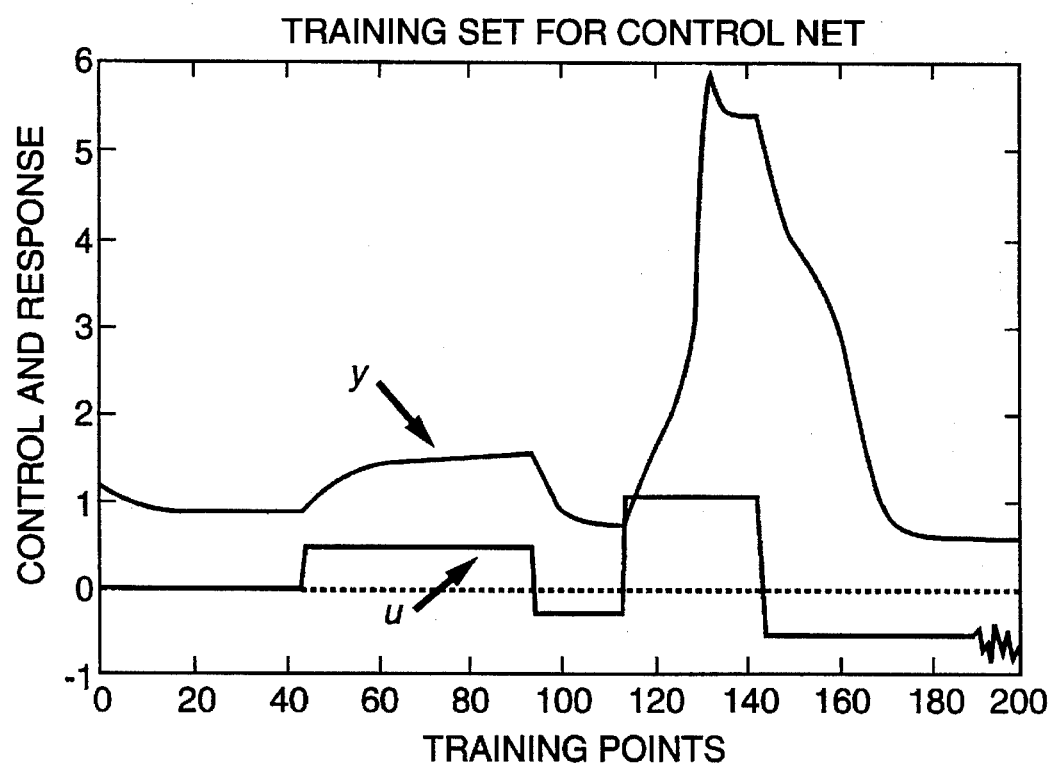
FIG. 8 graphically depicts exemplary training data for the CSTR.

The off-line training data was generated by subjecting the system to a period of constant control inputs of random height and duration, followed by a short interval of the same type of input with a small amount of noise added to it. FIG. 8 shows a sample of such training data. Note that there is very little data within the unstable region, where y is between 1.5 and 4.0. In all, there are only 200 training points.

In the simulations, the plant is started in equilibrium near y=1.0 at time zero, and the setpoint is set to 3.0. At time 60 (sample 120) the setpoint is changed to 1.0, and at time 120 (sample 240) it is changed back to 3.0.

Figure 9A:
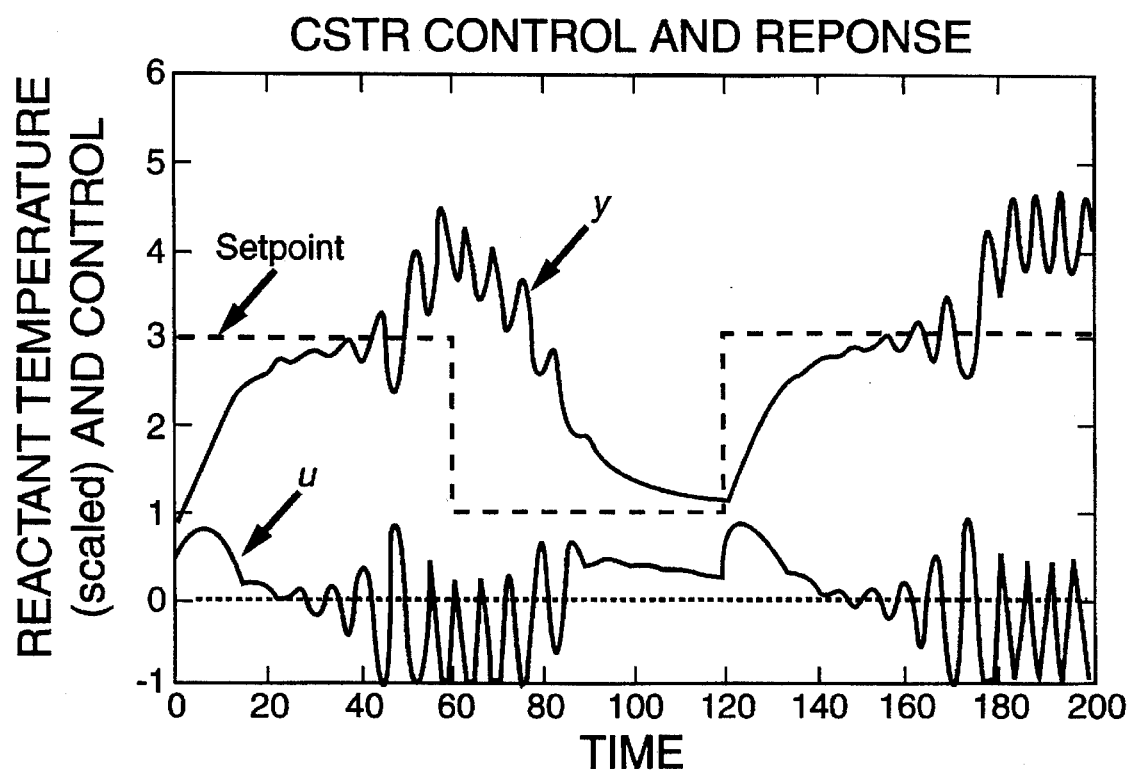
FIGS. 9A, 9B, 9C, 9D, 9E, and 9F graphically depict the simulated control and response of the CSTR under various conditions including control according to the present invention.

First, we give the results for conventional control, with just normal on-line training and g=1. After some experimentation, we found that the best results were obtained with a prediction horizon of $h_p=6$ and $\xi=0.075$. A longer prediction horizon would have been desirable, but the off-line training data was not sufficient to permit this. The response of the controlled system, shown in FIG. 9A, is quite poor. The system does not track the setpoint at 3.0. Note the pattern of oscillations in the output after time 180. This oscillation is completely out of phase with the control, and has a period of 10 to 12 sample times. This indicates that the CSTR appears roughly as a lag of 5 or 6 sample times, and the controller is unable to even predict this far into the future with any accuracy.

Figure 9B:
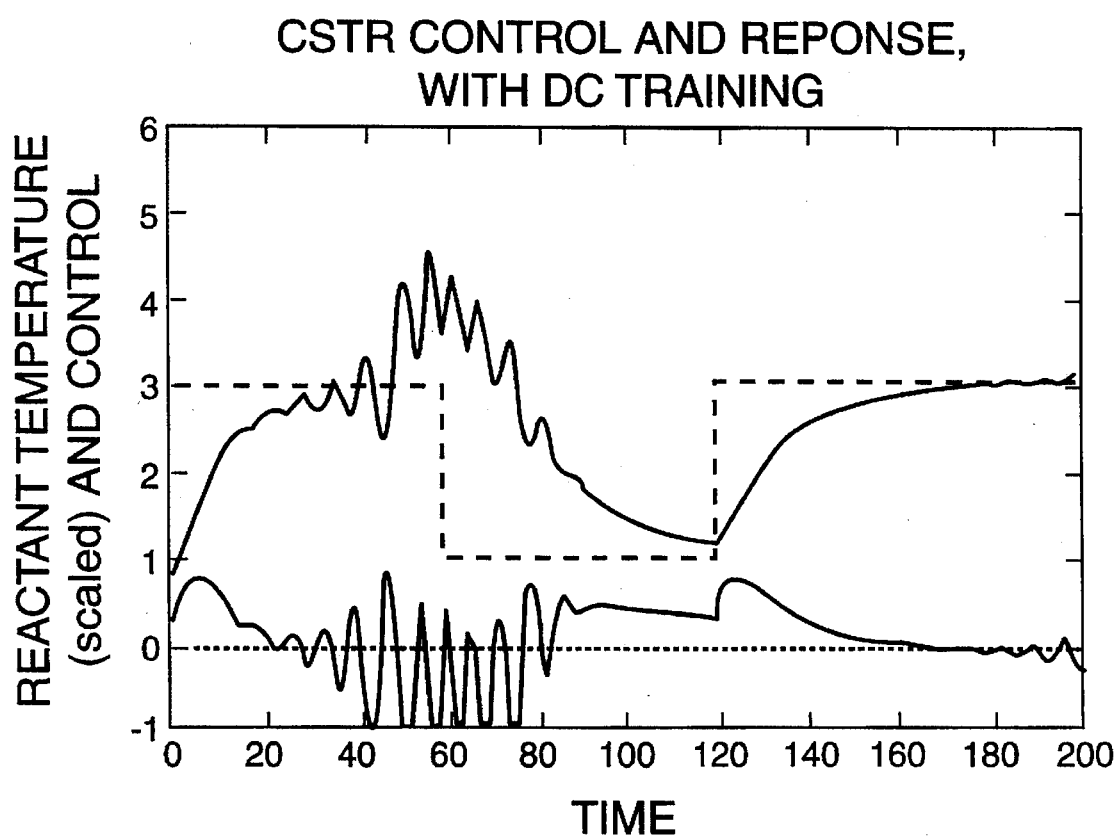

The next figure, FIG. 9B, shows the result of incorporating difference and curvature training, both with learning rates of 0.09. The initial response is much the same, since the on-line training has not had time to affect the weights. The second approach to the setpoint of 3.0 is much improved. Note, however, that oscillations are visible near the end of the plot. This response eventually became unstable around the setpoint of 3.0, perhaps because the prediction horizon was fixed at 6.

Figure 9C:
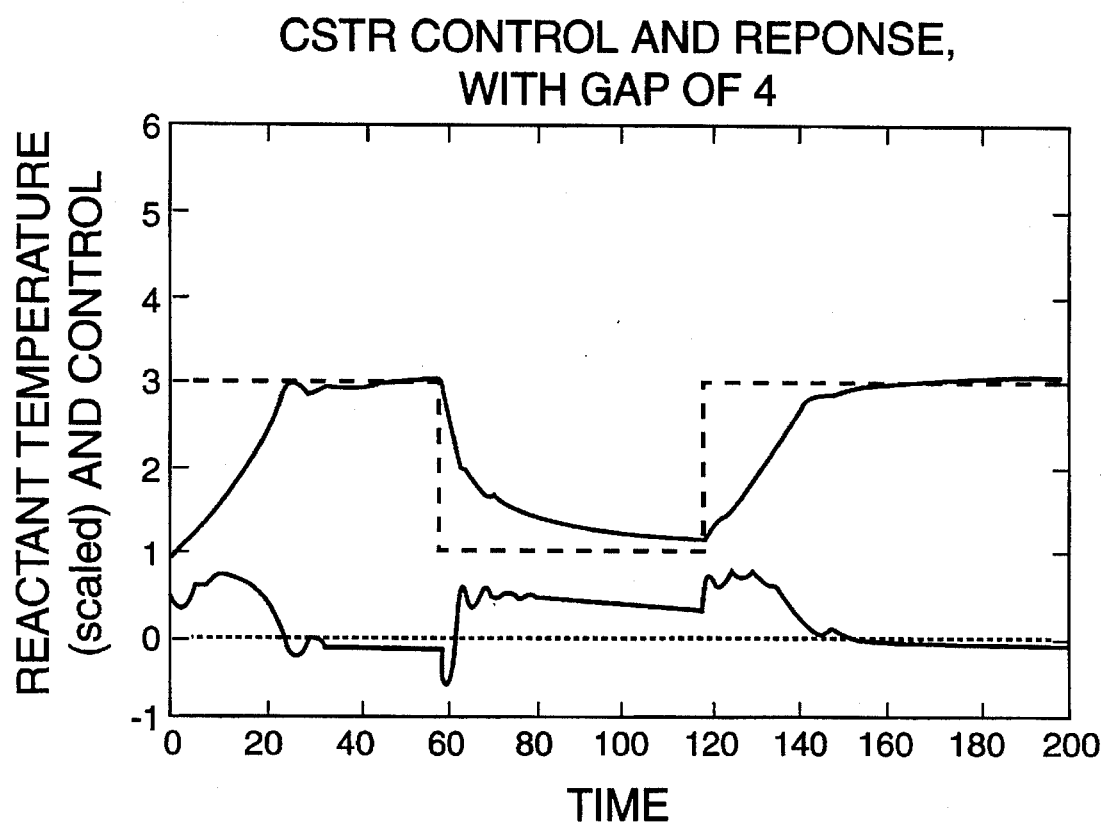

The next plot, FIG. 9C, shows the result of incorporating gapping, with just normal on-line training. Here, g=4 was used, $\xi$ was increased to 0.2, and the prediction horizon was set to 3.0. This gapping factor and prediction horizon mean that the controller is effectively predicting ahead by 3*4=12 timesteps. Although the network is not able to make one-iteration predictions that are as accurate as those of the ungapped network, the fact that each iteration results in a 4 timestep prediction more than compensates for this. As FIG. 9C shows, the controlled response with gapping is greatly improved over that in FIG. 9A. However, continuing the simulation in FIG. 9C for a long time period reveals that the response at the setpoint of 3.0 eventually starts to oscillate and become unstable. This is due to the fact that only normal training is being done; without normal training it remained stable.

Figure 9D:
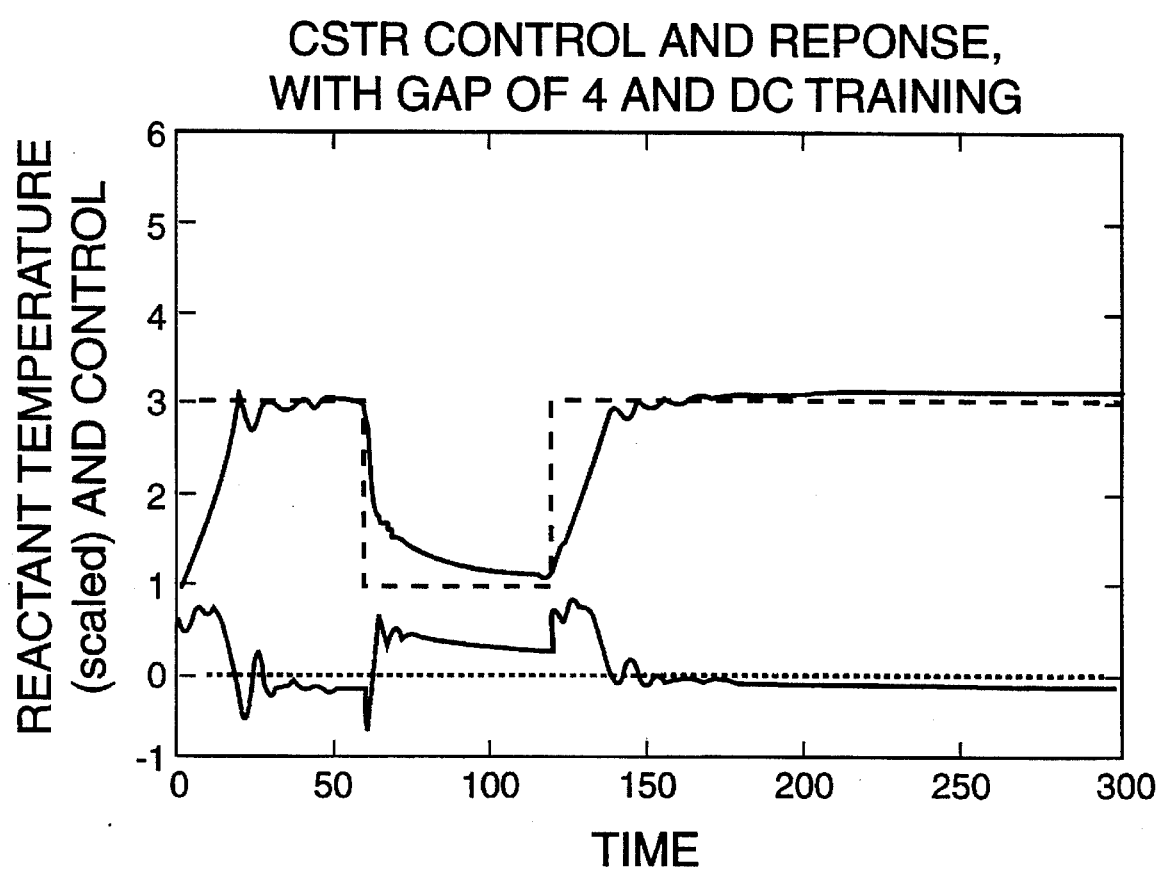

The next figure, FIG. 9D, shows the results of combining gapping and difference and curvature training. The gap was kept at g=4, but the rate of approach was increased to $\xi=0.3$ and the prediction horizon was increased to $h_p=4$. This results in more aggressive control and is possible because of the better predictions that arise from more effective on-line learning. The response in FIG. 9D is similar to that in FIG. 9C. The approach to setpoint is faster in FIG. 9D (do note, though, the change in scale on the time axis), although there is slightly more oscillation due to the higher value of $\xi$. More importantly, the response is stable at the setpoint of 3.0. We continued the simulation out to time 600 with no variation from the setpoint.

Figure 9E:
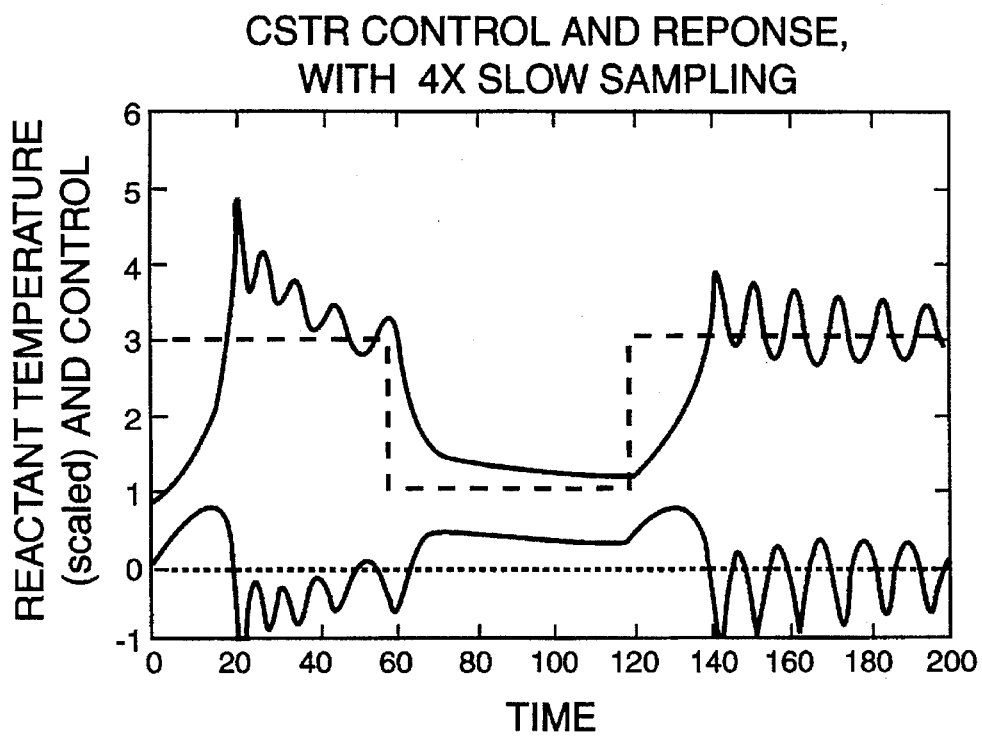
Figure 9F:
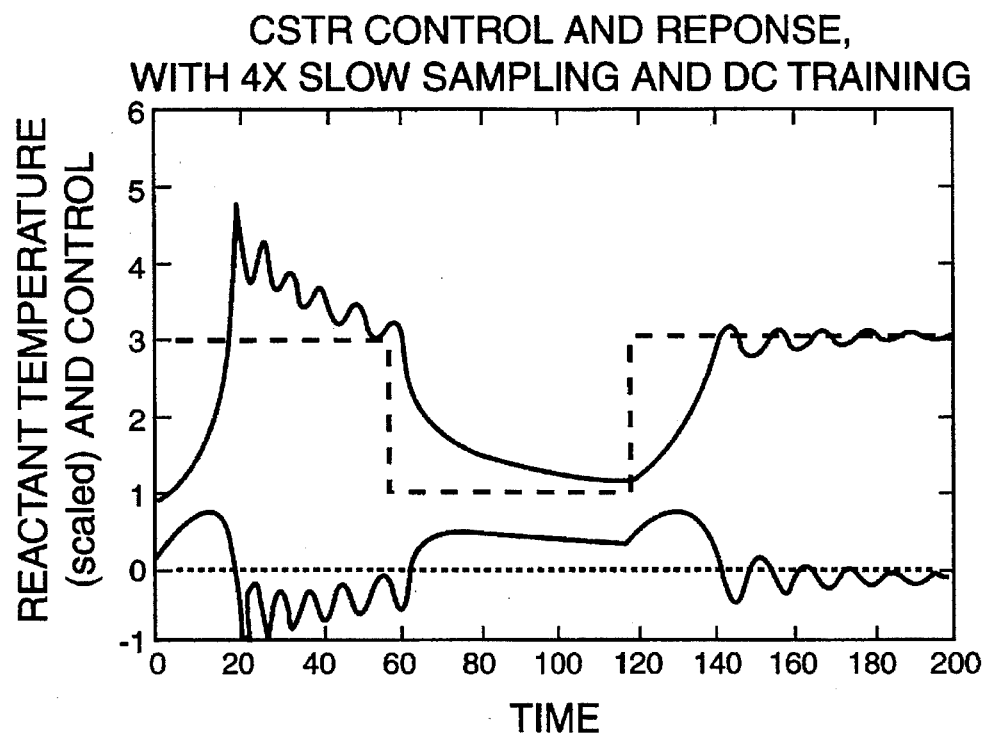

There is a concern that the ungapped response is poor compared to the gapped response simply because the sampling interval may be too small. FIG. 9E shows that this is not the case. Here, we used ungapped control, but set the sampling interval to 4*0.5=2.0 to match the gapped timestep. We found that $\xi=0.5$ and a prediction horizon of 3 gave one of the better responses. The response in FIG. 9E still does not compare favorably with the gapped response in FIG. 9C, partly because the slower sampling rate for conventional control requires that the controls be updated less frequently as well. FIG. 9F shows the improvement that results by incorporating difference and projection training.

The neural network-based predictive controller described above is more particularly described in the Appendix hereto, Annotated MPC Flowchart, along with FIGS. 10 through 35. The Appendix describes the processes carried out by the component parts of FIG. 2 in updating plant control inputs and in on-line training of the MPC system.

APPENDIX

Annotated MPC Flowchart 1.0 Introduction

Figure 4:
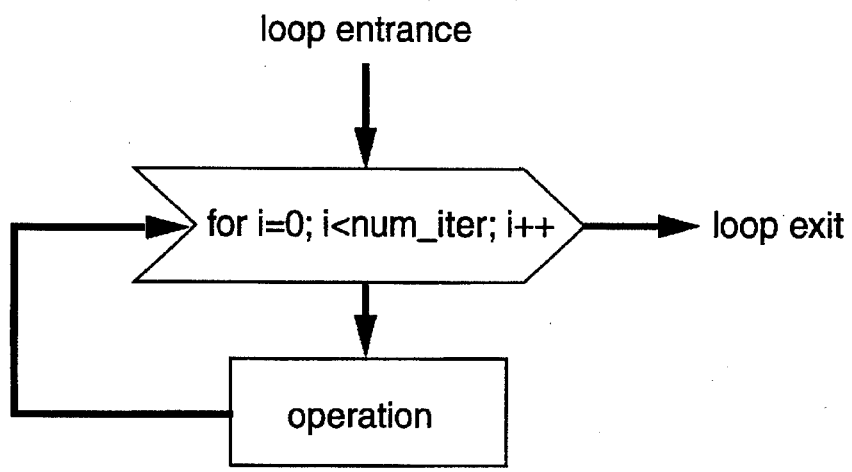
FIG. 4 is an exemplary flow chart illustrative of FIGS. 10–35.

This flowchart describes the details of the neural network-based model predictive controller. For reasons of clarity and conciseness, this flowchart is annotated: details and explanations associated with each step of the flowchart are given in a separate, cross-referenced list. The wording within the flowchart is either plain English or "pseudo-code" in C syntax. The symbols within the flowchart are modifications of standard flowchart symbols. Briefly, a plain rectangle denotes a basic operation, an elongated diamond represents a decision block (with Yes or No branches), a rectangle with a double border represents an operation that is detailed in another section of the flowchart, and an arrow-shaped box represents the control structure for a loop. Thus, in the exemplary flowchart segment of FIG. 4, "operation" would be performed "num_iter" times upon entering the loop.

Figure 5:
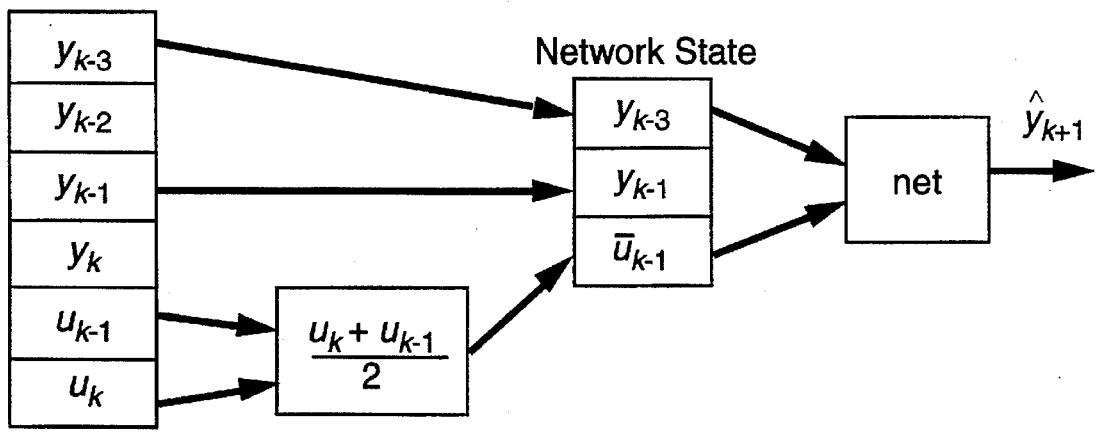
FIG. 5 schematically illustrates the information contained in plant and network states and the relation between the states.

Two concepts that are not explained in the annotations are the "plant state" and the "network state" at time k, usually denoted X_p(k) and X(k), respectively. The network consists of a number of nets, each of which forms a prediction of a given plant output. The network state is a storage area that contains pabst plant and network inputs and outputs. At a given time, the network state contains all the input/output information needed to compute the gapped predictions of the plant output for a given future input sequence. Likewise, the plant state contains all the input/output information needed to compute predictions of the plant output at each sampling instant for a given future input sequence. When gapping is not being performed (i.e., g=1), the two states are equivalent. A brief example should help clarify these concepts. Suppose that the sample gap is g=2, and the network contains only one net. Also, suppose that this net predicts the next plant output as $\hat{y}_{k+1}=\phi(\bar{u}_{k-1},y_{k-3})$, where the averaged input $\bar{u}_{k-1}=(u_k+u_{k-1})/2$. Thus, in order to calculate the next gapped prediction, $\hat{y}_{k+3}$, the value of $y_{k-1}$ must be stored in the network state. FIG. 5 shows the information contained in the plant and network state in this instance as well as the relation between them. Note that the network state is a linear combination of elements of the plant state.

2.0 Flowchart Constant Definitions

The following is an alphabetical listing of the pre-defined constants used in the flowchart. Where appropriate, default values for the constants are given and the manner in which the controller performance is affected by the constants is explained.

add_thresh: Unless the net error exceeds this value, a new node will not be added to that net during center training (instead, and existing center may be moved).

beta: number which controls the width of the basis functions cg_searches: the maximum number of conjugate gradient sweeps to perform when finding a optimal control strategy dc_mult: a factor that scales online_rate to determine the difference and curvature training rates eta_max: determines the size of the interval over which the line search is performed h_c: the control horizon h_p: the prediction horizon in_size: vector which holds the number of inputs to each net ls_steps: the number of line search iterations to perform; each iteration cuts the search interval in half LVQ_delta: determines the amount an existing center may be moved during center training (LVQ=Linear Vector Quantization).

LVQ_thresh: when the net error is less than this value, that net will not undergo center training max_cycles: maximum number of epochs (sweeps through data) during off-line training max_basis: the maximum number of nodes allowed in each net max_time: the number of time steps for which controls are to be generated min_cycles: minimum number of epochs during off-line training.

min_delsd: if the change in the net's testing error falls below this in off-line training, training will stop.

min_sd: if the net's testing error falls below this in off-line training, training will stop.

min_train_err: in on-line training, if the net error is less this, the normal training will not be done.

n_state_len: the number of elements in the network state num_nodes: vector containing the number of nodes in each net.

num_test: number of off-line testing points num_train: number of off-line training points num_u: the number of control inputs num_y: number of model outputs, or, equivalently, the number of networks off_line_rate: training rate used during off-line training online_rate: training rate used during regular on-line training p_state_len: the number of elements in a plant state scale_X_p: array which contains the scale factors for mapping the plant state onto the network state (see Process 11.)

sep_thresh: unless the distance from the current data point to the centers of the net exceeds this value, a new node will not be added during center training (an existing center may be moved, instead)

setpoint: an array which contains the setpoint for each plant output.

train_c: Boolean constant to enable/disable curvature training train_d: Boolean constant to enable/disable difference training train_n: Boolean constant to enable/disable normal training xi: determines the rate at which the target trajectory approaches the setpoint Wy, Wu: weights used in computing the cost function X_test_data: source of net inputs during off-line testing X_train_data: source of net inputs during off-line training y_test_data: source of desired net outputs during off-line testing y_train_data: source of desired net outputs during off-line training where_in_net: integer array which describes how elements of the network state are mapped onto each net's state (see Process 6.).

where_in_X: integer array which describes how scaled elements of the plant state are mapped onto the network state (see Process 11.)

3.0 Flowchart Process

Figure 10:
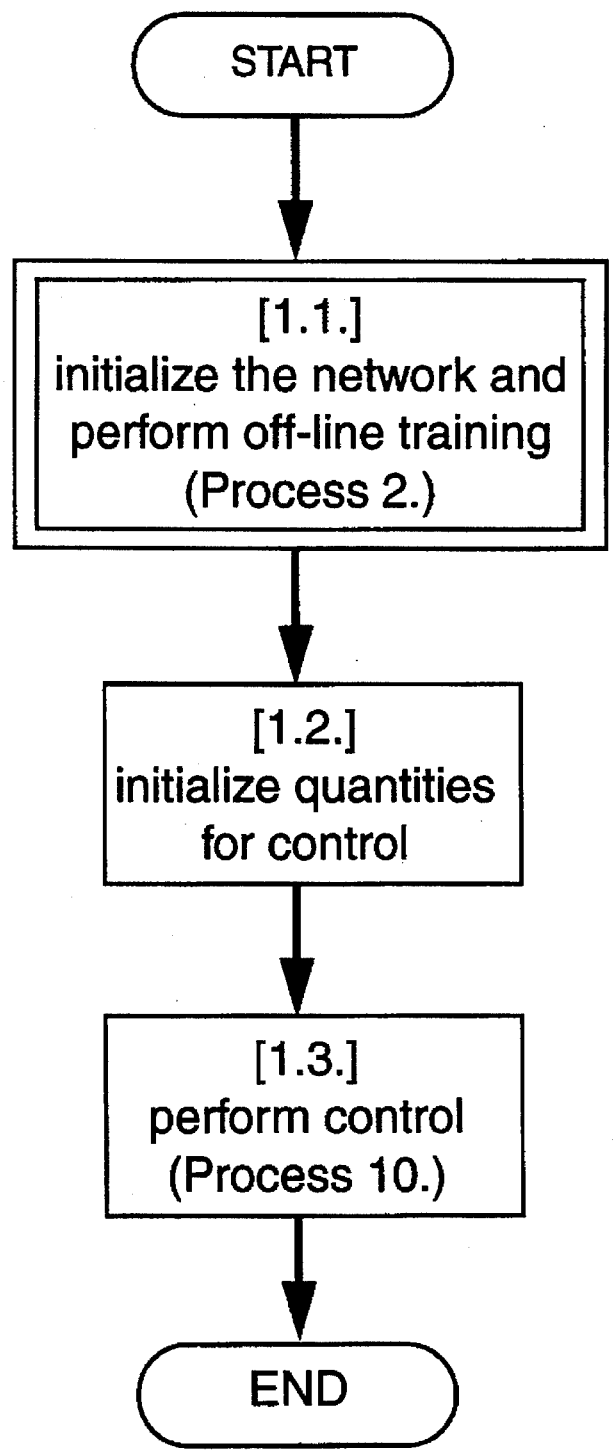
FIG. 10 is a flowchart showing the over-all model predictive control process.

FIG. 10: Process 1. The primary, or highest-level, flowchart for the model predictive control code.

1.1. The network is first initialized and trained using the off-line data. (Process 2)

1.2. There are several quantities which must be initialized before control can begin. The exact nature of this initialization may be tailored to a specific application, but here we describe the general, or default, process for initialization. Suppose that control is to begin at time 0. The following actions would be performed after time −1 and before time zero. First, the plant state X_p(−1) can be constructed from past values of plant inputs and outputs (up to and including time −1). The variable "net_y" is expected to contain the network's prediction of the plant outputs at the next time step. This can be initialized by looping over the nets in the network (for i=1; i<num_y; i++) and evaluating each net's prediction based on X_p(−1) (tau=get_tau(i,X_p(−1)), net_y(i)=net_out(i,tau) (see Processes 7 and 8.). The variable "new_u" is expected to contain the latest guess for the future control strategy, the time sequence new_u(0), . . . , new_u(h_c−1). Unless some control sequence is already available (e.g., from another controller), we should simply set new_u(i)=u(0), i=1, . . . ,h_c−1, where u(0) is the input we plan to apply at time 0. If there are no such plans, use u(0)=u(−1).

1.3. Commence model predictive control and on-line training. (Process 10)

Figure 11:
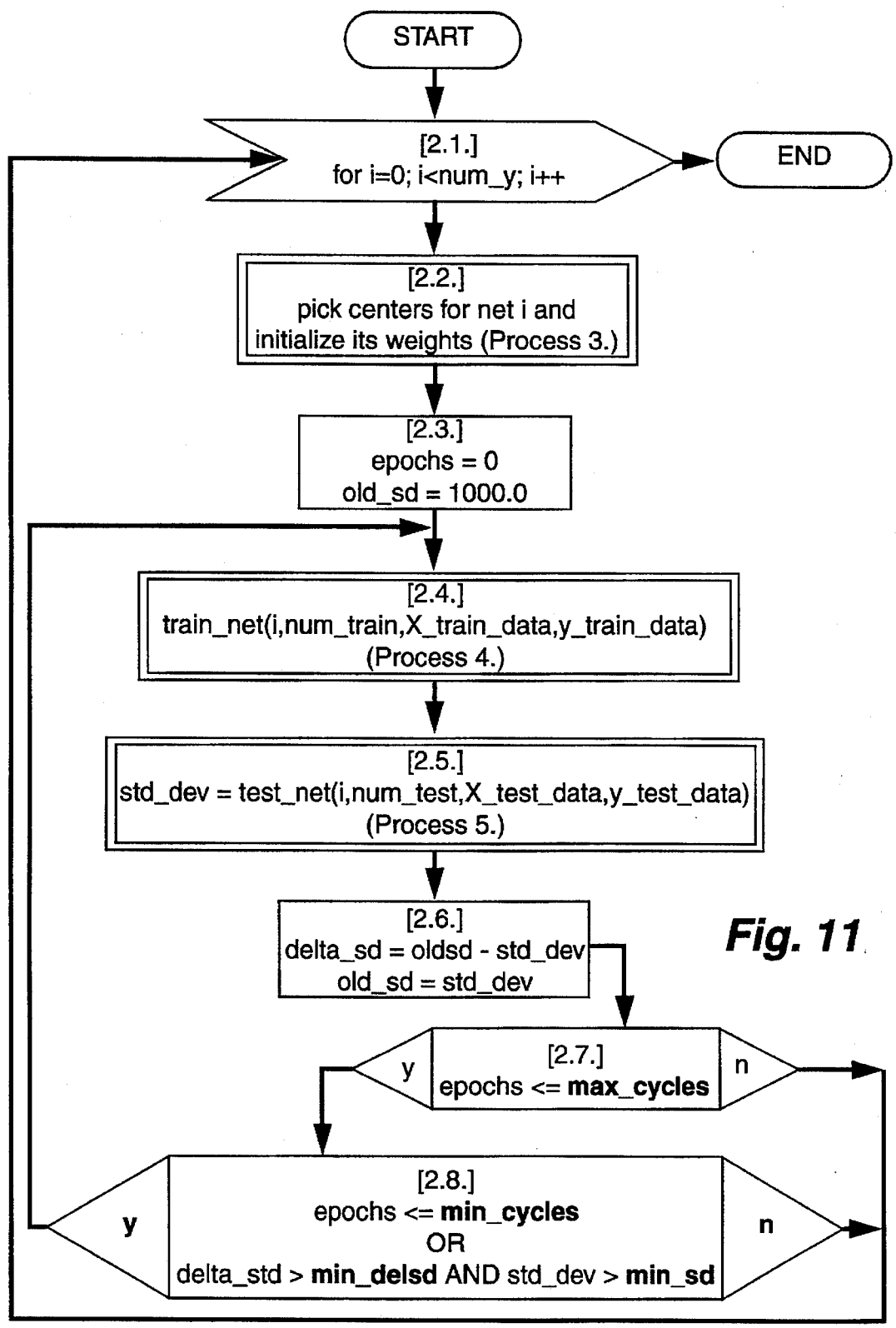
FIG. 11 is a flowchart showing off-line training and initialization of the network.

FIG. 11: Process 2. The main loop for performing off-line training and initialization of the network.

2.1. Loop over the number of outputs—the number of nets—in the entire network.

2.2. Initialize a net structure by picking centers and giving its weights initial values. (Process 3) 2.3. Initializing constants. "epochs" is the number of training sweeps through the data so far. "old_sd" will hold a measure of the net's testing error on the previous sweep through the data. Its initial value is an arbitrary, large number.

2.4. Perform one sweep through the training data on net i. "num_train" is the number of points in the training set. "X_train_data" contains the value of the network state for all the training points; thus, it serves as the source of inputs for net i on the training points. "y_train_data" contains the network outputs for all training points. (Process 4)

2.5. Test network i on the testing data, and find "std_dev", the empirical standard deviation of the net's error on the testing data. As in 2.4., "num_test" is the number of testing points, and "X_test_data" and "y_test_data" contain the test inputs and outputs. The test data may be the same as the training data. Also, although the test data may be derived from a time series, it is assumed to consist of a set of points whose order is not important. (Process 5)

2.6. Compute the change in network error from one sweep to the next, "delta_sd", and update old_sd.

2.7. Stop training net i if the maximum number of epochs, max_cycles, has been reached.

2.8. Continue training net i if either the minimum number of epochs (min_cycles) has not been reached yet or if the net's test error is still large and decreasing fast (i.e., delta_sd>min_delsd and std_dev>min_sd).

Figure 12:
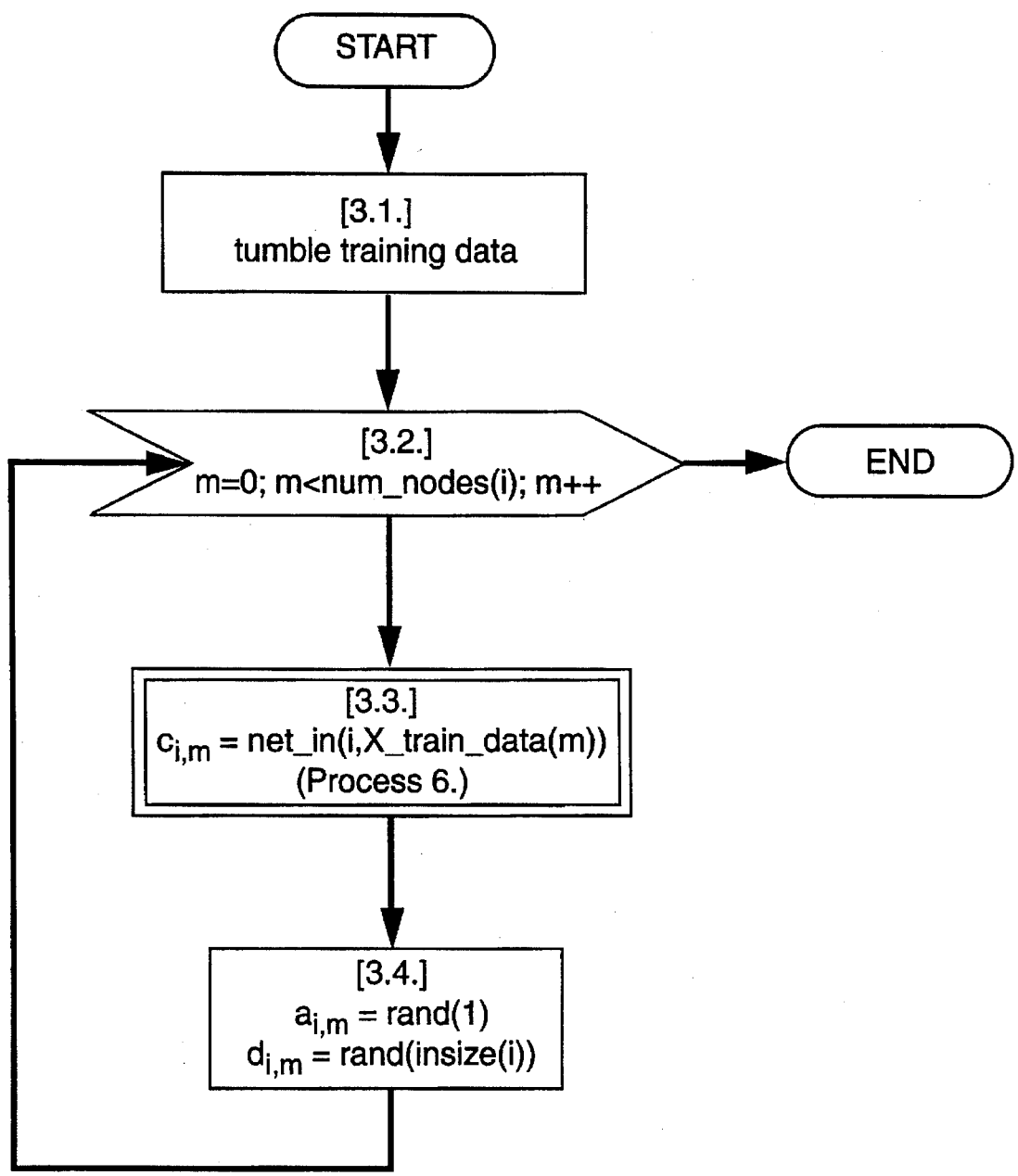
FIG. 12 is a flowchart showing the selection of centers and weight initialization.

FIG. 12: Process 3. Pick centers and initialize weights.

3.1. Shuffle X_train_data to randomize the order of the points. (The y_train_data must also be re-ordered in the same way, to keep the pairs together.)

3.2. Loop over the nodes in net i.

3.3. $c_{i,m}$ is the center of node m in net i. X_train_data(m) is the m'th point from the tumbled data; it has the same structure as a network state vector. The elements of that vector that make up the input to net i are placed in $c_{i,m}$. Since the data has been tumbled, this is equivalent to picking the centers as random training points, without replacement. (Process 6)

3.4. Initialize the weights with small random numbers. "rand(n)" stands for a vector of length n of random numbers, each between zero and one.

Figure 13:
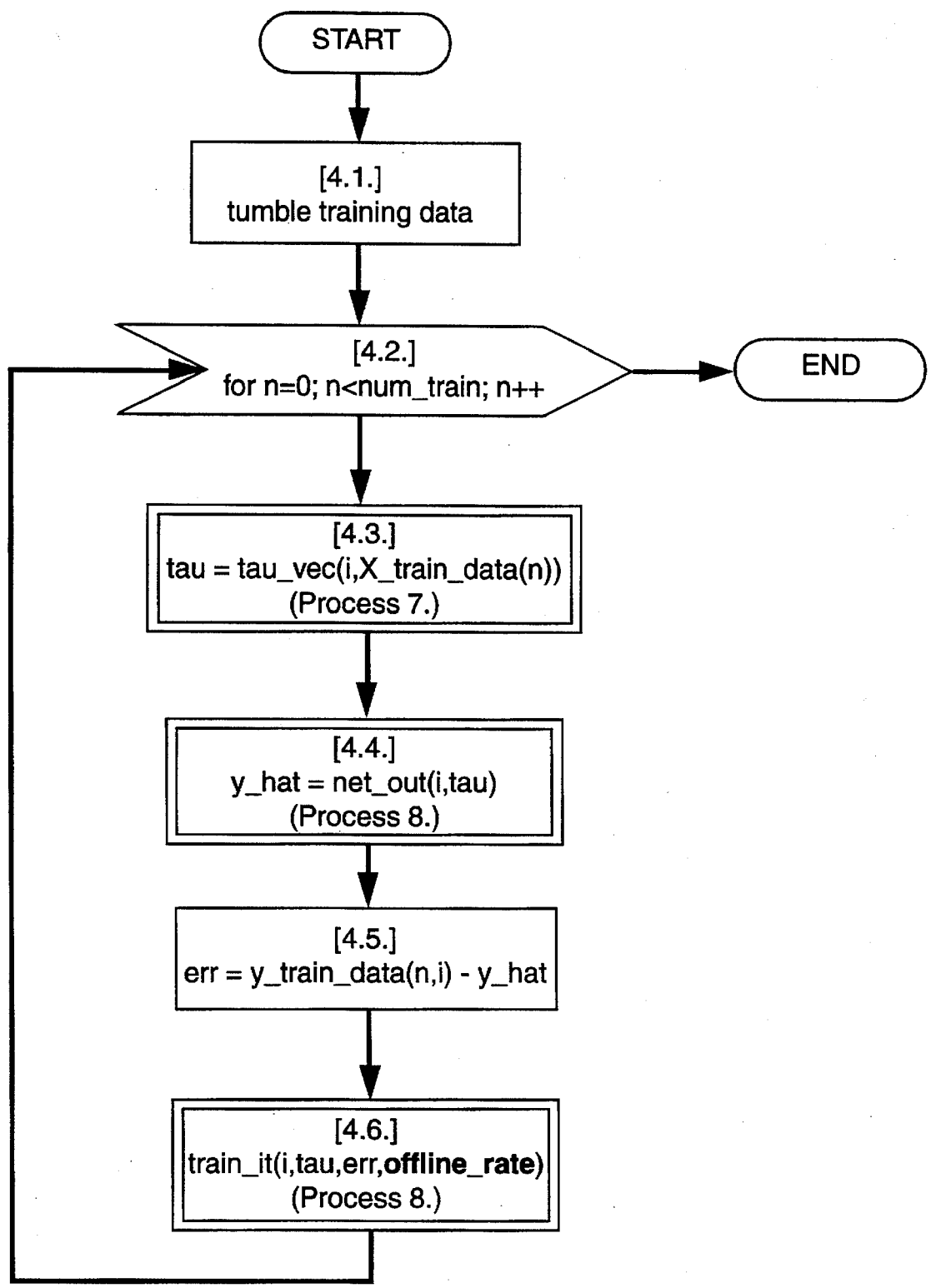
FIG. 13 is a flowchart showing net training.

FIG. 13: Process 4. Train net i by sweeping once through the training set.

4.1. The outcome of the training sweep could be adversely affected by patterns in the sequence of training points, so tumble the data to randomize its order.

4.2. Loop over all the patterns in the training set, updating net i's weights each time.

4.3. Get the tau vector for net i corresponding to the n'th (tumbled) data point. (Process 7)

4.4. Get the net's output at the n'th point. (Process 8)

4.5. Compute the net's error on the n'th point.

4.6. Update net i's weights in accordance with it's error and the rate offline_rate. (Process 9)

Figure 14:
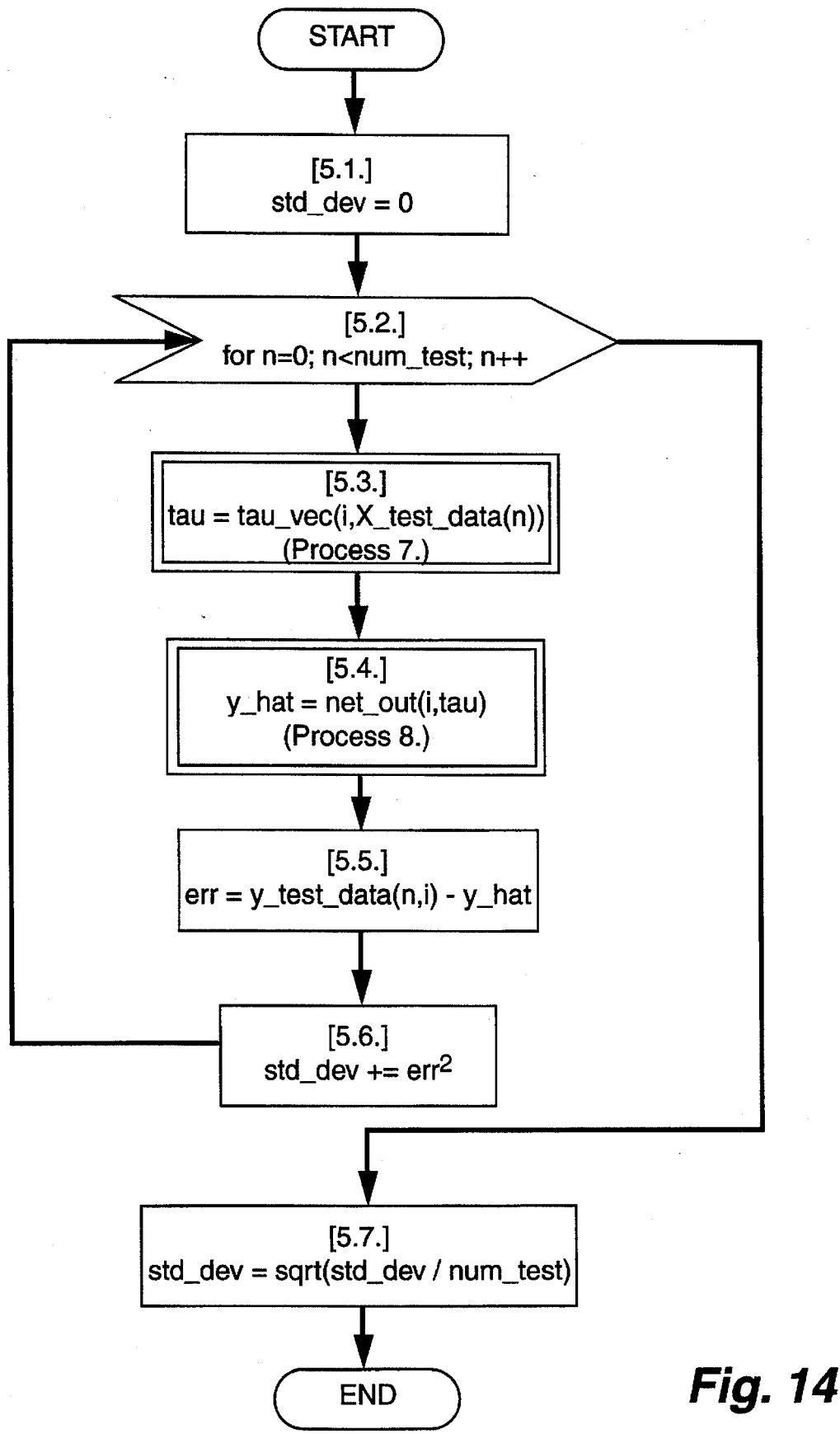
FIG. 14 is a flowchart showing net training with testing data.

FIG. 14: Process 5. Test net i by sweeping through the testing data, accumulating the errors in "std_dev".

5.1. Initialize std_dev.

5.2. Loop over the points in the testing set.

5.3. Get the tau vector for net i corresponding to n'th test point. (Process 7)

5.4. Get the net's output at the n'th point. (Process 8)

5.5. Compute the net's error at the n'th point 5.6. Accumulate the squared error in std_dev.

5.7. Set std_dev to the square root of the average squared error.

Figure 15:
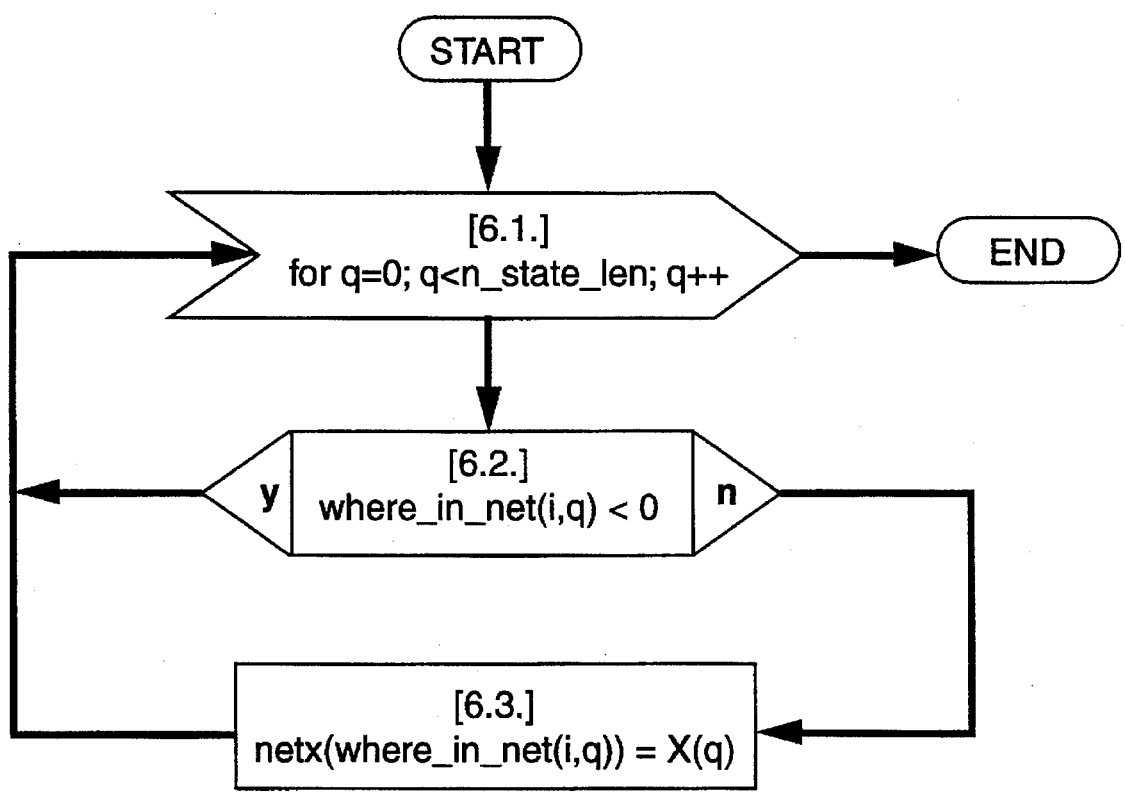
FIG. 15 is a flowchart showing construction of a net input vector from the network state.

FIG. 15: Process 6. Construct net i's input vector from the network state, X, and place it in "netx".

There are a number of ways to do this depending on how the network state is stored. We do this by defining an integer-valued mapping, "where_in_net," such that where_in_net(i,q) is negative if net i does not use X(q) as an input; otherwise, it gives the location where X(q) should be placed in net i's input vector.

6.1. Loop over the elements in X. n_state_len is a global constant giving the number of elements in a network state.

6.2. See if net i uses X(q) as an input.

6.3. By definition, X(q) should be placed at (where_in_net(i,q)) in net i's input vector.

Figure 16:
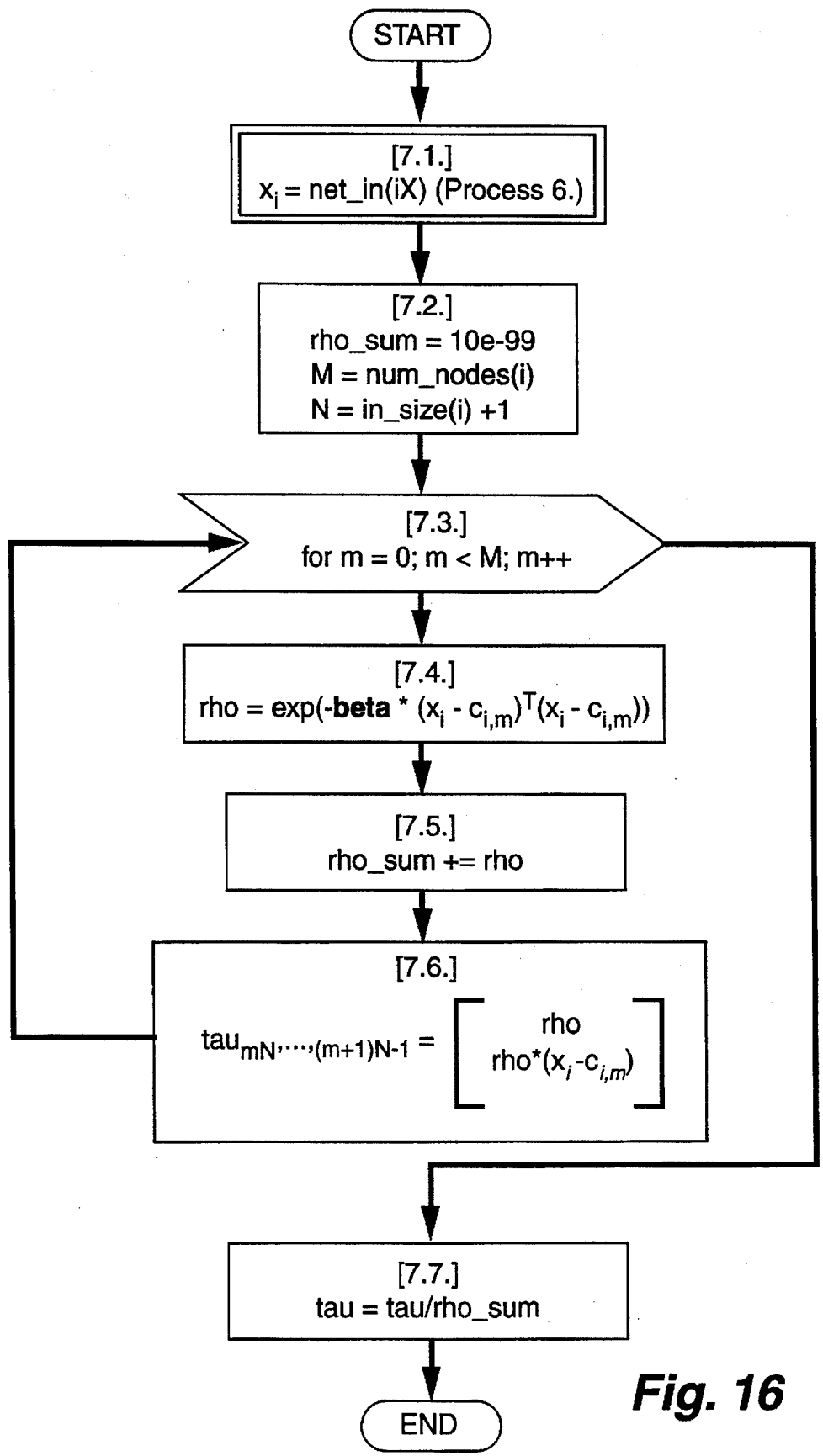
FIG. 16 is a flowchart showing computation of the "tau" vector for a network.

FIG. 16: Process 7. Computing the "tau" vector for a network.

This flowchart shows the steps that result from the call tau=tau_vec(i,X).

7.1. From the elements of the network state, X, assemble the input vector to net i, $x_i$. (Process 6)

7.2. Initialization of constants. rho_sum is initialized to a small number to avoid division by zero. N is the number of adjustable weights on each node (the "a" and "d" parameters).

7.3. Loop over the nodes in net i.

7.4. rho is the output of the m'th basis function when $x_i$ is its input.

7.5. Accumulate the sum of the rho's for normalization.

7.6. The m'th block of the column vector tau has N elements that correspond to the weights of the network. rho corresponds to $a_{i,m}$, and rho*(xi–$c_{i,m}$) corresponds to $d_{i,m}$.

7.7. Normalize tau.

Figure 17:
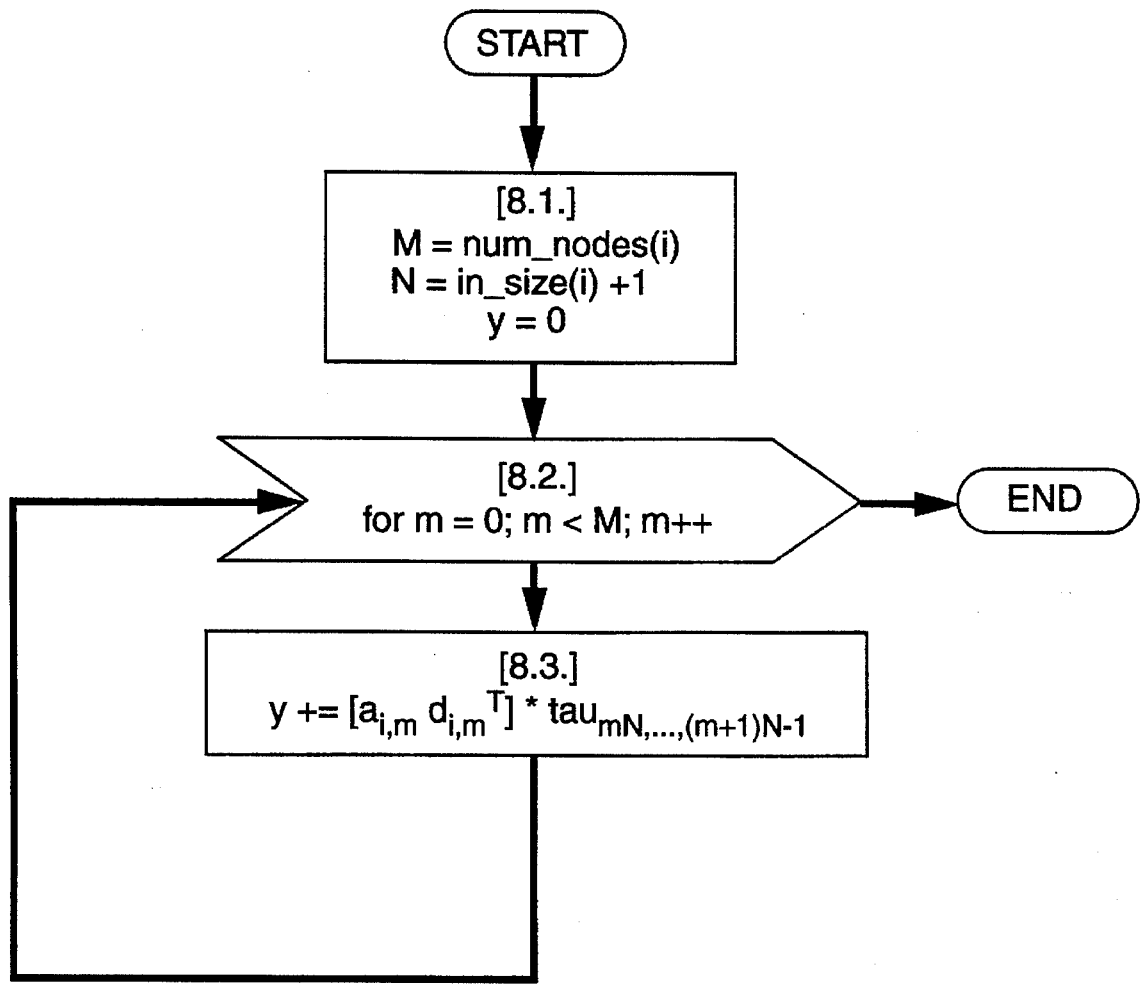
FIG. 17 is a flowchart showing computation of the output of a single net.

FIG. 17: Process 8. Computing the output of a single net.

This flowchart shows the steps that result from the call y=net_out(i,tau).

8.1. Initializing constants. N is the number of adjustable weights on each node (the "a" and "d" parameters).

8.2. Loop over the nodes in net i.

8.3. Add to y the m'th "block" of tau times the weights on node m. That is, increment y by $$\text{tau}_{mN} * a_{i,m} + \sum_{j=1}^{N-1} \text{tau}_{mN+j} * d_{i,m}(j-1) \qquad (EQ\ 1)$$

Figure 18:
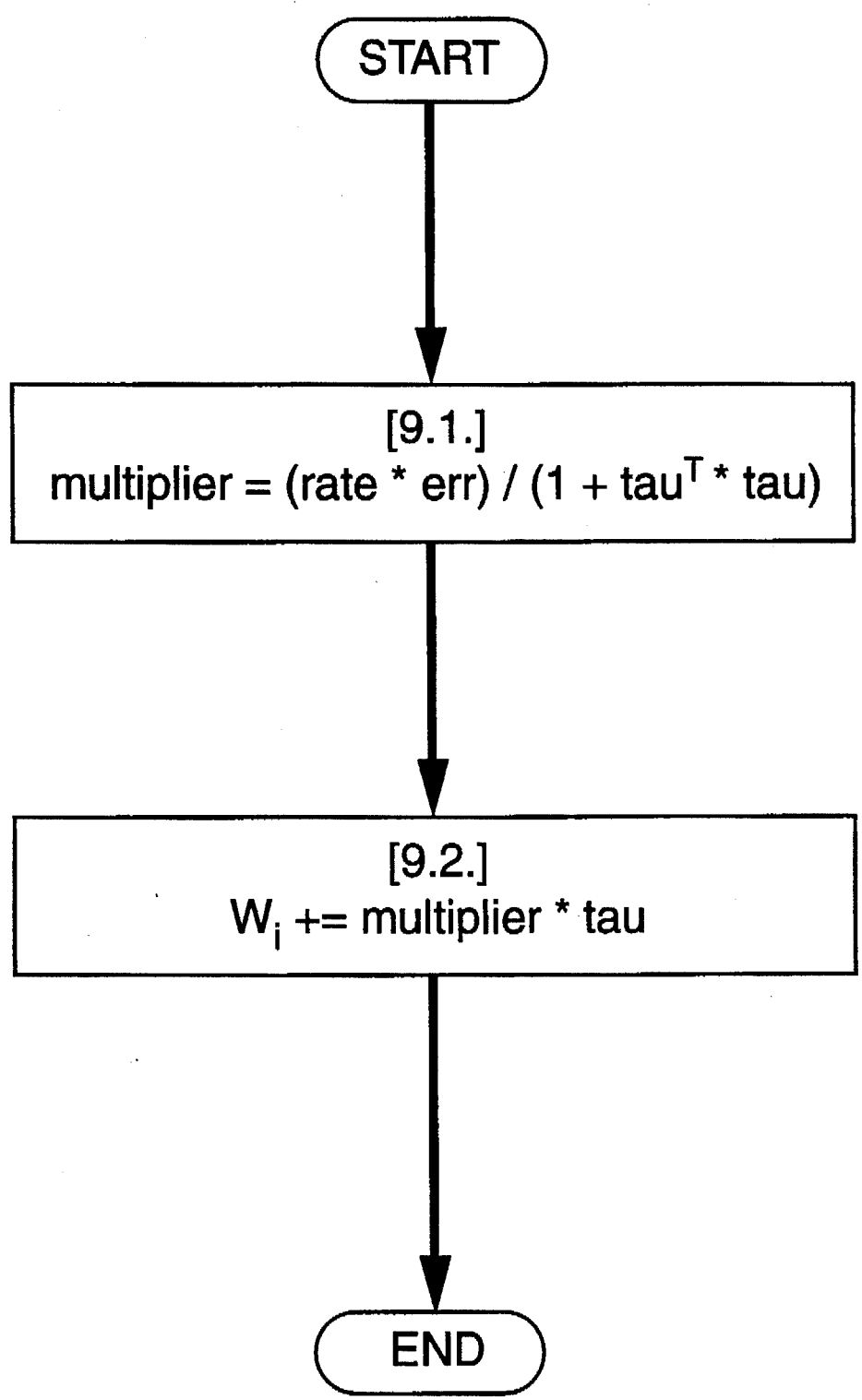
FIG. 18 is a flowchart showing performing a training iteration on a single net.

FIG. 18: Process 9. Perform a training iteration on a single net.

This flowchart shows the result of the call train_it(i,tau, err, rate). The effect is to update the weights of net i, $W_i$.

9.1. The weight update is proportional to tau. First, we calculate this multiplier.

9.2. Increment the weights of net i, $W_i$.

Figure 19:
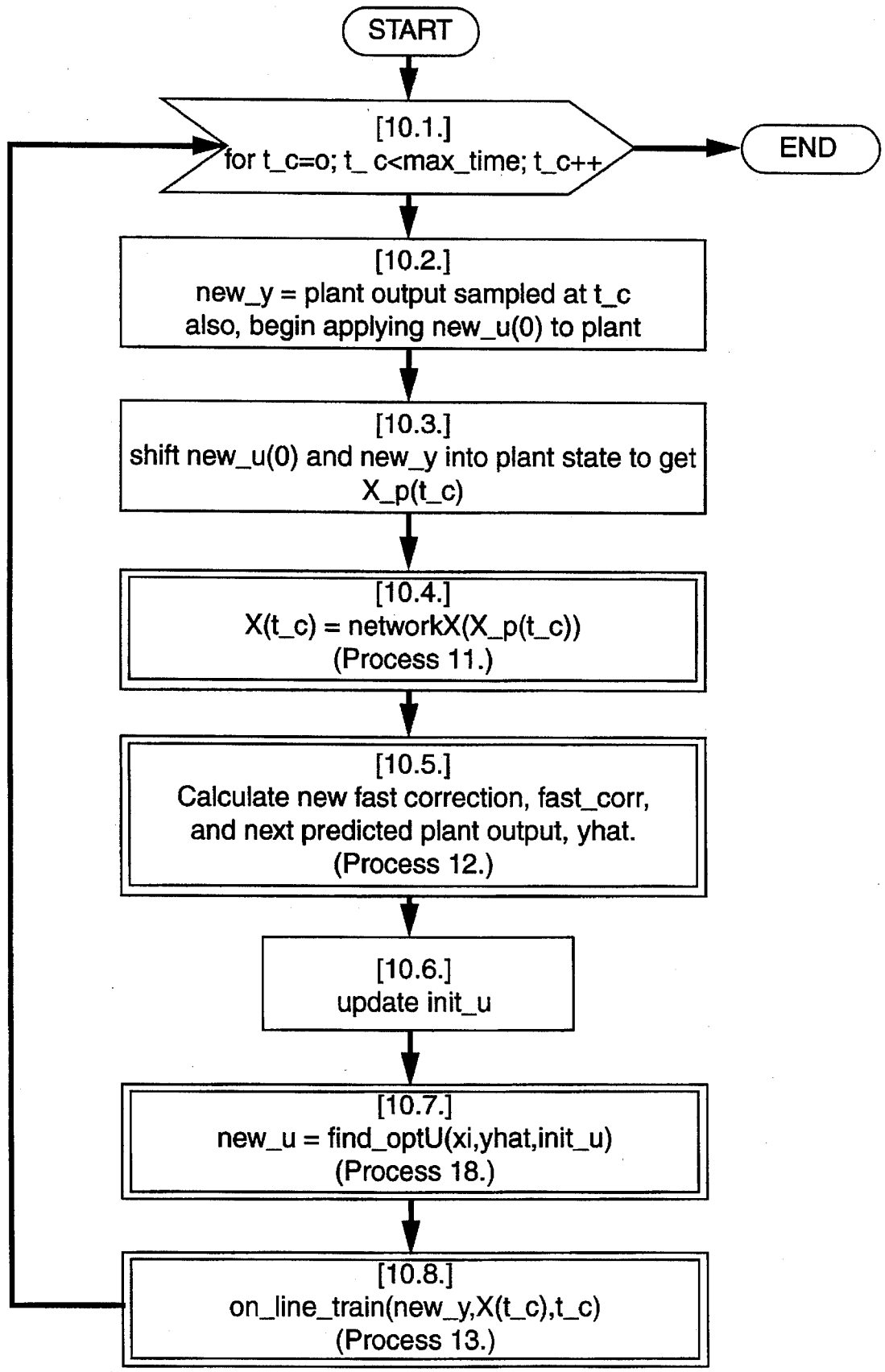
FIG. 19 is a flowchart showing the main control loop.

FIG. 19: process 10. Main control loop.

This loop coordinates the MPC control and on-line training.

10.1. Loop to keep track of time. t_c represents the number of time steps that have elapsed since control began.

10.2. At time t_c, the plant outputs are sampled and the first control input from the control strategy, new_u(0), is applied to the plant.

10.3. X_p(t_c) is the plant state at time t_c.

10.4. Extract the current network state from the plant state. (Process 11)

10.5. Update the fast correction terms and the network predictions. (Process 12)

10.6. Update init_u, the initial guess for the control strategy. The exact value of init_u is not critical, but the closer it is to the optimal strategy, the faster the optimization will proceed. When gapping is not being performed, a good value for init_u can be gotten from time-shifting the previous optimal strategy: init_u(i)=new_u(i+1), i=0, . . . ,h_c−2, and init_u(h_c−1)=new_u(h_c−1). When gapping is being performed, we just set init_u=new_u.

10.7. Using init_u as an initial guess for the control strategy and yhat as the guess for the plant output at the next time step, find an optimal control strategy. (Process 18)

10.8. Perform on-line training using the most recent measured plant output. (Process 13)

Figure 20:
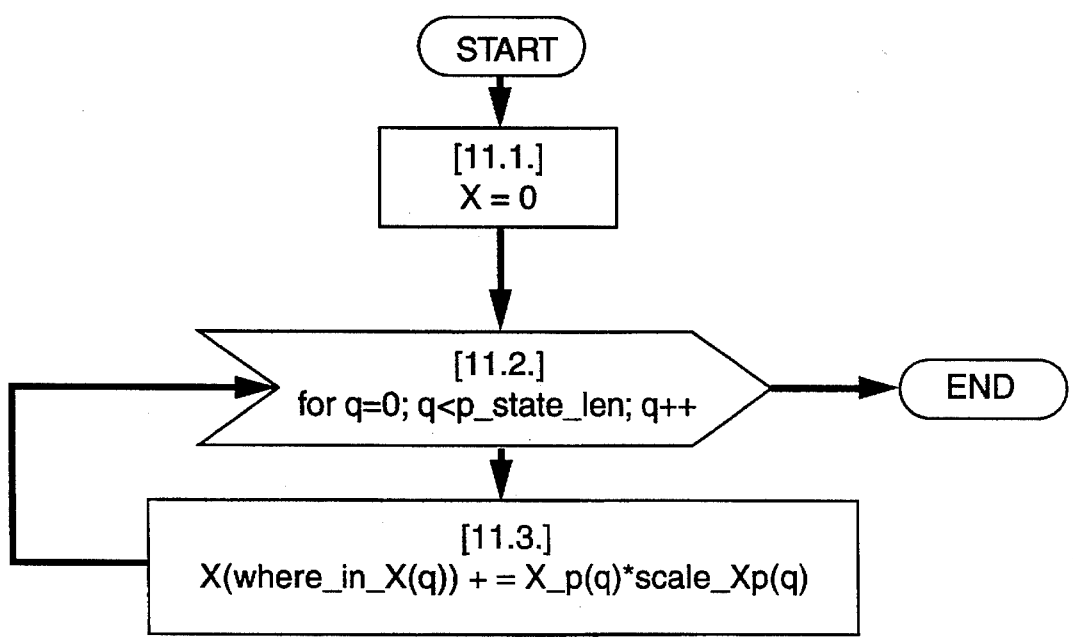
FIG. 20 is a flowchart showing construction of the network state from the plant state.

FIG. 20: Process 11. Construct the network state from the plant's state.

This flowchart shows the actions that result from the call X=networkX(X_p). Every element of X is either an element of X_p (e.g., an old plant output) or a scaled sum of several elements of X_p (e.g., an average of old plant inputs). Each element of X_p contributes to at most one element of X; this enables X to be constructed in a very simple manner using two predefined arrays. The first array, "scale_X_p", describes how elements of X_p are to be scaled before adding them to X: scale_X_p is 0 if X_p(q) does not contribute to X, is 1 if X_p(q) is a plant output that appears in X, and is 1/g if X_p(q) is a control input that appears in X. (g is the gapping factor.) The second array, where_in_X, tells which position in X an element of X_p contributes to. Both scale_X_p and where_in_X could be defined "by hand" or constructed automatically based on the structure of X and the gapping factor.

11.1. Initialize X to all zeros, so the network state can be computed.

11.2. Loop over all the elements in X_p.

11.3. Take X_p(q), scale it by scale_X_p(q), and add it to the element of X specified by where_in_X(q).

Figure 21:
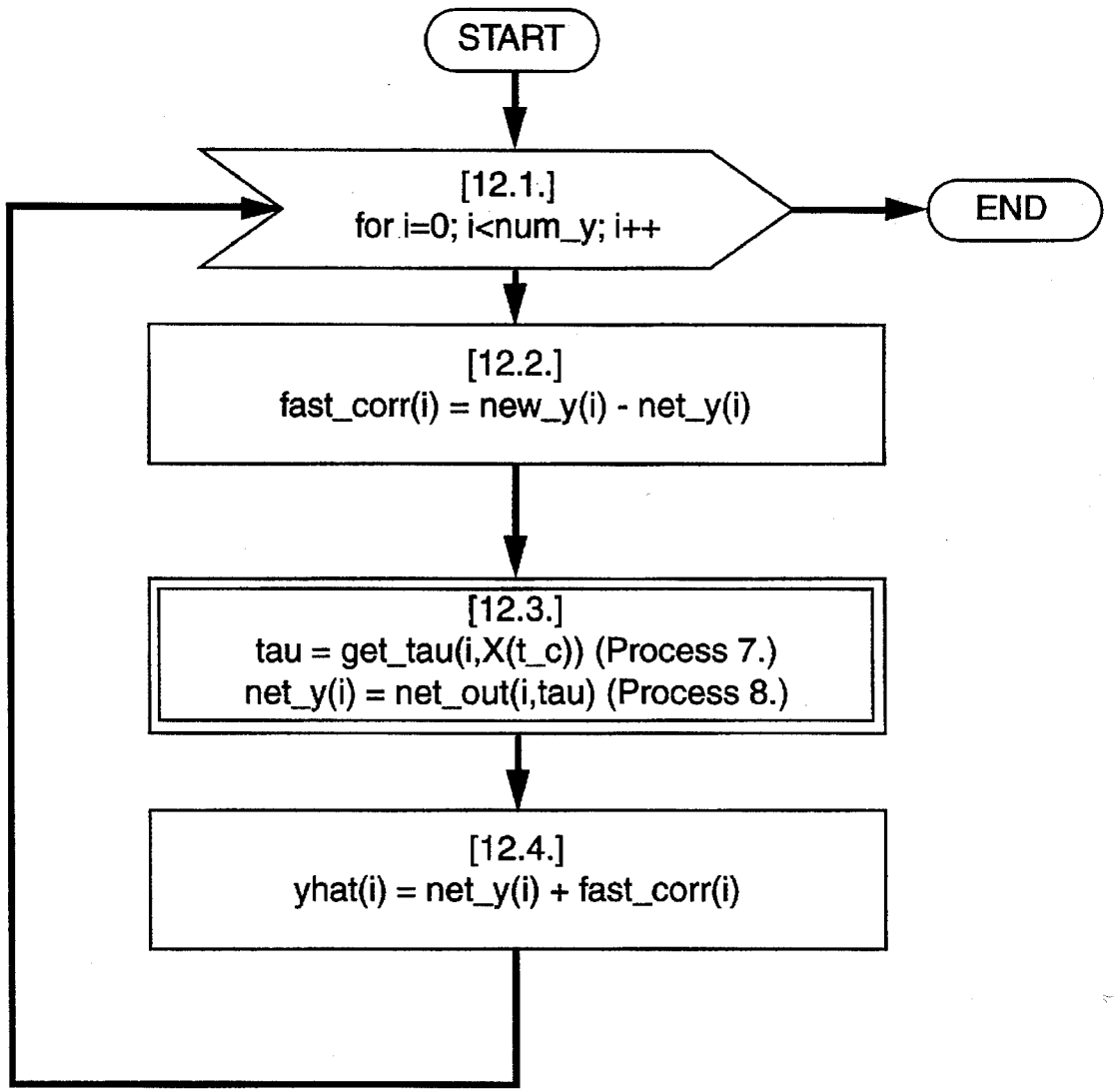
FIG. 21 is a flowchart showing calculation of the fast correction term and plant output prediction.

FIG. 21: Process 12. Calculating the fast correction term and plant output predictions.

12.1. Loop over the number of plant outputs that are being predicted.

12.2. The present value of net_y holds the one-step-ahead prediction of the plant output from last time, so compare it to new_y to calculate the fast correction term.

12.3. Predict the plant outputs at the next time instant.

12.4. Adjust the net prediction by the fast correction term to get a better prediction of the next plant output.

Figure 22:
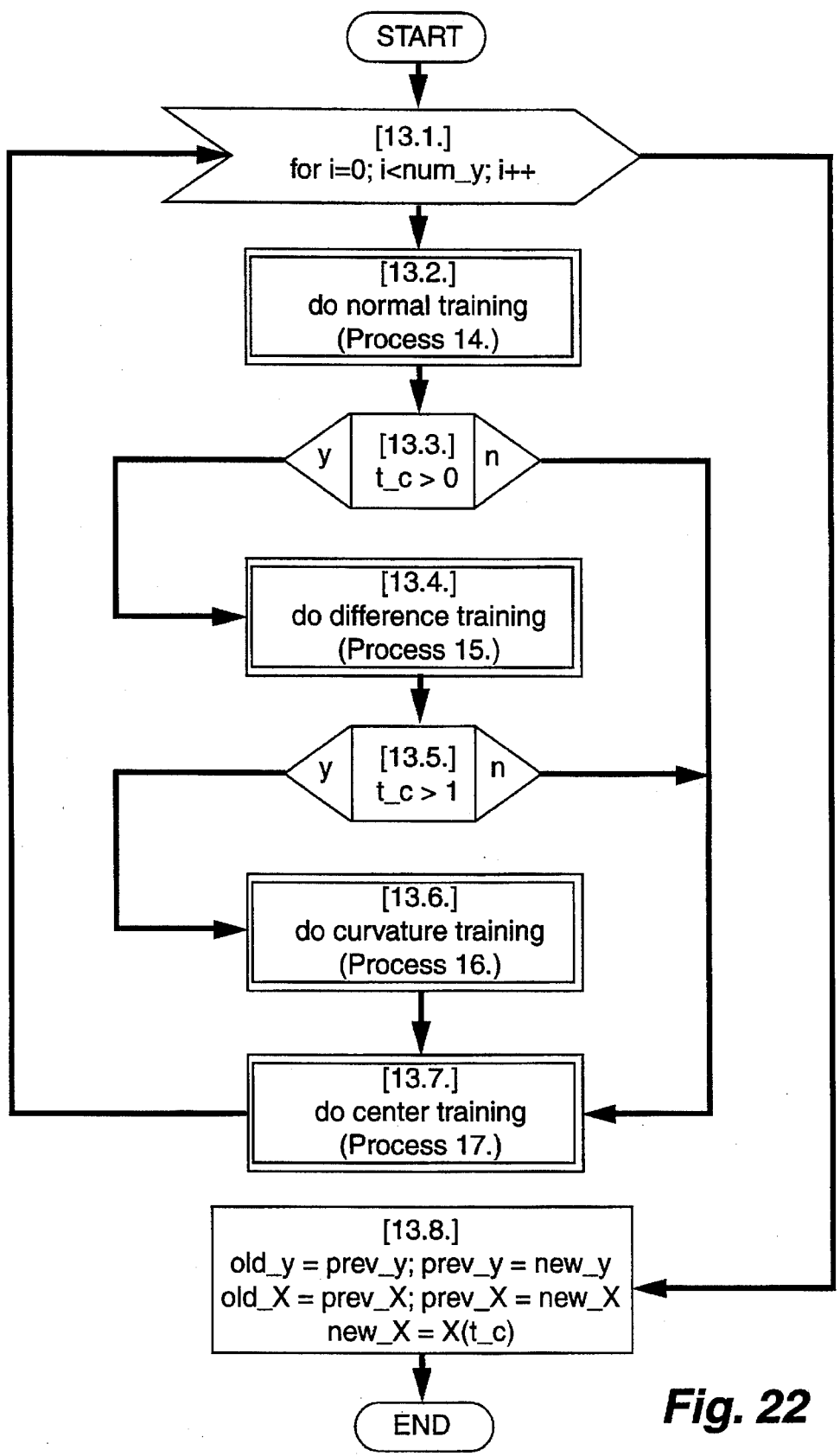
FIG. 22 is a flowchart showing the main on-line training loop.

FIG. 22: Process 13. Main on-line training loop.

This flowchart show the actions that result from the call on_line_train(new_y,X(t_c),t_c). The effect of these actions is to update, if necessary, the weights and centers of the network. The pair (new_X,new_y) is a new training point. (The initial (t_c=0) value of new_X should be the network state at time −1.)

13.1. Train each net in the network.

13.2. First, update the weights of net i using normal training, i.e., just using (new_X,new_y) directly. (Process 14)

13.3. See if difference training can be done. If t_c<1, no previous data point exists to form a difference with, so difference training cannot be done.

13.4. Update the weights of net i using difference training. (Process 15)

13.5. See if curvature training can be done. If t_c<2, there is not enough previous data to form a curvature, so curvature training cannot be done.

13.6. Update the weights of net i using curvature training. (Process 16)

13.7. Update the centers of net i. (Process 17)

13.8. Update the quantities that contain past data by putting prev_y into old_y and new_y into prev_y, etc. The current network state, X(t_c), becomes new_X next time.

Figure 23:
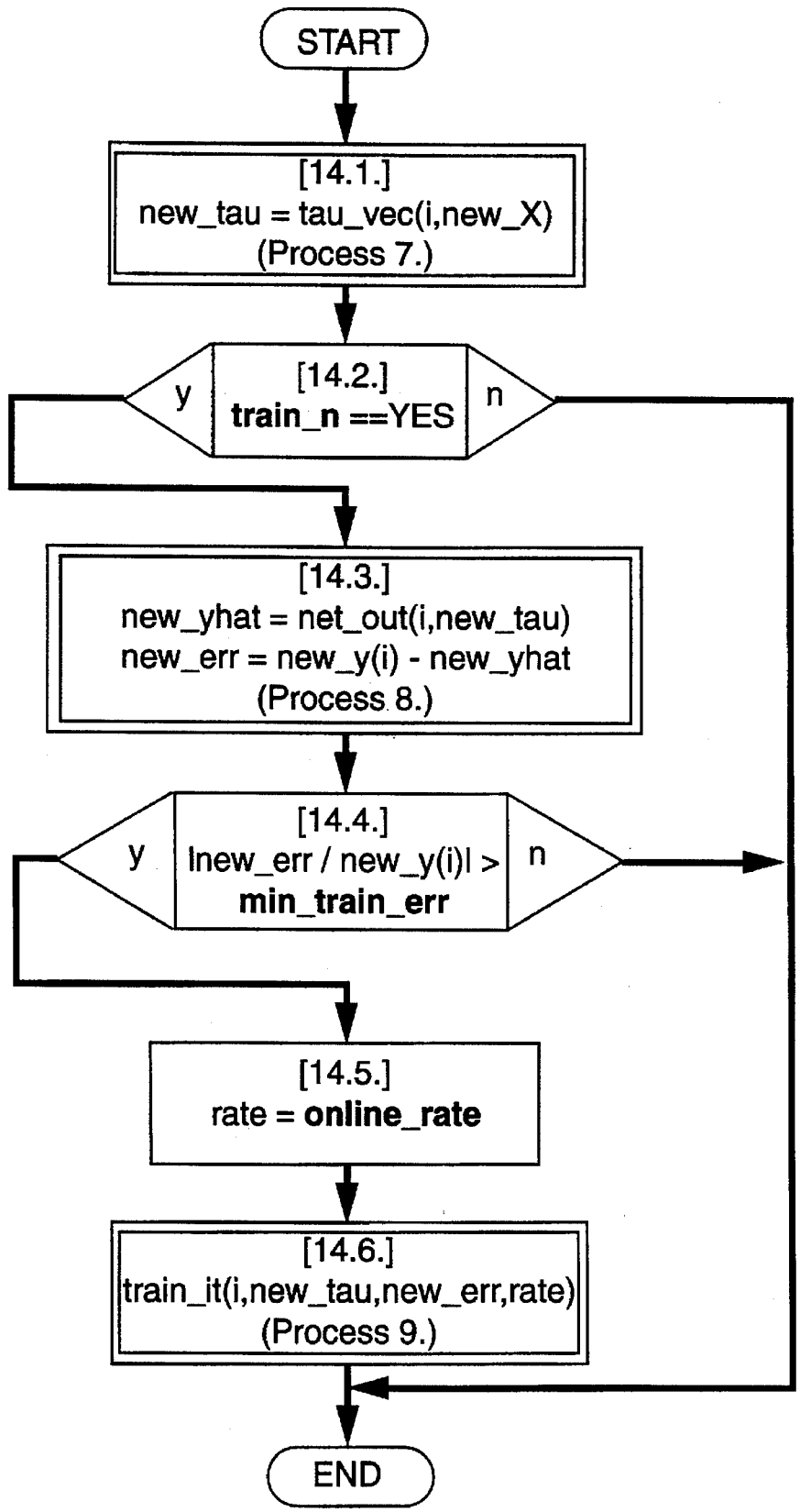
FIG. 23 is a flowchart showing training a net on new input data.

FIG. 23: Process 14. Train net i on the pair (new_X, new_y).

14.1. Get the tau vector for net i corresponding to inputs from new_X. This is always calculated, since it may be needed for difference training or curvature training. (Process 7)

14.2. See if normal training is enabled by looking at the global constant train_n; if not, stop.

14.3. Find net i's output at new_X and calculate its error. (Process 8)

14.4. See if the net's error, as a percentage of new_y(i), is large enough to justify training by comparing it to the global constant min_train_err.

14.5. Set the training rate to the on-line training rate, online_rate.

14.6. Update net i's weights by performing one training iteration. (Process 9)

Figure 24:
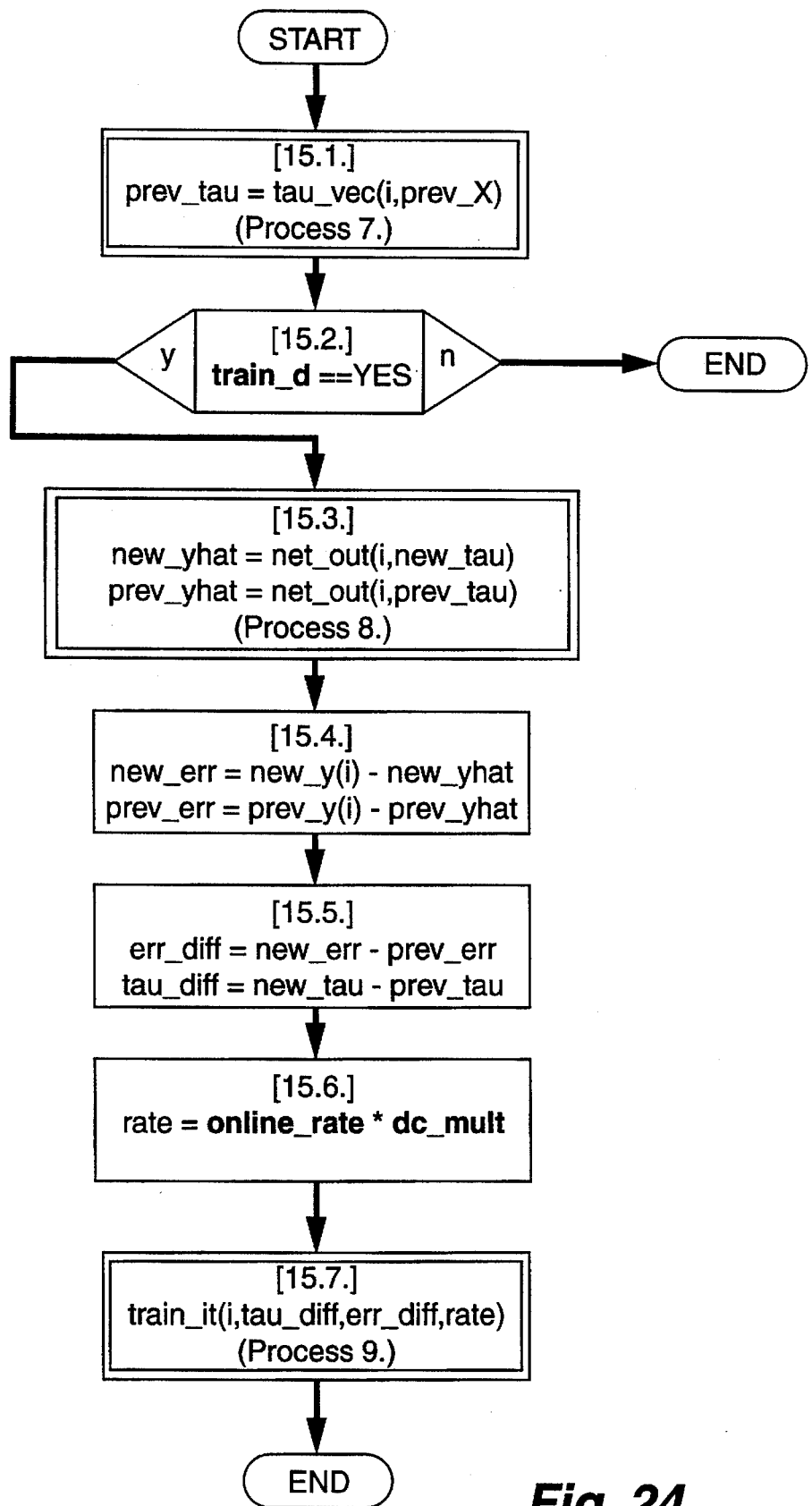
FIG. 24 is a flowchart showing net training on the difference between new and previous data.

FIG. 24: Process 15. Train net i on the difference between the "new" and "prev" data.

15.1. Get the tau vector for net i corresponding to inputs from prev_X. In general, using the value of "new_tau" from the last time step will not suffice because center training could have changed it. (The dimension of tau could even change if a new center is added!) (Process 7)

15.2. See if difference training is enabled by looking at the global constant train_d.

15.3. Find net i's output at new_X and prev_X. Note that we can't just use new_yhat from [14.3.] because the net's weights may have changed, giving a different output for the same input. (Process 8)

15.4. Calculate the net errors, new and previous.

15.5. Compute the differenced data for the error and the tau vector.

15.6. Set the training rate by scaling the on-line rate by dc_mult.

15.7. Update net i's weights by performing a training iteration on the differenced data. (Process 9)

Figure 25:
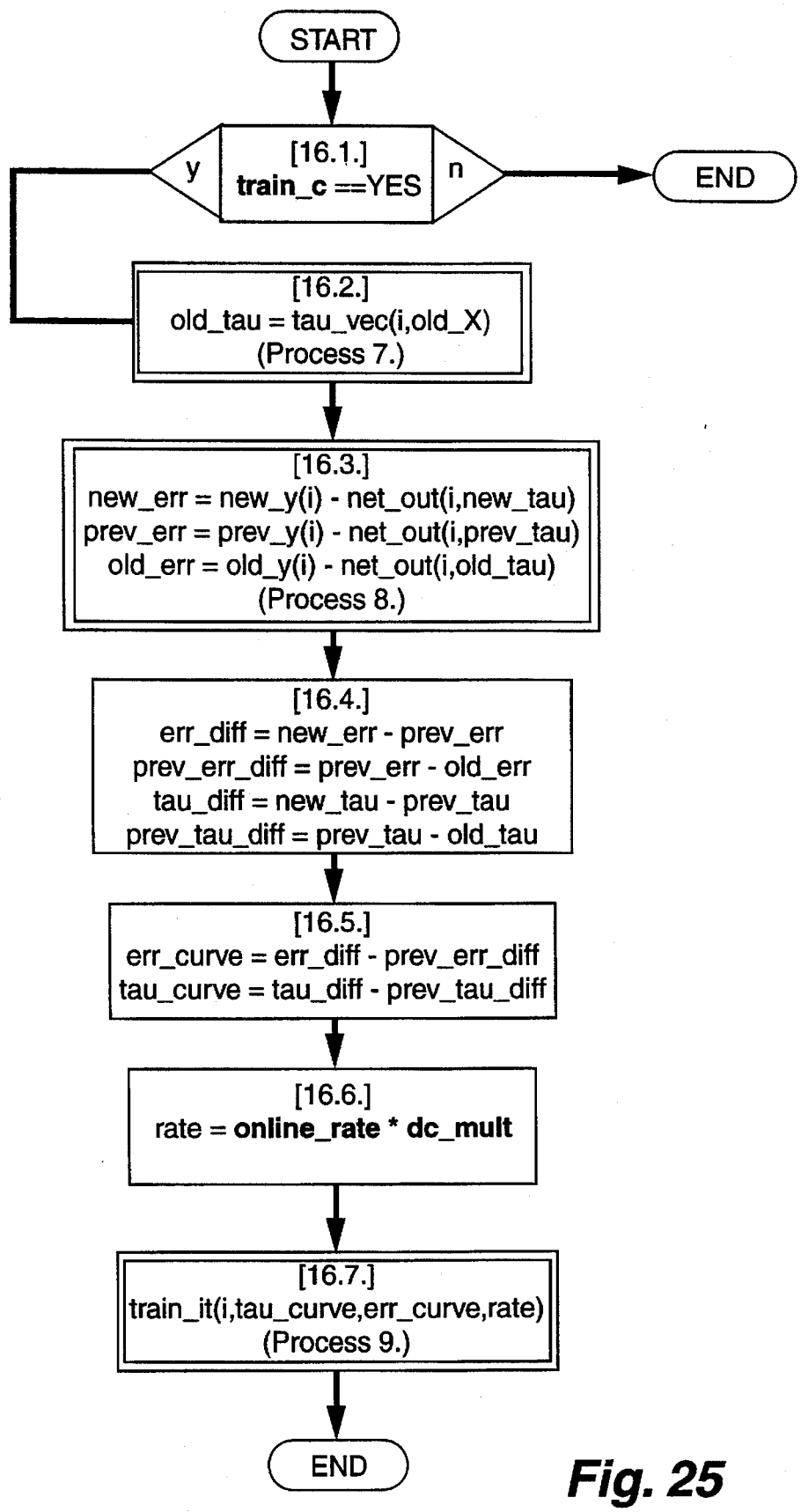
FIG. 25 is a flowchart showing net training based on the curvature of the various data sets.

FIG. 25: Process 16. Train net i based on the "curvature" of the "new", "prev", and "old" data.

16.1. See if curvature training is enabled by looking at the global constant train_c.

16.2. Get the tau vector for net i corresponding to inputs from old_X. (Process 7)

16.3. Calculate net outputs and errors. Again, for the most accuracy these should be re-computed because the weights may have changed. However, since the weights are changing by small amounts, one may wish to skip recomputing new_err and prev_err as an expedient measure. This is a speed versus accuracy trade-off. (Process 8)

16.4. Compute the current and previous differences in the errors and the tau vectors.

16.5. Finally, compute the curvature data by taking differences of the difference data.

16.6. Set the training rate by scaling the on-line rate by dc_mult.

16.7. Update net i's weights by performing a training iteration on the curvature data. (Process 9)

Figure 26:
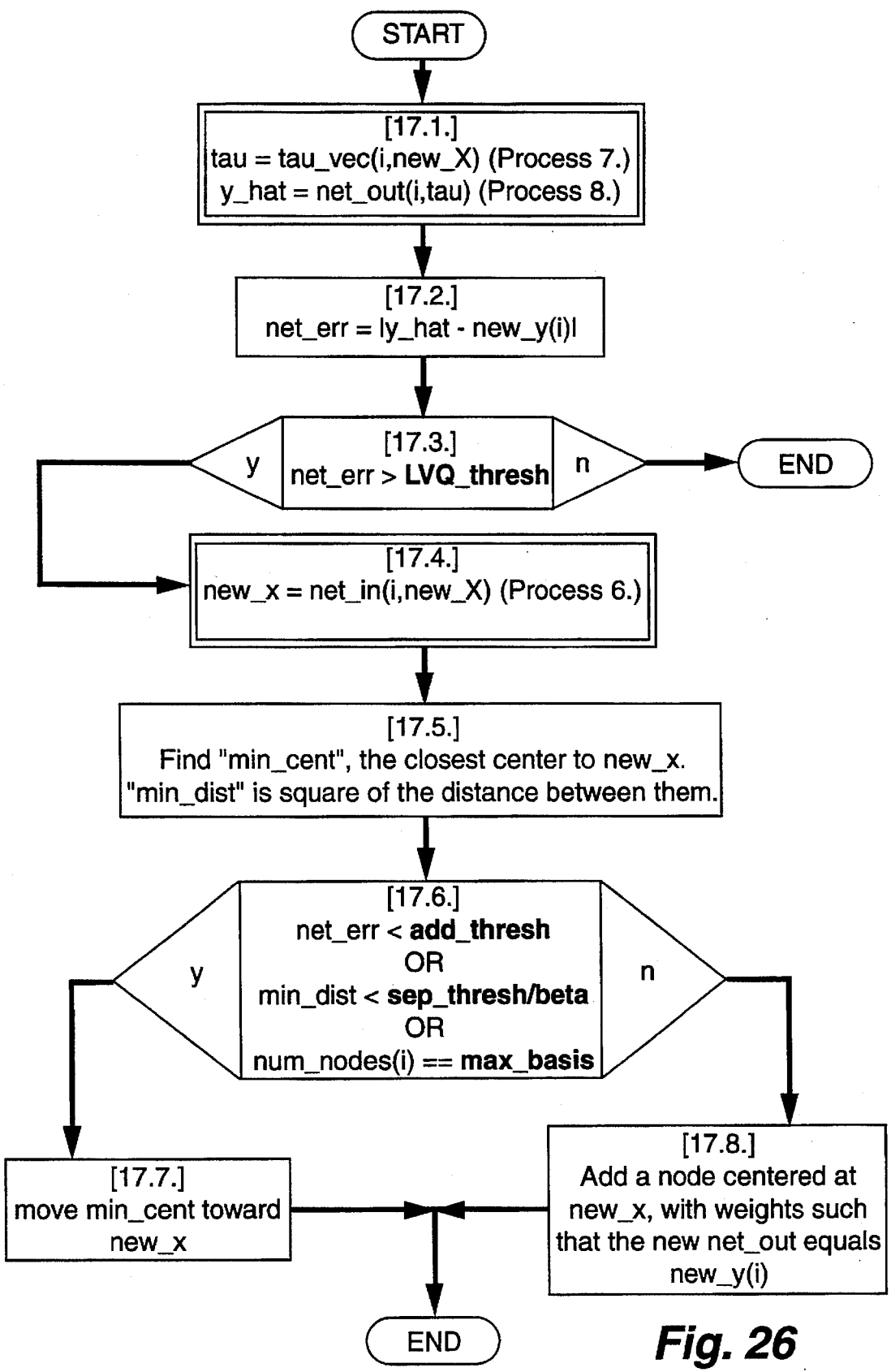
FIG. 26 is a flowchart showing center training.

FIG. 26: Process 17. Center Training.

This flowchart shows the steps that result from the call cent_train(i,new_x, new_y); the centers of net i are updated to account for the new information in new_x, new_y. If necessary, a new center is added.

17.1. First, the output of net i is evaluated at new_x. (Processes 7 and 8)

17.2. net_out is compared with new_y to determine the network's error.

17.3. LVQ_thresh is a global constant. The effect of this block is to avoid center training if the network error is small.

17.4. Extract the components of new_X that make up the input to net i and place them in new_x. (Process 6)

17.5. This is done by simply evaluating the (Euclidean) distance between new_x and each center of net i.

17.6. The number of nodes in net i should not exceed max_basis (a global constant). If there is room for another node, the network error is large enough, and new_x is far enough away from all the existing centers, adding a new node is justified. Otherwise, min_cent will be nudged toward new_x. add_thresh, sep_thresh, and beta are global constants.

17.7. This is done by moving min_cent toward new_x by a fraction of the distance between them (LVQ_delta is a global constant):

$$\text{min\_cent} = \text{min\_cent} + \text{LVQ\_delta} * (\text{new\_x} - \text{min\_cent}) \quad \text{(EQ 2)}$$

17.8. This is done as follows. Space is allocated in the data structure for another node in net i. The new center is set to new_x, the new "d" vector is set to small random numbers, and the new "a" parameter is set by first summing up the contributions of the old basis functions at new_x, $$\text{rho\_sum} = \sum_{j=1}^{\text{num\_nodes}(i)} \rho_i(j, \text{new\_x}) \qquad (EQ\ 3)$$

and then setting a=new_y*(1+rho_sum)−net_out*rho_sum. Then num_nodes(i) is incremented by one.

Figure 27:
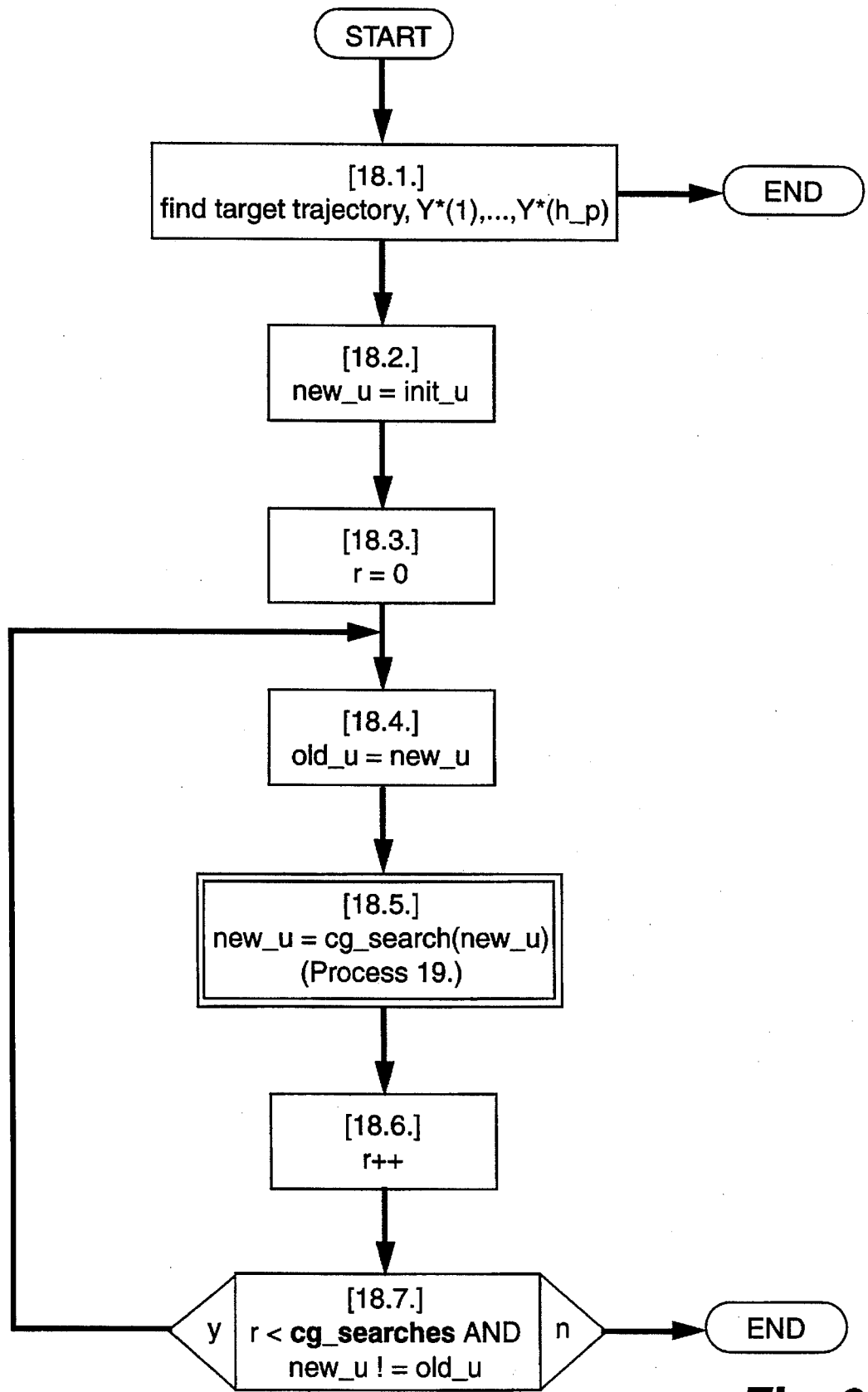
FIG. 27 is a flowchart showing a process for finding an optimal control strategy.

FIG. 27: Process 18. Finding an optimal control strategy.

This flowchart shows the steps that result from the call new_u=find_optU(xi, yhat, target, init_u).

18.1. For each net i, the i'th component of Y*, $y_i^*$, is computed over the prediction horizon by $y_i^*(j)$=setpoint(i) −(setpoint(i)−yhat(i))*exp(−j*xi(i)), j=1, ... ,h_p. Thus, yi* is an exponential approach (with rate xi(i)) from yhat(i) to setpoint(i).

18.2. new_u will be the current best guess for a control strategy, so set it to init_u to begin with.

18.3. Initialize the count of the number of conjugate gradient search sweeps done so far.

18.4. old_u will be used to see if the search resulted in a new (i.e., different) strategy.

18.5. Search for a new strategy starting from new_u, and place the result in new_u. (Process 19)

18.6. Increment the conjugate gradient (gc) counter.

18.7. Decide whether to perform another conjugate gradient sweep. Conjugate gradient search is deterministic; if new_u=old_u, the same will be true on the next sweep—we are in a local minimum and should terminate the search. Also, there is a maximum number of sweeps given by the global constant cg_searches.

Figure 28:
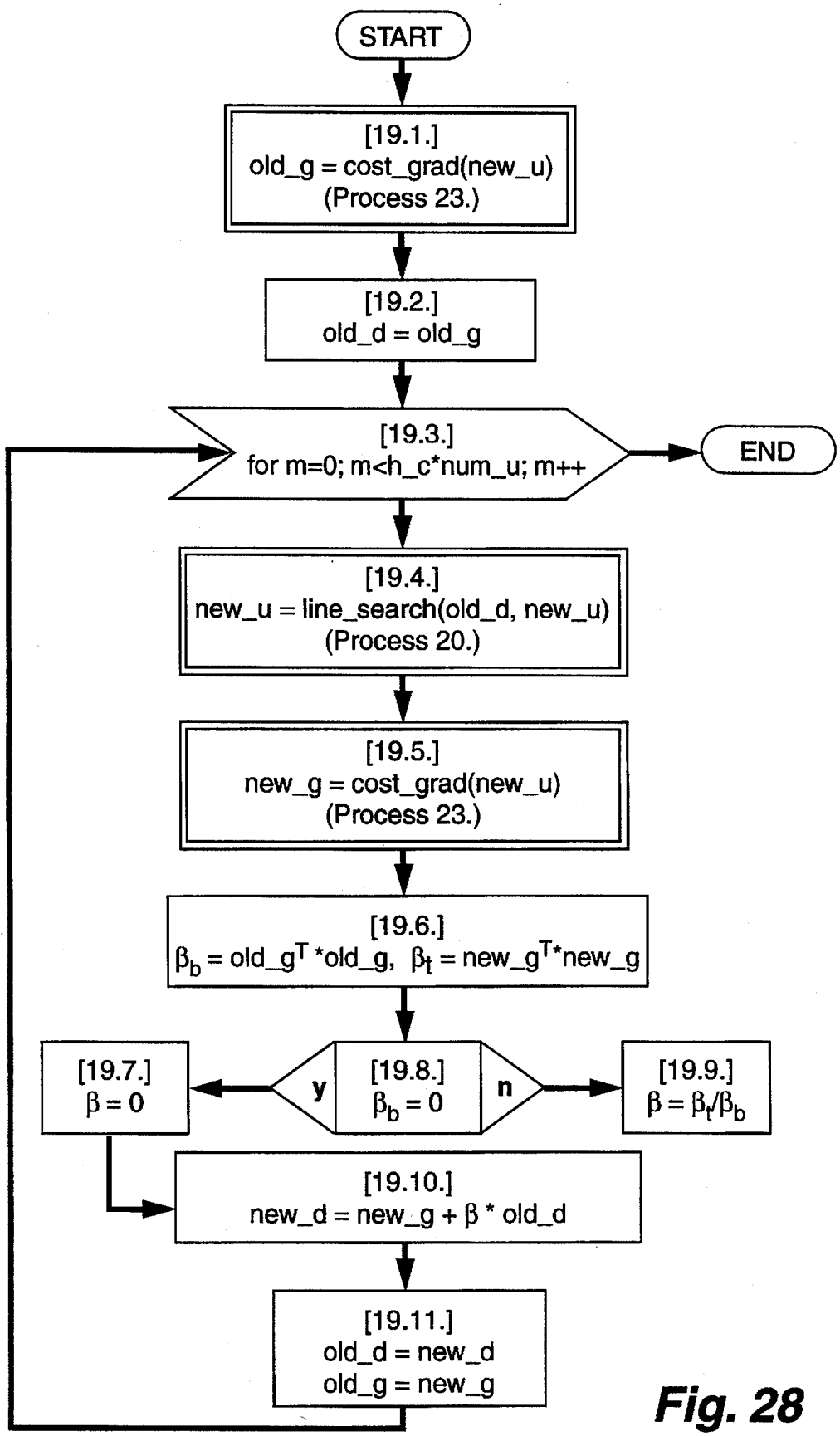
FIG. 28 is a flowchart showing the formation of a conjugate gradient loop.
Figure 29:
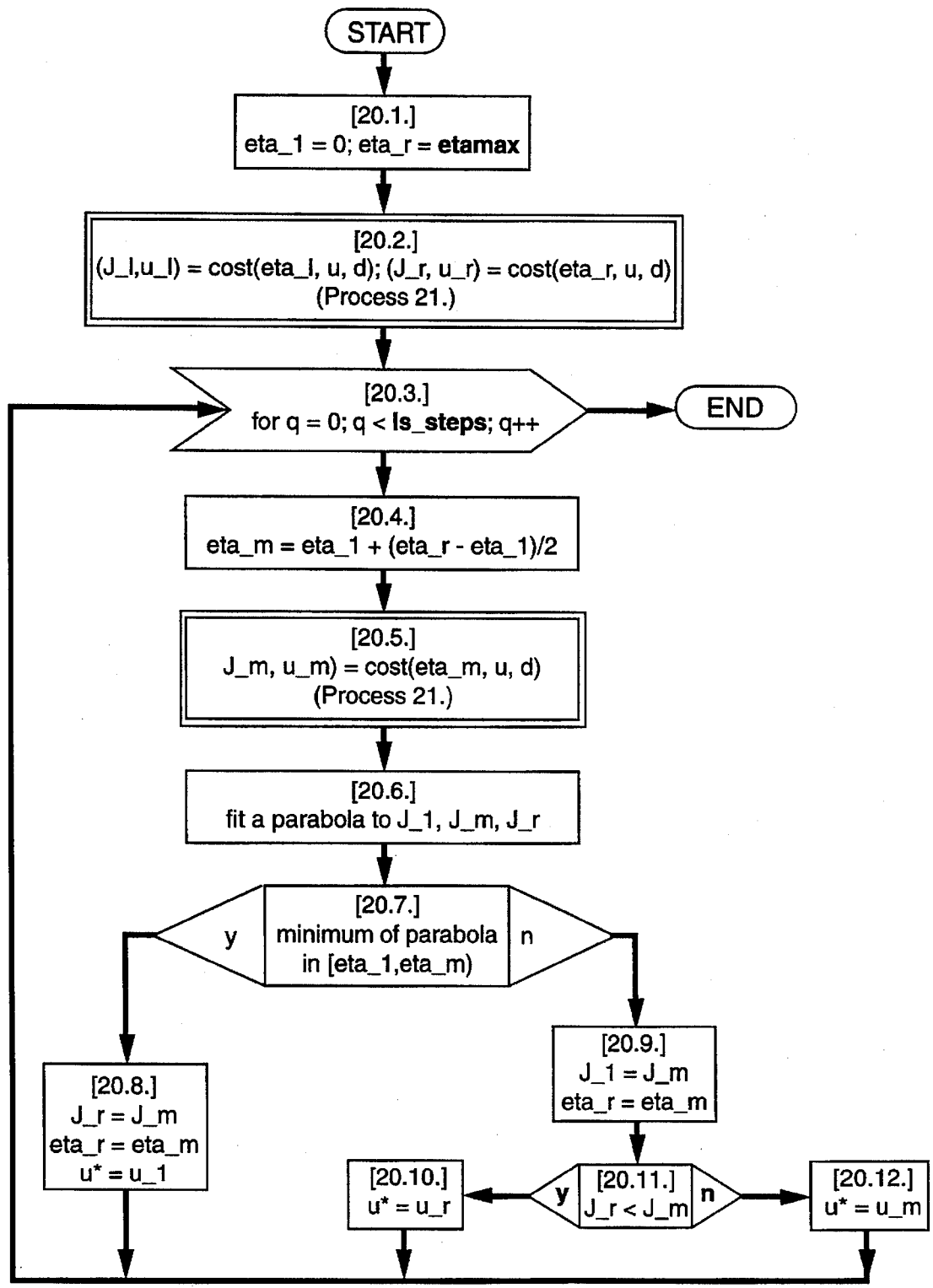
FIG. 29 is a flowchart showing the minimization of an objective function by line search.

FIG. 28: Process 19. Conjugate gradient loop, called by find_optU.

This flowchart shows the effect of the call new_u=cg_search(new_u). This is basically a standard algorithm, taken from Luenberger, "Linear and Nonlinear Programming," Addison Wesley, 1984.

19.1. Find the gradient of the cost function for the current strategy, new_u. (Process 23)

19.2. Set the search direction to the current gradient.

19.3. A conjugate gradient search often contains as many steps as the number of variables in the objective function: in our case there are h_c variables for each of the num_u controls.

19.4. Do a line_search in the old_d direction starting from new_u. Place the result in new_u. (Process 20)

19.5. Find the gradient of the cost function at new_u. (Process 23)

19.6. Conjugate gradient search differs from pure gradient search in that new search directions are based on the gradient but also take previous search directions into account. The next few blocks are computations for finding a new direction. In particular, the computations in this box represent the "Fletcher-Reeves" method for picking new_d. An alternate method, the "Polak-Ribiere" method, would be to set $$\beta = (\text{new\_g}-\text{old\_g})^T * \text{new\_g}. \qquad (EQ.\ 4)$$

19.7. (see Process flowchart)

19.8. Avoid dividing by zero.

19.9. (see Process flowchart)

19.10. The new search direction is the new gradient plus a correction due to old_d 19.11. Shift the values of d and g in preparation for the next iteration FIG. 29: Process 20. Line search, called by Cg_search.

This flowchart shows the result of the call u*=line_search (d, u). This line search is a bisection method for minimizing an objective function in the direction d starting at u. On each iteration, the current search interval is divided in half. The value of the objective function is known at each end of the interval and is calculated at the midpoint. A decision is made to search in one of the subintervals on the next iteration by fitting a parabola to the three values of the objective function and determining where the minimum of the parabola lies.

20.1. The location of the left edge of the search interval is at u+eta_l*d, and the right edge is at u+eta_r*d. This box initializes the values of eta_l and eta_r so that the search interval is from u to u+etamax*d, where etamax is a global constant.

20.2. Find the costs and controls corresponding to eta_l and eta_r. Note that the function "cost" truncates the controls to make them conform to the input constraints. Thus, u_l need not be equal to u+eta_l*d. (Process 21)

20.3. Use the global constant Is_steps to determine the number of iterations 20.4. eta_m is the value of eta that corresponds to the midpoint of the current interval.

20.5. Find the cost and control corresponding to eta_m. (Process 21)

20.6. That is, find coefficients a, b, and c such that the function $J(z)=az^2+bz+c$ satisfies J(eta_l)=J_l, J(eta_m)=J_m, and J(eta_r)=J_r. This is an exercise in simple algebra.

20.7. It is a matter of some basic calculus to determine in which subinterval the minimum of J(z) lies.

20.8. The search should now proceed in the left subinterval; the right-hand cost and eta are set to the values from the middle. Also, u* represents the control which corresponds to the least value of J seen so far; set it to u_l. (Actually, this only needs to be done the last time through the loop.)

20.9. The search should now proceed in the right subinterval; set the left-hand cost and eta to the middle values.

20.10. (Actually, this only needs to be done the last time through the loop.)

20.11. Depending on which value of J is the smallest, set u*.

20.12. (Actually, this only needs to be done the last time through the loop.)

Figure 30:
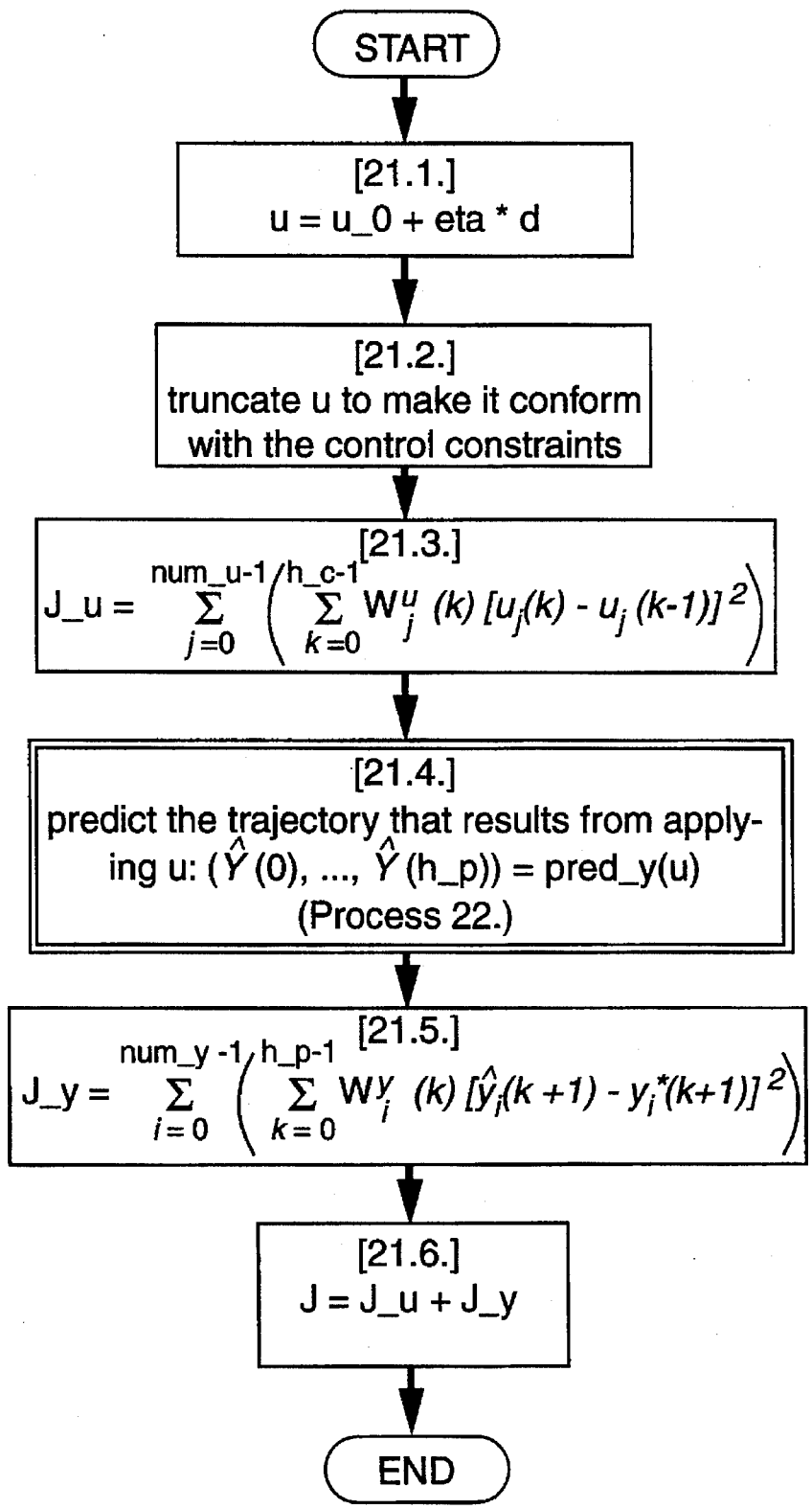
FIG. 30 is a flowchart showing the calculation of the cost for a given control strategy.

FIG. 30: Process 21. Calculating the cost_for a given control strategy.

This flowchart show the steps that correspond to the call (J,u)=cost(eta,d,u_0). The returned value of u conforms to the control constraints.

21.1. Unconstrained value of u.

21.2. $u_j$ is constrained to lie between umin(j) and umax(j). Also, $|u_j(k)-u_j(k-1)|$ must be at most dumax(j,k). For each j, this is done by stepping forward from k=0 and truncating, or clipping, u to make it satisfy these constraints. (The value of $u_j(-1)$, the previous control input, is obtained from the current network state, X.)

21.3. J_u is the cost for control changes. Again, the value of $u_j(-1)$, the previous control input, is obtained from the current network state, X.

21.4. Predict the outputs that result from applying u. (Process 22)

21.5. J_y is the (predicted) cost for failing to match the reference trajectory.

21.6. J is the total cost.

Figure 31:
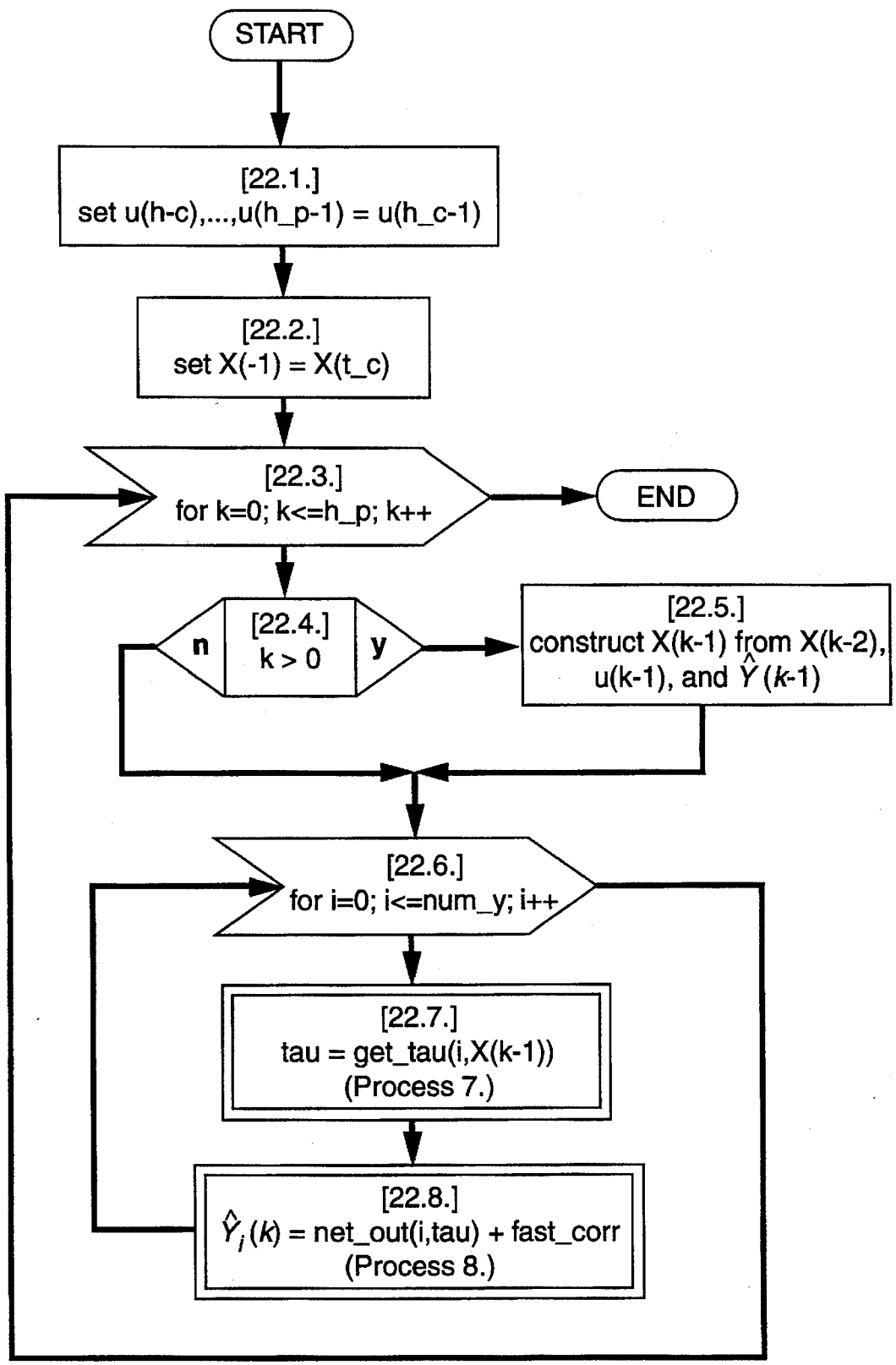
FIG. 31 is a flowchart showing predicting the plant output by iterating the network.

FIG. 31: Process 22. Predict the plant output by iterating the network.

This flowchart shows the steps that result from the call $(\hat{Y}(0), \ldots, \hat{Y}(h\_p))$=pred_y(u). Note that the time index used here is such that $\hat{Y}(0)$ represents the prediction of the plant's outputs at time t_c+1.

22.1. The variable control inputs, u, only contain values u(0), ... u(h_c−1), but in order to predict out to time h_p, we need the inputs until time h__p−1. We get these by setting them equal to u(h__c−1), since the control is held constant after time h__c−1.

22.2. The network state X(t__c) is used to predict Ŷ(0), so we make a copy of it labeled X(−1).

22.3. Loop over the time instants in the prediction horizon.

22.4. See if we need to create X(k−1).

22.5. X(k−1), the (predicted) network state at time k−1, can be assembled by time-shifting the information in X(k−2) and inserting u(k−1) and Ŷ(k−1) into it. X should be stored, since it is used during the calculation of the output sensitivities in [24.2.].

22.6. Loop over the number of nets in the network.

22.7. Find the tau vector for net i when X(k−1) is its input. (Process 7)

22.8. Compute the i'th net's output at time k, then adjust it by adding the fast correction term, "fast__corr," to get a prediction of Ŷ$_i$(k) . (Process 8)

Figure 32:
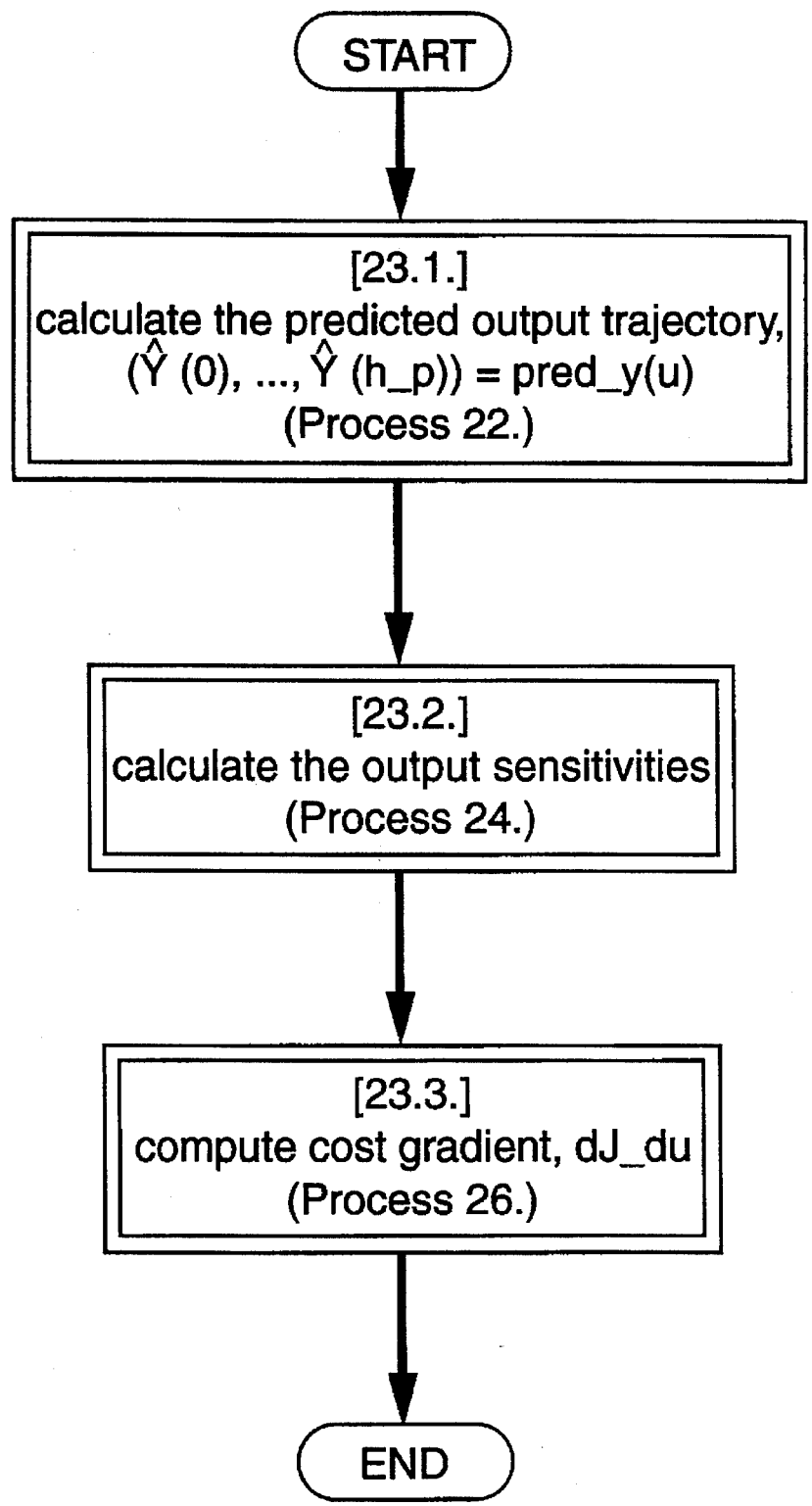
FIG. 32 is a flowchart showing a process for finding the gradient of the cost function for a given control strategy.

FIG. 32: Process 23. Finding the gradient of the cost function at a given control strategy.

This flowchart shows the steps corresponding to the call dJ__du=cost__grad(u).

23.1. The cost gradient is calculated at a given control strategy and the associated (predicted) output trajectory; thus, find the output trajectory. (Process 22)

23.2. As an intermediate step in finding the cost gradient, calculate the "output sensitivities." (Process 24)

23.3. Here dJ/du is calculated in terms of the output sensitivities and basic derivatives. (Process 26)

Figure 33:
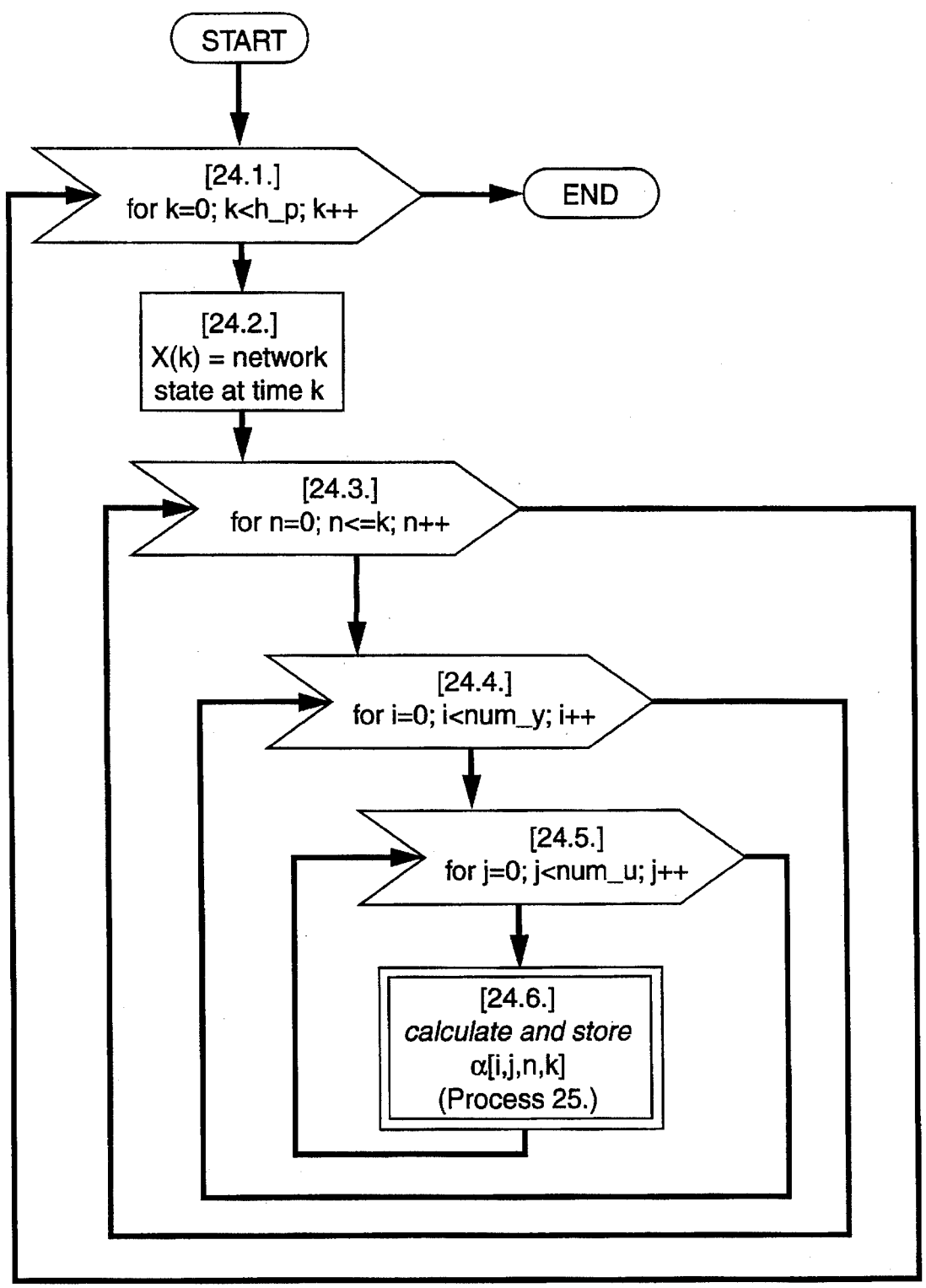
FIG. 33 is a flowchart showing an output sensitivity calculation.

FIG. 33: Process 24. Output sensitivity calculation.

The purpose of this flowchart is to compute $$\alpha[i,j,n,k] = \frac{\partial \hat{y}_i(k+1)}{\partial u_j(n)} = \frac{\partial \phi_i(X(k))}{\partial u_j(n)} \quad \text{(EQ 5)}$$

over the prediction horizon, where X(k) is the network state at time k.

24.1. Loop over the time instants in the prediction horizon.

24.2. This sequence of predicted network states is generated and saved during the execution of [23.1.].

24.3. Loop over the times at which controls will be applied. Note that if n>k, U(n) will have no effect on Y(k+1); i.e., α[*,*,n,k]=0. This is accounted for in the sum in [26.3.].

24.4. Loop over the outputs.

24.5. Loop over the controls.

24.6. (Process 25)

Figure 34:
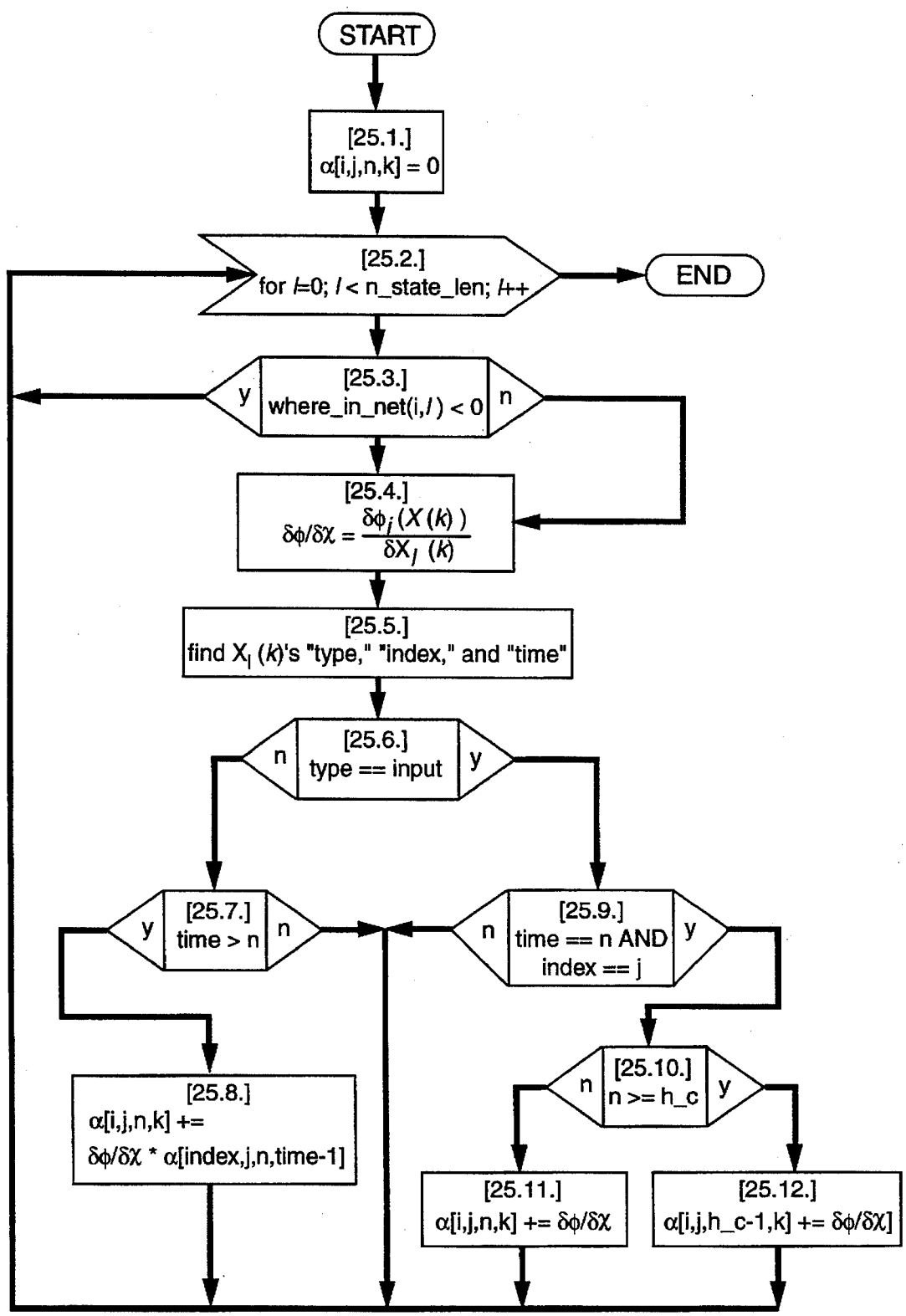
FIG. 34 is a flowchart showing a process for calculating the alpha function.

FIG. 34: Process 25. Calculation of $\alpha[i,j,n,k]$.

This is done by using the chain rule on the components of X:

$$\alpha[i,j,n,k] = \frac{\partial \phi_i(X(k))}{\partial u_j(n)} = \sum_{(X_l \in X)} \frac{\partial \phi_i(X(k))}{\partial X_l(k)} * \frac{dX_l(k)}{du_j(n)} \quad \text{(EQ 6)}$$

25.1. Initially, set α to zero.

25.2. Loop over the components in the network state vector X.

25.3. If where__in__net(i,l) is less than zero, net i does not depend on X$_l$(k) and α[i.j.n.k] will not be changed by this term, so return to the start of the loop.

25.4. Calculate the derivative of the net with respect to X$_l$(k). This is best expressed as a formula. We first need to find the input to the net: x=net__in(i,X(k)), and the location in x that X$_l$(k) corresponds to: p=where__in__net(i,l). We also need to compute the basis function outputs, $\rho_m$=exp[−beta*$(x_{cm})^T(x_{cm})$], and their sum, $$\text{rho\_sum} = \sum_{q=1}^{M} \rho_q, \quad \text{(EQ 7)}$$

where M=num__nodes(i). The derivative can be neatly expressed in terms of tau(i,X(k)), although in practice the value of tau need not be calculated separately. In the following, we will suppress the dependence of quantities on the net number, i. Recall that the net's weight vector, W, and tau can be broken into blocks corresponding to each node in the net: denote these as W$_m$ and tau$_m$ for node m. Then $$\frac{\partial \phi_i(X(k))}{\partial X_l(k)} = \frac{\sum_{m=1}^{M} \left( d_{m,p}\rho_m + W_m^T * \text{tau}_m \sum_{q=1}^{M} 2\text{beta}(c_{m,p} - c_{q,p})\rho_q \right)}{\text{rho\_sum}} \quad \text{(EQ 8)}$$

25.5. This can be determined from the way the state is specified. "type" means either input or output. "index" refers to which input or output X$_l$(k) is, e.g., i for Y$_i$ or j for u$_j$. "time" refers to the time, on the k-timescale, that this element occurred, e.g., if X$_l$(k)=y$_i$(k−2), then time=k−2. Why are the type, index, and time of X$_l$(k) important? From this point on, the rest of the flowchart involves evaluating dX$_l$(k)/du$_j$(n) and multiplying it by ∂ϕ/∂χ. Different actions need to be taken depending on whether X$_l$(k) is an input or an output, which one it is, and when it occurred.

25.6. See if X$_l$(k) is an input.

25.7. If X$_l$(k) is an output, it can only be affected by u$_j$(n) if its time is greater than n.

25.8. Under this condition, we have already computed and stored dX$_l$(k)/du$_j$(n) as α[index,j,n,time−1], so multiply this by ∂ϕ/∂χ and add it to α[i,j,n,k,].

25.9. Given that X$_l$(k) is an input, if the time does not equal n or the index does not equal j, dX$_l$(k)/du$_j$(n) will be zero.

25.10. See if this input occurs after the end of the control horizon.

25.11. Under these conditions, dX$_l$(k)/du$_j$(n) is 1, so α is, by definition, ∂ϕ/∂χ.

25.12. Remember that the control inputs are held constant after the end of the control horizon. Thus, the effect on y$_i$ of changing u$_j$(n) should be added to the effect on y$_i$ of changing u$_j$(h__c−1).

Figure 35:
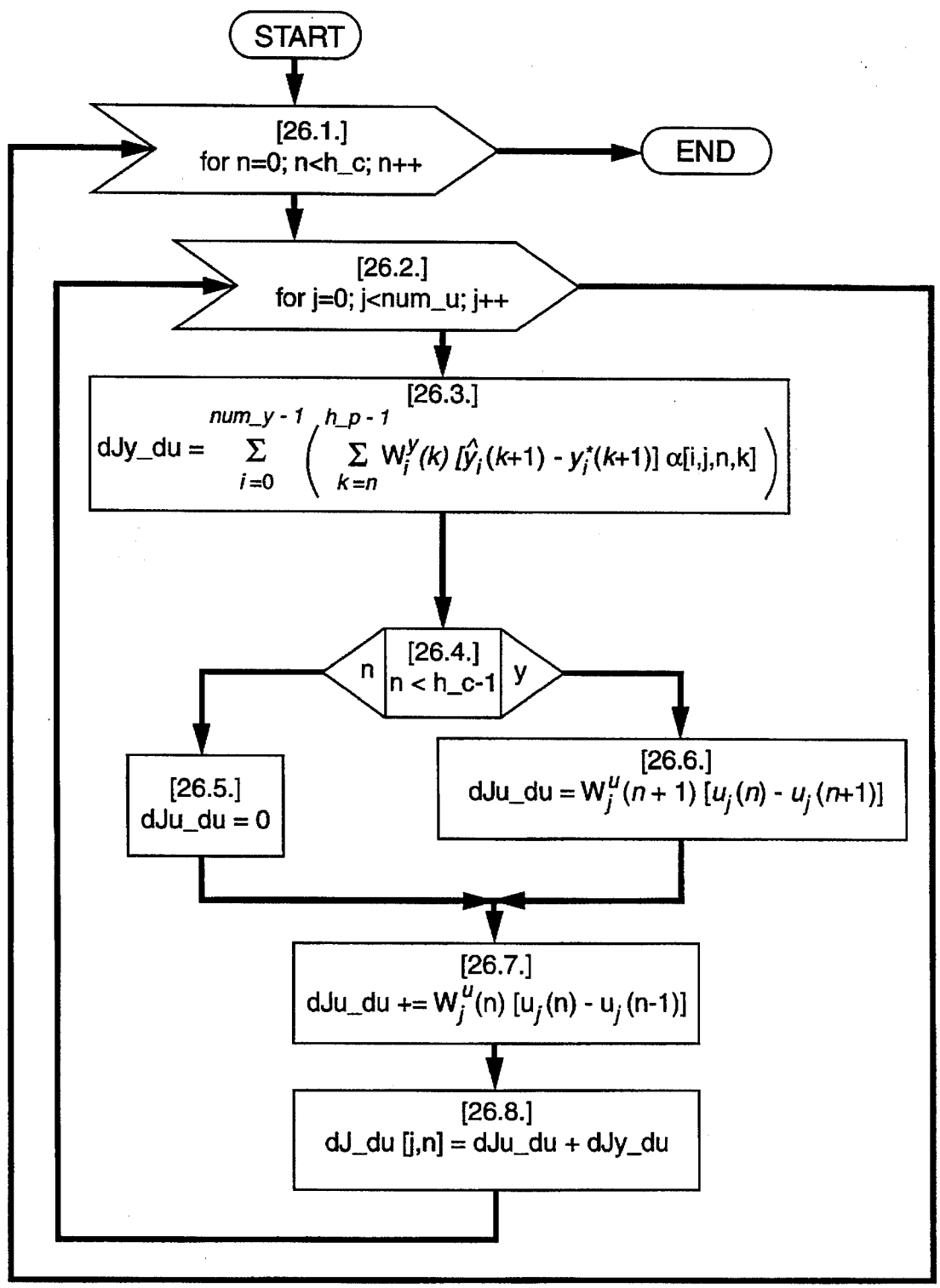
FIG. 35 is a flowchart showing a cost gradient calculation.

FIG. 35: Process 26. Cost gradient calculation 26.1. Loop over the control horizon (i.e., the number of variable control inputs).

26.2. Loop over the control lines: each pass through this loop will give the derivative of J with respect to u$_j$(n).

26.3. This equation results from direct differentiation of the Jy and the definition of α. Note that this equation takes into account the fact that α[*,*,n,k]=0 for n>k.

26.4. In Ju, all u(n), except u(h__c−1), appear in two terms of the sum: the n'th term and the (n+1)'st term. The next two blocks account for the (n+1)'st term, and [26.7.] accounts for the n'th term.

26.5. When n=h__c−1, there is no contribution from the (n+1)'st term.

26.6. This is the derivative of $_j^u$(n+1)(u$_j$(n+1)−u$_j$(n))$^2$/2 with respect to u$_j$(n).

26.7. The derivative of the n'th term of the sum with respect to u$_j$(n). Note that when n=0, the value of the previous control input, u(−1), is needed. This is available in the network state vector.

26.8. The derivative of J is the sum of the derivatives of Jy and Ju.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An improved method for controlling at least one process output parameter of a plant with a control value generated by adaptive model predictive control (MPC) using a neural network, the process improvement comprising:

(a) repetitively sampling at times t(k) a process output parameter and associated control value at time intervals k having a first duration;

(b) sequentially storing said process output parameters and associated control values sampled at each of said time intervals k over rg and sg of said time intervals k, respectively, where g is an integer greater than one and defines a gapping time interval g at a second interval duration greater than said first interval duration, and r and s are arbitrary integers greater than one and determined by the size of a register for storing said process output parameters and associated control values;

(c) forming from stored ones of said process output parameters and associated control values a gapped network state vector comprising a sequence of process output parameters selected at times t(k), (y(k−g+1),y(k−2g+1), ... ,(y(k−rg+1)), and averaged control values, ($\bar{u}$(k−g+1),$\bar{u}$(k−2g+1), ... ,$\bar{u}$(k−sg+1)), where ($\bar{u}$(k−ig+1)=(u(k−ig+1)+u(k−ig+2)+...+u(k−ig+g))/g;

(d) applying said gapped network state vector to a controller for outputting an updated control value to apply to said plant at time t(k+1) after time t(k); and (e) repeating steps (a) through (e) at subsequent time intervals of said first time duration to maintain said process output parameter at a selected value.

2. An improved plant control method according to claim 1, further including the steps of:

(f) training said neural net on historical control values and associated ones of said process output parameters to obtain a first set of learned weights and basis centers for operation of said neural net;

(g) continually inputting said output process and said network state vector at each one of said first time intervals to an on-line training processor for outputting updated weights and basis centers to said neural net for use at a next one of said first time intervals.

3. An improved plant control method according to claim 1 further including the steps of:

inputting said gapped network state vector to said neural net for outputting a predicted process output parameter at time t(k+1);

determining an error between said predicted process output parameter at time t(k) and said process output parameter at time t(k); and adding said error to said predicted process output parameter to form a first corrected predicted process output parameter at time t(k+1).

4. An improved plant control method according to claim 2 further including the steps of:

inputting said gapped network state vector to said neural for outputting a predicted process output parameter at time t(k+1);

determining an error between said predicted process output parameter at time t(k) and said process output parameter at time t(k); and adding said error to said predicted process output parameter to form a first corrected predicted process output parameter at time t(k+1).

5. An improved method for controlling at least one process output parameter of a plant with a control value generated by adaptive model predictive control (MPC) using a neural network, the process improvement comprising:

(a) repetitively sampling at times t(k) a process output parameter $y_k$ and associated control value $u_k$ at time intervals k having a first duration;

(b) sequentially storing said process output parameters and associated control values sampled at each of said time intervals k;

(c) forming from stored ones of said process output parameters $y_j$ and associatsd control values $u_j$ a network state vector comprising a sequence of process output parameters and control values;

(d) applying said network state vector and said output process parameter at time t(k) to an on-line training processor;

(e) outputting updated values of weights and basis center locations to said neural net for use in predicting a future output process parameter including the steps of retaining a selected set of associated output process parameters and control values from said network state vector at time t(k−1) to form a net input vector; and processing said net input vector and said basis center by determining the distance between said net input vector and said basis center and moving said basis center toward said net input vector if said distance exceeds a first selected value or adding a new basis center if said distance exceeds a second selected value; and (f) repeating steps (a) through (e) at subsequent time intervals t(k+1) of said first time duration to update said weights and basis center locations after each said first time interval duration.

6. The improved plant control method of claim 5, wherein the step of outputting updated values of weights and basis center locations further includes the steps of:

retaining a selected set of associated output process parameters and control values from said network state vector at time t(k−1) to form a net input vector;

processing said net input vector and said output process parameter at time t(k) to output a first updated value of said weight; and further processing said net input vector and said output process parameter at time t(k) with difference training to output a second updated value of said weight from said first updated value of said weight.

7. The improved plant control method of claim 6, further including the step of yet further processing said net input vector and said output process parameter at time t(k) with curvature training to output a third updated value of said weight from said second updated value of said weight.

8. The improved plant control method of claim 6, wherein the step of further processing said net input vector and said output process parameter includes the steps of:

retaining values of said net input vector at time t(k−2) and said output process parameter at time t(k−1);

determining a net input vector difference value between said net input vector at time t(k−1) and said net input vector at time t(k−2);

determining an output process parameter difference value between said output process parameter at time t(k−1) and said output process parameter at time t(k−2); and processing said net input vector difference and said output process parameter difference with said first updated value of said weight to output a second updated value of said weight.

9. The improved plant control method of claim 8, wherein the step of yet further processing said net input vector and said output process parameter further includes the steps of:

retaining values of said net input vector at time t(k−3) and said output process parameter at time t(k−2);

determining a net input vector difference value between said net input vector at time t(k−2) and said net input vector at time t(k−3);

determining a second net input vector difference value between said net input vector difference at time t(k−2) and said net input vector difference at time t(k−3);

determining a output process parameter difference value between said output process parameter at time t(k−2) and said output process parameter at time t(k−3);

determining a second output process parameter difference value between said output process parameter difference at time t(k−2) and said output process parameter difference at time t(k−3); and processing said second net input vector difference and said second output process parameter difference with said first updated value of said weight to output a third updated value of said weight.

10. The improved plant control method of claim 5, wherein the step of outputting updated values of weights and basis center locations further includes the steps of:

retaining a selected set of associated output process parameters and control values from said network state vector at time t(k−1) to form a net input vector;

processing said net input vector and said basis center to adjust said basis center if a predicted output process parameter differs from said output process parameter at time t(k) by a predetermined value.

11. An improved control system for controlling at least one process output parameter of a plant by generating a control value using adaptive model predictive control (MPC) with a neural network, the control system comprising:

a register for repetitively sampling and storing process output parameters and associated control values at times t(k) with first time intervals k having a first duration, said register sequentially storing said process output parameters and associated control values sampled at each of said first time intervals over rg and sg, respectively, of said first time intervals, where g is an integral multiple of k greater than one and defines a gapping interval g at a second time duration greater than said first time duration, and r and s are arbitrary integers greater than one and determined by the size of said register for storing said process output parameters and associated control values;

an electronic processor for forming from stored ones of said process output parameters and associated control values a gapped network state vector comprising a sequence of process output parameters selected at g time intervals, (y(k−g+1),y(k−2g+1), . . . ,y(k−rg+1)), and averaged control values, ($\bar{u}$(k−g+1),$\bar{u}$(k−2g+1), . . . ,$\bar{u}$(k−sg+1)), where ($\bar{u}$(k−ig+1)= (u(k−ig+1)+u(k−ig+2)+. . . +u(k−ig+g))/g;

a controller for receiving said gapped network state vector and outputting an updated control value to apply to said plant at time t(k+1) after time t(k).

12. An improved control system according to claim 11, further including an on-line training processor connected to receive said gapped network state vector and said process output parameter at time t(k) and outputting updated values for internal weights and basis center locations to said neural net.

13. An improved control system according to claim 11, further including:

a delay register for receiving a predicted value for said output process parameter at time t(k+1) and outputting a predicted value of said output process parameter at time t(k);

a subtraction circuit for outputting a difference between said output process parameter at time t(k) and said output process parameter predicted at time t(k); and an addition circuit for adding said difference to said predicted output process parameter at time t(k+1) and outputting a corrected predicted output process parameter at time t(k+1).

14. An improved control system for controlling at least one process output parameter of a plant by generating a control value using adaptive model predictive control (MPC) with a neural network, the control system comprising:

a register for repetitively sampling and storing process output parameters and associated control values at times t(k) with first time intervals k having a first duration, said register sequentially storing said process output parameters and associated control values sampled at each of said first time intervals over rg and sg, respectively, of said first time intervals, where g is an integral multiple of k greater than one and defines a gapping interval g at a second time duration greater than said first time duration, and r and s are arbitrary integers greater than one and determined by the size of said register for storing said process output parameters and associated control values;

an electronic processor for forming from stored ones of said process output parameters and associated control values a network state vector comprising a sequence of process output parameters and control values; and an on-line training processor connected to receive said network state vector and said process output parameter at time t(k), wherein said on-line training processor further includes:

electronic circuitry for adjusting basis centers used by said neural net including:

an error processor for determining an error value between said output process parameter at time t(k) and a predicted output process parameter at time t(k) using a current location for said basis function;

a basis center location processor for determining a distance between said net input vector and said basis center; and logic circuitry for adjusting said basis center if said error exceeds a predetermined error value or if said basis center location exceeds a predetermined distance from said net input vector;

electronic circuitry for forming a net input vector from said network state vector and outputting said net input vector at time t(k−1); and a weight training processor receiving said output process parameter at time t(k) and said net input vector from time t(k–1) and outputting a first updated value of processing weights for said neural net.

15. The improved control system of claim 14, wherein said weight training processor further includes difference training circuitry for receiving a value of said output process parameter at times t(k) and t(k–1), said net input vector at times t(k–1) and t(k–2), and said first updated value of said weight and outputting a second updated value of said weight.

16. The improved control system of claim 14, wherein said weight training processor further includes curvature training circuitry for receiving a value of said output process parameter at times t(k–1) and t(k–2), said net input vector at times t(k–2) and t(k–3), and said second updated value of said weight and outputting a third updated value of said weight.

17. The improved control system of claim 14, wherein said on-line training processor further includes electronic circuitry for adjusting basis centers used by said neural net.

* * * * *